(12) United States Patent
Gulati

(10) Patent No.: US 8,649,980 B2
(45) Date of Patent: Feb. 11, 2014

(54) ACTIVE NOISE INJECTION COMPUTATIONS FOR IMPROVED PREDICTABILITY IN OIL AND GAS RESERVOIR CHARACTERIZATION AND MICROSEISMIC EVENT ANALYSIS

(75) Inventor: Sandeep Gulati, La Canada Flintridge, CA (US)

(73) Assignee: ViaLogy LLC, Pasadena, CA (US)

( * ) Notice: Subject to any disclaimer, the term of this patent is extended or adjusted under 35 U.S.C. 154(b) by 374 days.

(21) Appl. No.: 13/092,862

(22) Filed: Apr. 22, 2011

(65) Prior Publication Data

US 2011/0295510 A1 Dec. 1, 2011

Related U.S. Application Data

(63) Continuation-in-part of application No. 13/042,454, filed on Mar. 7, 2011.

(60) Provisional application No. 61/311,227, filed on Mar. 5, 2010, provisional application No. 61/327,035, filed on Apr. 22, 2010.

(51) Int. Cl.
*G01V 1/28* (2006.01)
*G01V 1/34* (2006.01)

(52) U.S. Cl.
USPC .................................. 702/16; 702/11; 702/14

(58) Field of Classification Search
CPC ........... G01V 1/28; G01V 1/34; G01V 1/288; G06T 15/00
USPC ........ 702/2, 6, 9, 11, 14, 16, 17, 18; 324/307; 367/38
See application file for complete search history.

(56) References Cited

U.S. PATENT DOCUMENTS

| | | | |
|---|---|---|---|
| 5,774,419 A * | 6/1998 | Uhl et al. | ........................ 367/38 |
| 6,473,697 B2 | 10/2002 | Bouts | |
| 6,780,589 B1 | 8/2004 | Gulati | |
| 6,912,467 B2 | 6/2005 | Schuette | |
| 6,920,397 B2 | 7/2005 | Gulati | |
| 6,963,806 B2 | 11/2005 | Gulati | |
| 7,113,869 B2 | 9/2006 | Xue | |
| 7,466,851 B2 | 12/2008 | Gulati | |
| 7,567,876 B2 | 7/2009 | Gulati | |
| 7,571,056 B2 | 8/2009 | Ben-Menahem | |
| 2008/0272775 A1 | 11/2008 | Feng | |
| 2010/0262372 A1 * | 10/2010 | Le Calvez et al. | .............. 702/14 |

OTHER PUBLICATIONS

Hye Won Kim (Authorized officer), PCT Notification of Transmittal of the International Search Report and the Written Opinion of the International Searching Authority for International Application No. PCT/US2011/027456 mailed Oct. 27, 2011, 8 pages.

Imafuku et al., "Quantum stochastic resonance in driven spin-boson system with stochastic limit approximation", Report No. WU-HEP-99-9, arXiv:quant-phl9910025v1, Oct. 6, 1999, 9 pages.

(Continued)

*Primary Examiner* — John H Le
(74) *Attorney, Agent, or Firm* — Fish & Richardson P.C.

(57) ABSTRACT

Application of nonlinear resonance interferometry is introduced as a new geophysical approach to improve predictability in characterization of subsurface microseismic event analysis and propagation of fracture. In contrast to reflection methods that remove random information noise, nonlinear resonance interferometry exploits the full microseismic acquisition spectrum. In some examples, systems and techniques implement novel computational interactions between acquired microseismic wavefield attributes and a nonlinear system in software to amplify distortions in microseismic noise and exploits injection of synthetic noise, in software format, to fracture events.

9 Claims, 34 Drawing Sheets

(56) References Cited

OTHER PUBLICATIONS

Tai et al., "Local frequency as a direct hydrocarbon indicator", SEG Houston 2009 International Exposition and Annual Meeting, pp. 2160-2164, downloaded Sep. 17, 2012.

Goloshubin et al., "Reservoir imaging using low frequencies of seismic reflections", The Leading Edge, May 2006, pp. 527-531, downloaded Sep. 17, 2012.

Viola et al., "Stochastic Resonance and nonlinear Response by NMR Spectroscopy", Phys Rev Lett. Jun 12, 2000; 84 (24):5466-9.

* cited by examiner

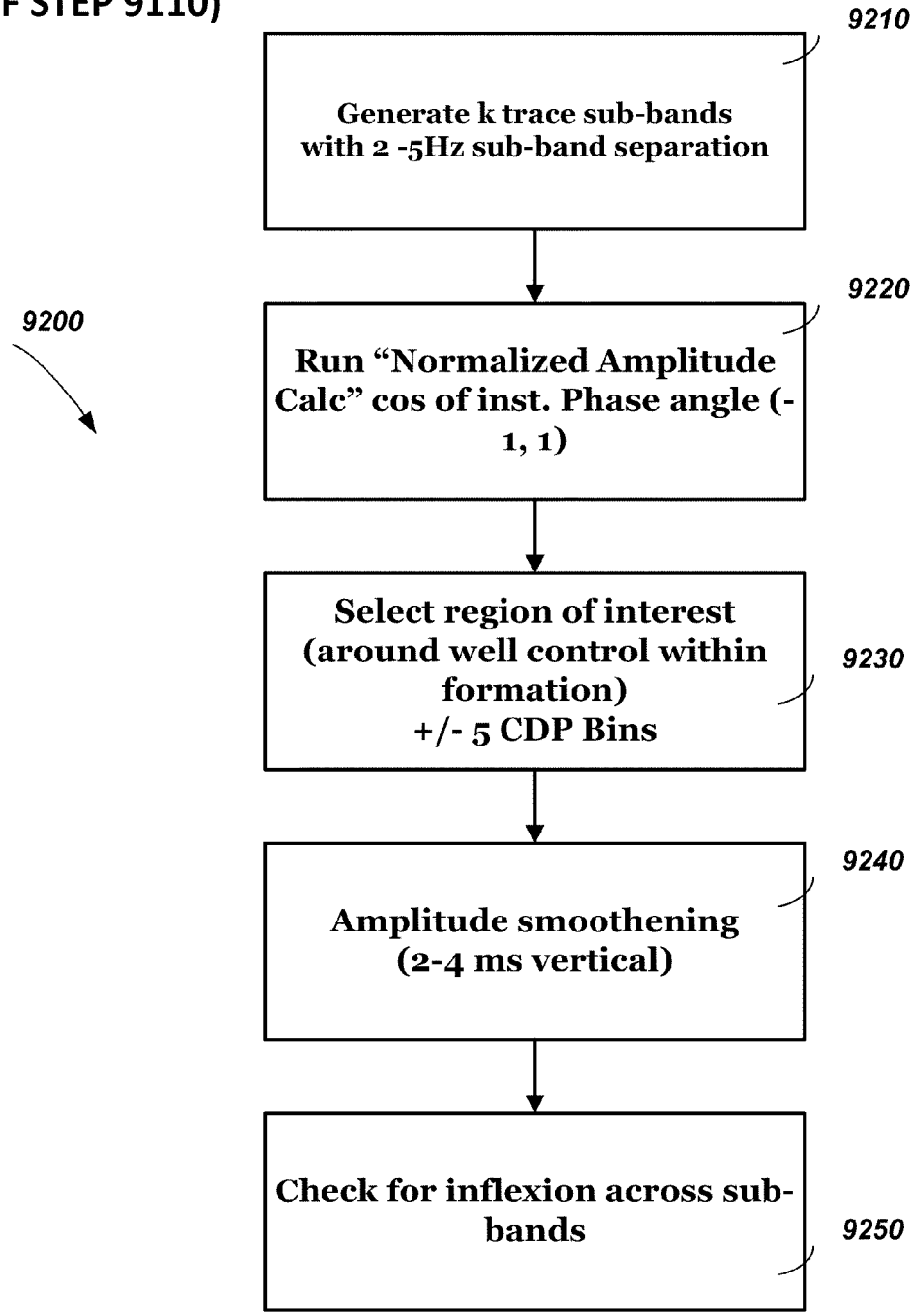
Figure 9-B
SENSITIVITY ANALYSIS
(OF STEP 9110)

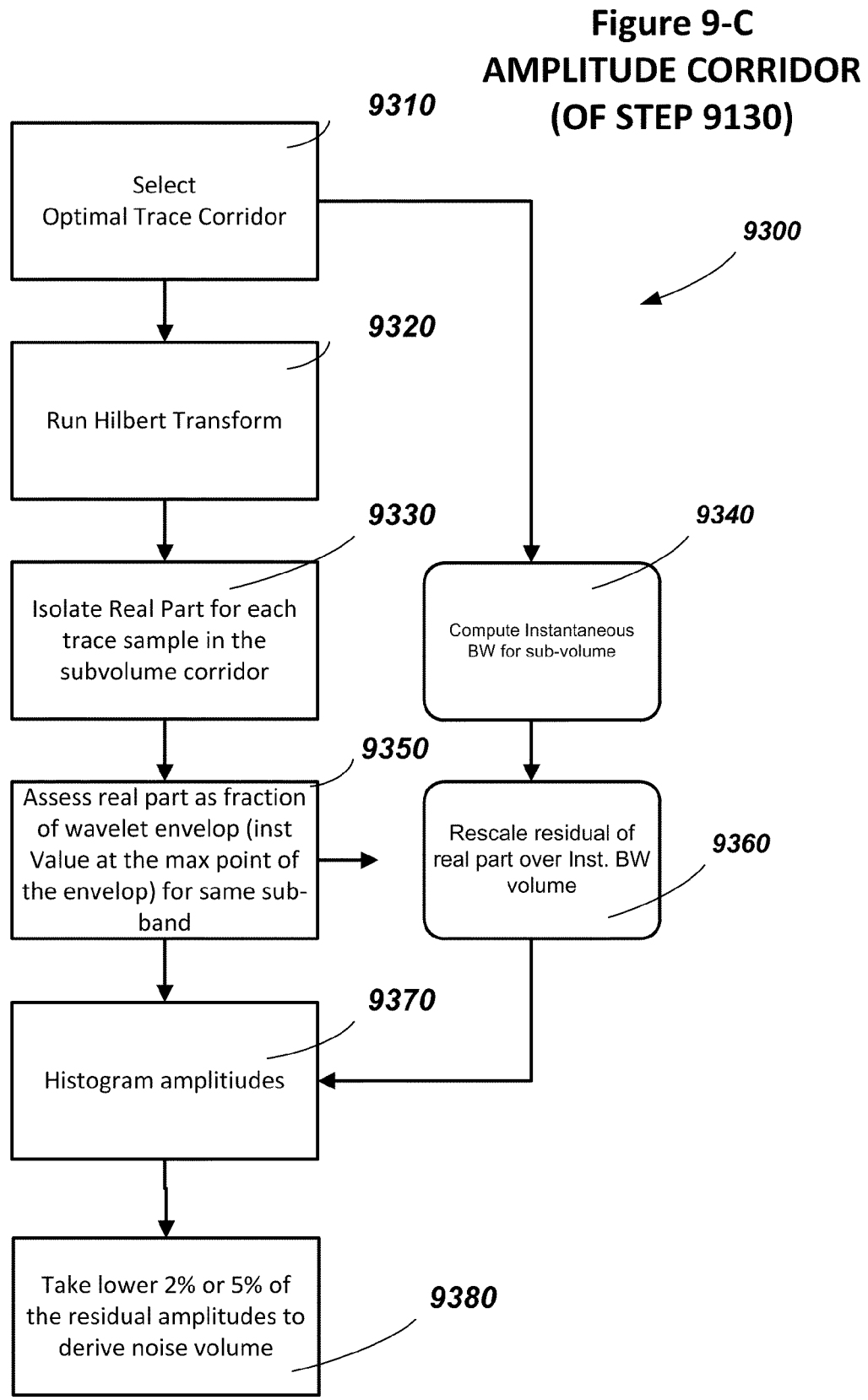

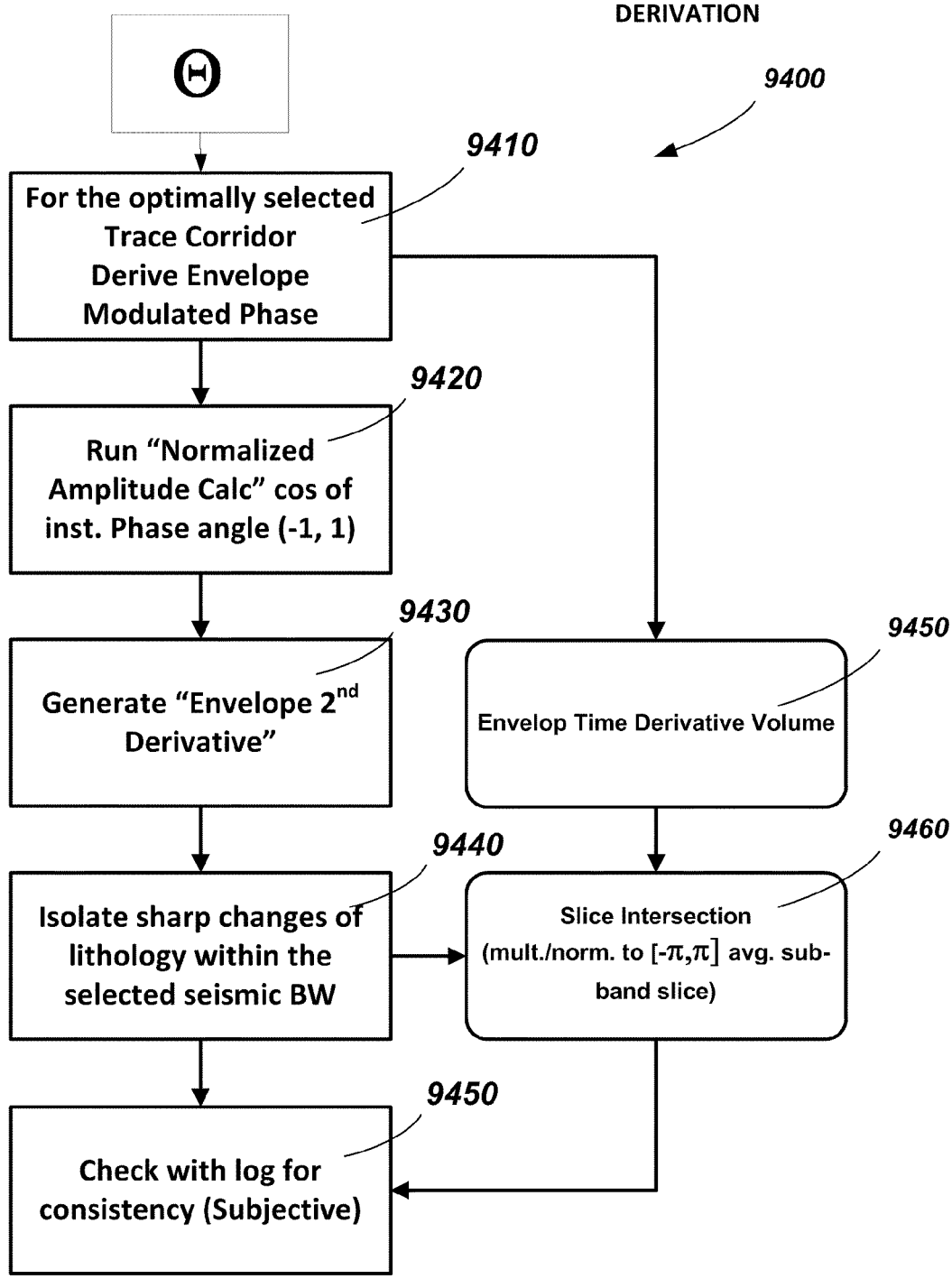

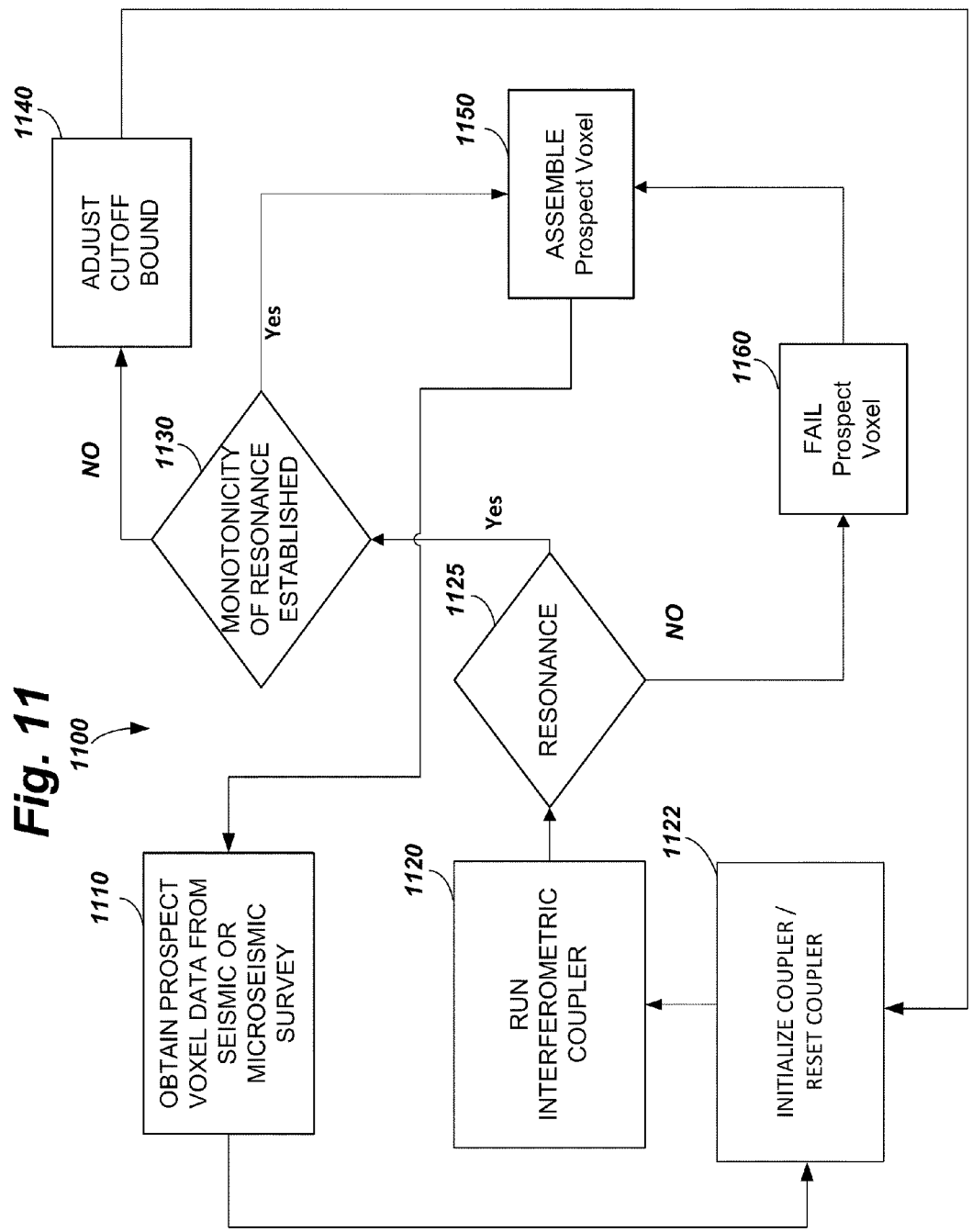

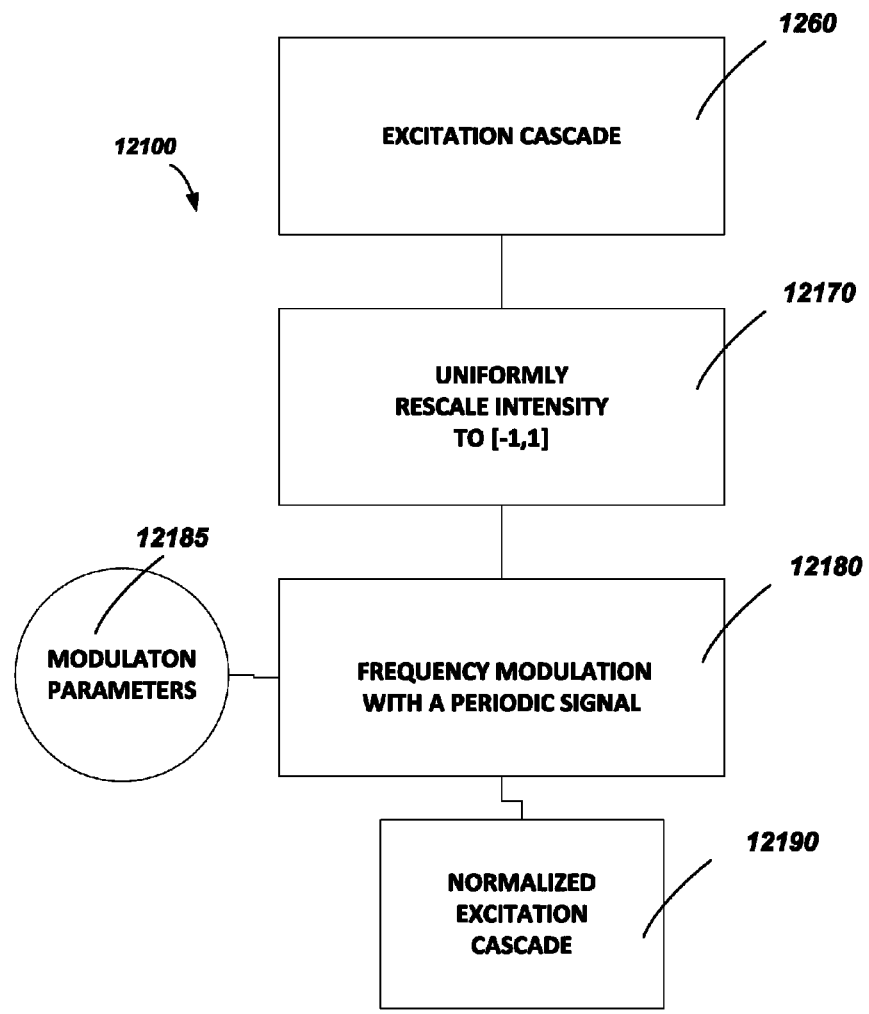

Exemplary Double Well Function**

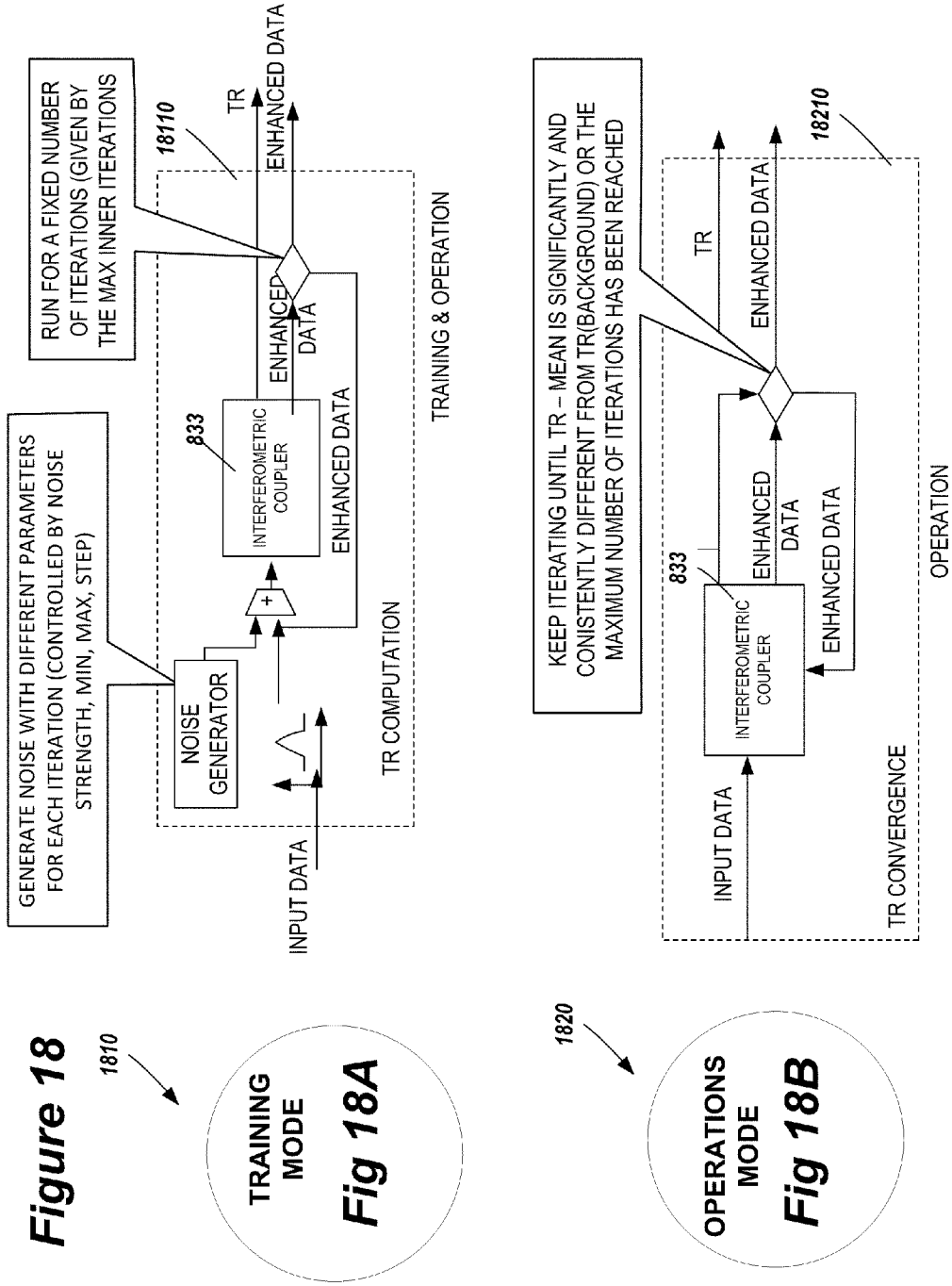

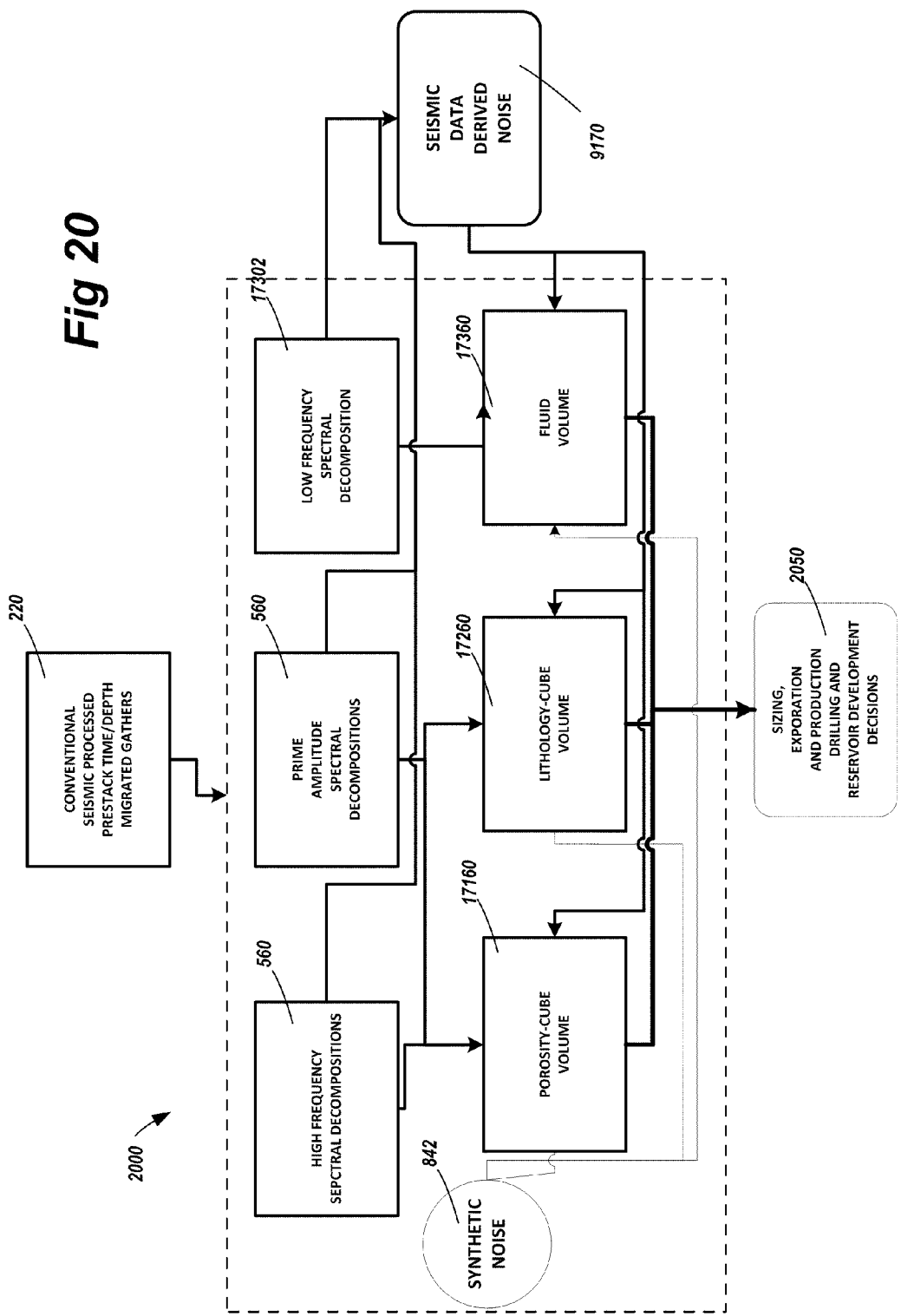

ACTIVE NOISE INJECTION COMPUTATIONS FOR IMPROVED PREDICTABILITY IN OIL AND GAS RESERVOIR CHARACTERIZATION AND MICROSEISMIC EVENT ANALYSIS

This application claims the benefit of Provisional Application No. 61/327,035, titled "Active Noise Injection Computations for Improved Predictability in Reservoir Characterization for Oil & Gas, Geothermal, and Microseismic Applications" which was filed on Apr. 22, 2010, and is a continuation-in-part of U.S. application Ser. No. 13/042,454, titled "Active Noise Injection Computations for Improved Predictability in Oil and Gas Reservoir Discovery and Characterization" which was filed on Mar. 7, 2011, which claims priority to Provisional Application No. 61/311,277, titled "Active Noise Injection Computations For Improved Predictability In Reservoir Characterization" which was filed on Mar. 5, 2010. These prior applications incorporated herein by reference in their entirety

BACKGROUND

In oil and gas exploration, seismic surveys are used to estimate features of interest of subsurface geology and detect fracture events during hydraulic fracture monitoring. Seismic surveys use controlled seismic energy, such as produced by specialized air guns or seismic vibrators. A receiver senses seismic energy, typically in the form of a wave, reflected by subsurface features. The subsurface features are detected by analyzing the time it takes for reflected seismic waves to travel through the subsurface matter of varying densities. 3-D seismic also uses seismic energy to produce a 3-dimensional map of subsurface formations and detect onset and propagation of subsurface fracturing during well completions and hydraulic fracturing. Traditional techniques of analyzing seismic data attempts to filter out noise to identify a signal of interest. However, in the process of filtering out noise, important information of interest can be lost, resulting in a seismic map from which various features may be difficult to distinguish. Once a prospect has been identified, an exploration well is drilled in an attempt to conclusively determine the presence or absence of oil or gas. However, an exploratory well can be very expensive especially for off-shore wells and is subject to the risk that the well will be unproductive.

SUMMARY

Systems and techniques are disclosed for improving signal-to-noise in onshore and offshore seismic and electromagnetic acquisitions, for improving microseismic survey analysis techniques for hydraulic fracture monitoring and optimization, and for interferometric acquisition for directing hydrocarbon imaging using conventional 3D vibrators. Seismic data is analyzed using a non-linear stochastic quantum energy source to create resonances through the interaction between virtual vibration and the seismic data. Changes in resonance yields information of interest from the seismic data not obtainable by noise filtering. The signature of such changes in resonance can then be determined and calibrated as porosity, fluid, or lithology. Also, such changes can be used to detect onset of subsurface cracks and fractures during hydraulic fracturing processes. These fractures and subsurface displacements are often buried in receiver noise or coherent noise from other surface sources and cannot be easily discriminated using traditional techniques. Effectiveness of hydraulic fracture process can be established, or reservoir characterization and drilling decisions can then be made on the resulting seismic volumes of reservoir property. Such systems and techniques can be used to de-risk new drilling locations and to redevelop under-performing or abandoned wells by locating nearby pay zones that may have just been missed.

More than 60% of world's oil and 40% of world's gas reserves are in carbonates. In some examples, the systems and techniques disclosed herein can be used to de-risk and characterize complex stratigraphic carbonates, their stacking, continuity, fracture density, spacing and porosity. Porosity prediction is at the heart of discriminating potentially productive carbonate bodies. Carbonate reservoirs continue to be difficult to characterize using 3D seismic due to their greater heterogeneity from rapid vertical and lateral facies variation, lower seismic resolution due to higher velocities, and inherent inability to directly image fracturing. Basin geology models provide limited insight to positioning of individual wells and offsets, as formation properties change unpredictably. Because of the broad-spectrum of diagenesis (chemical, physical, or biological change undergone by a sediment in its initial deposition) that affects carbonate rocks, the final porosity in these carbonates may or may not be related to the depositional environment. Also, unlike other lithologies, the original primary porosity in carbonates may be totally destroyed during diagenesis and significant new secondary porosity may be created. So to predict well productivity, certain patterns of natural fracturing and high continuous porosities are identified from 3D seismic data.

On-shore and deep-water clastic reservoirs are among the world's largest, most explored, and most productive hydrocarbon plays. These include a variety of turbidite sand-body geometries such as channels, lobes, sheets and levees in complex down-slope settings. Post-depositional stresses modify primary sedimentary structures, changing pore size distribution and permeability characteristics which proves challenging to interpretation of pay and saturation distribution in otherwise sand-prone reservoirs. Exploration success, and subsequent appraisal and development of these highly productive reservoirs depends upon accurately mapping the interplay of sediment dispersal within reservoir-scale or basin-scale geometry to delineate source, seal, and reservoir geologies. Conventional de-risking has relied on acquiring large offsets and higher frequency data. While this has advanced structural interpretation to a degree, success has been spotty due to lack of fluid imaging capability. Systems and techniques are disclosed that exploit noise within seismic data and increase resolution to jointly assess sand-stacking along with in-place fluid saturation. Such techniques can assist in derisking and finding net pay. Such techniques can also be used to explain the distribution of producers and dry-holes in existing in 3D seismic surveys.

Shale gas resource development is rapidly becoming a global trend in onshore exploration. Wells produce from low permeability shale formations can also be the source rock for the oil and natural gas. As the larger hydrocarbon volumes are restricted to fracture porosity within the shale, or within micropores, or adsorbed onto the minerals and organic matter within the shale, detecting subtle changes in lithology produces dramatic changes in predicting production outcomes and economics even in closely space wells. However, such lithology changes register only as weak changes in a conventional 3-D seismic signal because 3-D seismic has been designed to primarily image large impedance contrasts across lithologies. Because the changes in impedance contrast within shale formations are very subtle, geophysicists struggle to add value by using the signal measured by conventional seismic in shale gas reservoirs. The systems and techniques disclosed herein can detect such subtle changes in lithology. Conventional data can be analyzed according to the disclosed systems and techniques to identify such subtle changes. The systems and techniques disclosed herein can also be used to identify brittleness in shale—the ability to fracture the reservoir.

Vertical, deviated, and horizontal wells drilled in shale gas reservoirs, carbonates and tight sandstone reservoirs are often completed and stimulated using hydraulic fracturing processes to increase formation permeability in the vicinity of drilled well-bore. In recent years there has been an increase in use of borehole, buried microseismic, near-surface, or on surface microseismic receivers for detecting onset, propagation, and properties of subsurface cracks and micro cracks to establish an effectiveness of hydraulic fracture processes and the reach of water and other chemicals and formation proppants into the formation. Hydraulic fracturing (also referred to as "frac jobs" "frac'ing," "fracking," or "Hydrofracking" in the industry) is a engineering process that results in the creation of fractures in rocks. This artificial or engineered fracturing originates from the drilled wellbore to increase the flow-rate and recovery of oil and natural gas. The formation fractures themselves may be natural or man-made and are extended by internal fluid pressure which opens up the fractures and causes them to extend through the formation. Natural fractures include volcanic dikes, sills, and fracturing due to ice as in frost weathering. Hydrofracked or fluid-driven fractures are formed at depth in the borehole and extend into the targeted formations. Once the fractures are induced, the fracture width is maintained by introducing a proppant into the injected fluid. Proppant is a material, such as grains of sand, ceramic, or other engineered particulates, that prevent the fractures from closing when the injection is stopped. Hydraulic fracturing is being deployed at various stages of well completion, during flow fall-offs and even periodically.

One aspect of the subject matter described in this specification can be embodied in methods that include, voxelizing microseismic data from seismic traces from a microseismic receiver for a geological subsurface formation of interest into multiple voxels having respective subsurface locations in the formation of interest; and determining whether a voxel in the multiple voxels includes an attribute, wherein the attribute comprises a fracture event; and outputting whether the voxel includes the attribute fracture event to an attribute volume based on the subsurface location; and outputting fracture event start time and duration of fracture event; and performing the determining and the outputting for at least some other of the multiple voxels.

In another aspect, a method can include obtaining, from microseismic data for a formation of interest, a one-dimensional voxel vector for a voxel from multiple voxels associated with a the formation of interest; obtaining spectral data generated from well-log data microseismic data from the formation of interest obtained during a known period of no fracturing associated with an attribute of interest; coupling the spectral data with the one dimensional voxel vector to determine whether a resonance event occurs; when a resonance event occurs, producing an output indicating that the voxel has the attribute of interest; and when the resonance event does not occur, producing an output indicating that the voxel does not have the attribute of interest.

In another aspect, a method includes obtaining normalized voxel data for a voxel from voxelized microseismic data for a geological subsurface formation; obtaining normalized control voxel data from microseismic data from a period known not to have significant fracture events; generating spectral data from the normalized control voxel data; performing a first non-linear coupling of the voxel data with spectral data to generate a first resonance, wherein the coupling is driven by noise having an intensity within a first cutoff band; in response to generating the first resonance, adjusting the cutoff band to a second cutoff band, different than the first cutoff band; performing a second non-linear coupling of the voxel data with the spectral data associated with an attribute of the subsurface formation to generate a second resonance, wherein the second coupling is driven by noise having an intensity within a second cutoff band; in response to generating the second resonance, generating an indication that the attribute exists in the voxel, wherein the attribute comprises a subsurface fracture; and in response to the second coupling not producing a second resonance producing an indication that the attribute does not exists in the voxel.

Other embodiments of these aspects include corresponding systems, apparatus, and computer programs, configured to perform the actions of the methods, encoded on computer storage devices.

DESCRIPTION OF DRAWINGS

FIGS. 9A-9D show an example of a process for determining seismic noise data.

FIG. 11 shows a process for establishing monotonicity of a resonance event.

FIGS. 12A-12B describe a process for generating and normalizing excitation cascade data.

FIGS. 18A-18B show configuration of a quantum resonance interferometry engine in a training mode and an operations mode.

FIG. 20 shows an example workflow for producing output with various processes discussed herein.

DETAILED DESCRIPTION

Figure 1:
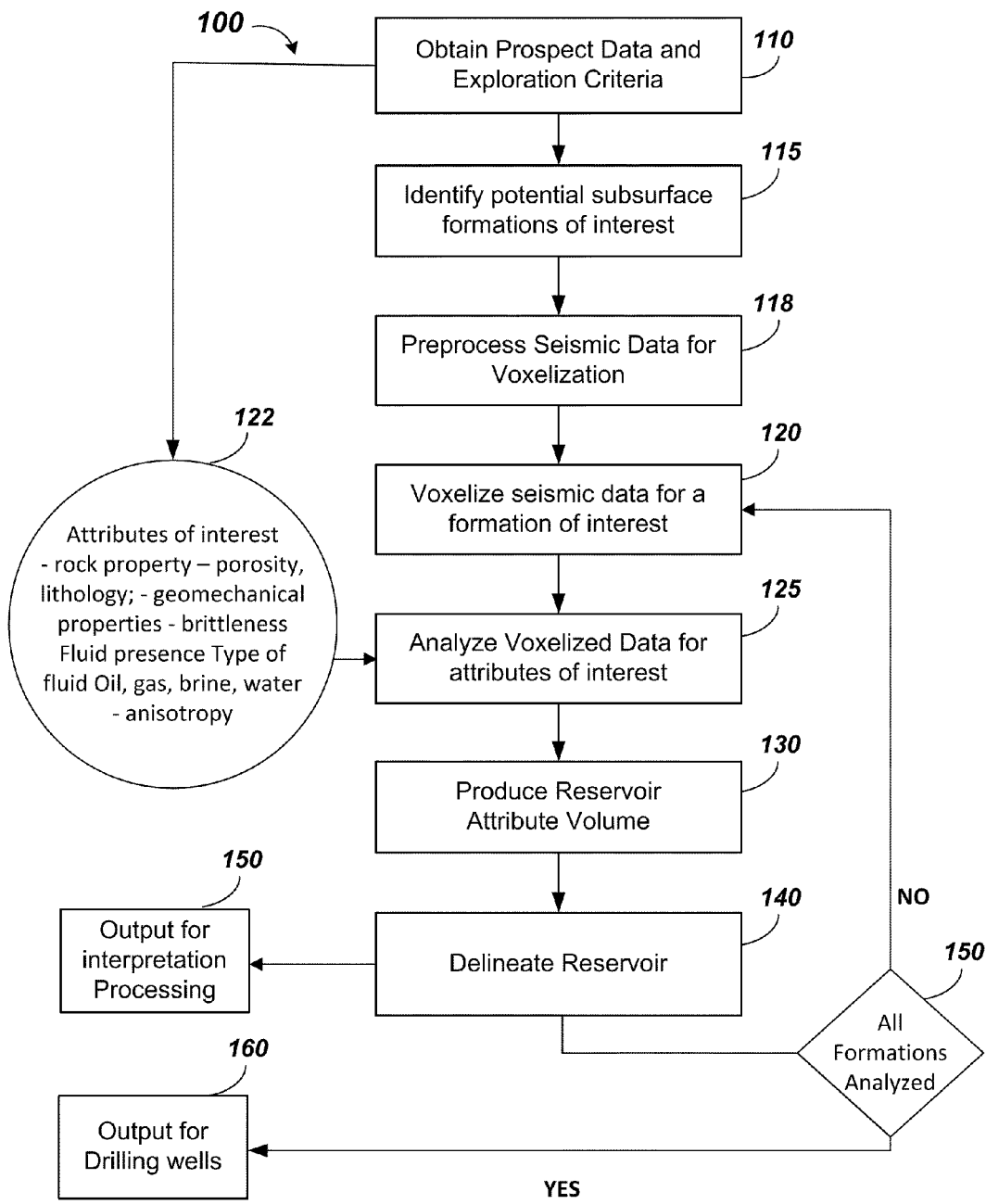
FIG. 1 shows an example process for reservoir characterization.

FIG. 1 shows an example process 100 for reservoir characterization (also known as lateral subsurface prediction of reservoirs). Process 100 can be used, in some examples, to build a computer model of a reservoir beneath the surface of earth that incorporates all the characteristics of the reservoir that are pertinent to its ability to store hydrocarbons and also to produce them. The process 100 can be used to discover, delineate, and size hydrocarbon (oil and natural gas) reservoirs to produce, among other things, a drill map for onshore or offshore wells using seismic data. At 110, prospect data and exploration criteria are obtained. Exploration criteria can include targeted exploration objectives such as criteria for a type or types of formations to be searched for in a prospect—a location being analyzed for a deposit. A prospect is defined as an area covering a potential subsurface trap believed to contain hydrocarbons. geological factors that have to be present for a prospect to produce oil and gas include: presence of a source rock (organic rich rock that has been subjected to high pressure and temperature over an extended period of time to form hydrocarbon), a structural, stratigraphic or combination trap to hold the hydrocarbons, impermeable seal or cap rock over the hydrocarbon trap in order to prevent hydrocarbons migrating or escaping to the surface, and porous reservoir rock that collects oil within its pores and that is permeable so that the hydrocarbons will flow to surface during production.

For example, exploration criteria can include a target formation with a predetermined porosity, fluid type, and lithology for a predetermined type of subsurface material. The porosity of a porous source rock or sediment describes the fraction of void space in the material, where the void may contain fluid such as water, oil or gas, and is defined by the ratio:

$$\phi = \frac{V_V}{V_T}$$

where $V_V$ is the volume of void-space (such as fluids) and $V_T$ is the total or bulk volume of material, including the solid and void components. Porosity is a complex function of many factors such as grain size and overlying sediments.

Figure 2:
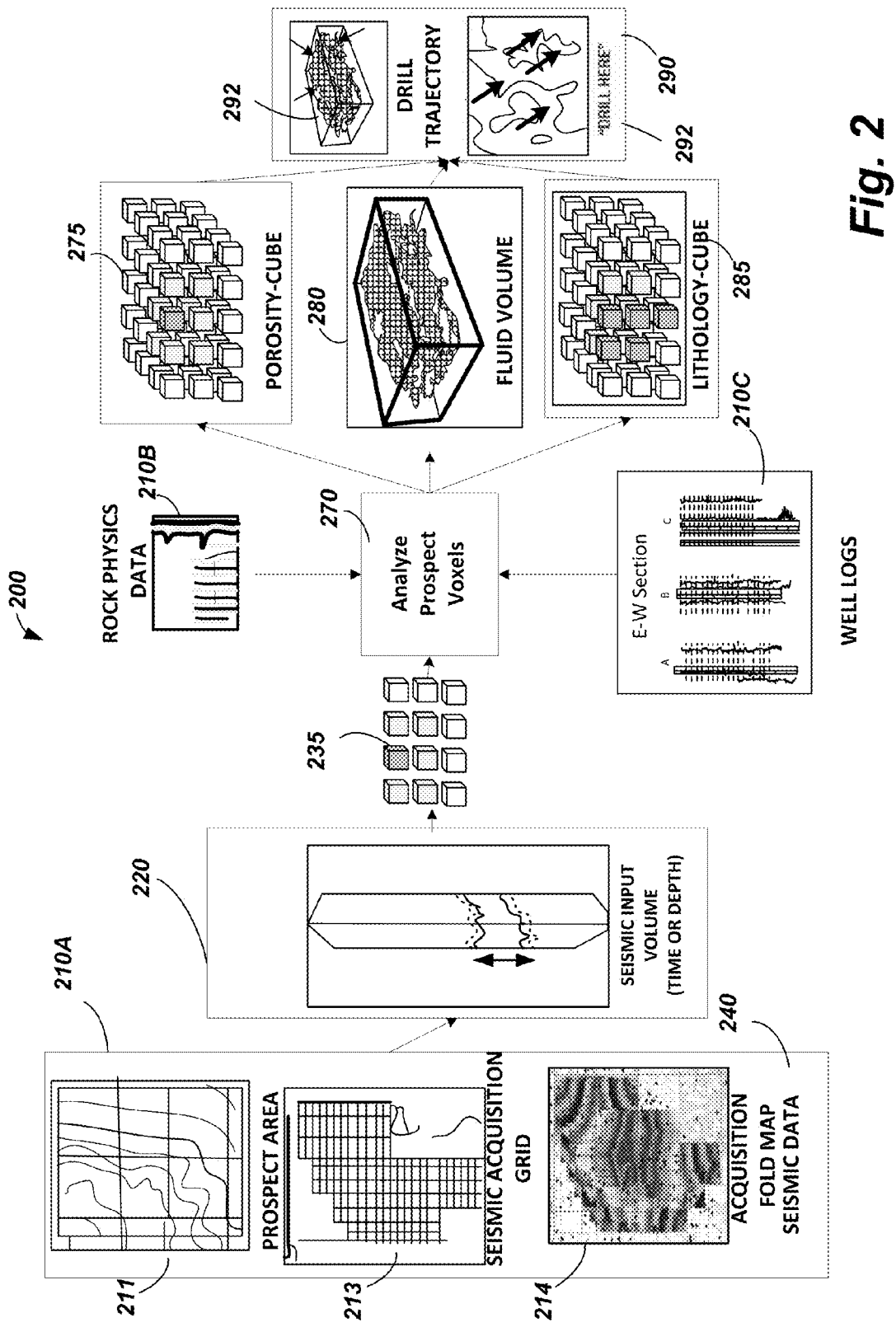
FIG. 2 shows an example of a graphical depiction of elements involved in process for reservoir characterization.

FIG. 2 shows an example of a graphical depiction 200 of elements involved in the process 100. For example, FIG. 2 shows examples of prospect data at 210A, 210B, and 210C. Prospect data can include seismic and other geophysical data, rock physics data, and well log data for the prospect or well log data from an analogous formation on another prospect. Geophysical data can include for example seismic data 210A obtained for an area of interest, such as for a prospect area 211. Obtaining geophysical data can include, for example, receiving the geophysical data already acquired from a prospect area, at a computing device for further processing and analysis. In some examples, obtaining the data can include receiving the data, actively requesting the geophysical data or acquiring the geophysical data from the prospect area 211.

Seismic data 210A can include already processed, migrated pre-stack time gathers (denoted as a Pre-stack Time Migration (PSTM) volume); migrated pre-stack depth gathers (denoted as a Pre-stack Depth Migration (PSDM) volume); or raw seismic gathers. The gathers can be stacked into a seismic volume, such as seismic volume 220, in the format of a PSTM stack or PSDM stack in an SEGY format. The seismic volume can be derived from 2-D seismic acquisition, 3-D seismic acquisition process, or multicomponent seismic process over a seismic acquisition grid 213.

Seismic data can also include a fold map 214 which includes a multiplicity of recorded seismic reflection data. The fold map 214 can be used to ensure high acquisition signal-to-noise and sufficient reflected energy for subsequent computations. A 3-D seismic survey fold map may be calculated using the relationship:

$$Fold_{3D} = \frac{\text{Useful Surface Area of Patch}}{4 \times \text{Souce Line Spacing} \times \text{Receiver Line Spacing}}$$

$$OR = \frac{\pi \times (\text{Maximum useable Offset})^2}{4 \times \text{Source Line} \times \text{Receiver Line}}$$

where the useful surface area of a patch (i.e., an areas being analyzed with seismic energy) and a source line and a receiver line spacing are obtained from the seismic acquisition grid 213. Method of 100 applies to standard compression wave 2-D and 3-D seismic acquisition, 4-D time lapse seismic where measurements are repeated over time, 4-C converted wave multi-component seismic that uses a compression wave (p-wave) source and both compression wave and shear wave (s-wave) receivers, and 9C full wave multicomponent using both compression wave and shear wave source and receivers. (converted wave with compression source and shear or 9C multicomponent seismic). Source line spacing refers to the distance between successive rows of way-points at which acoustic excitations are sent into the ground. Various modalities of seismic acquisition are familiar to one skilled in the art. In practice, acquisition processes using a seismic acquisition grid 213 record a large square or rectangular patch, depending on the area of interest, such as a mineral lease owned by a prospect owner. Useful data obtained at an area of interest can be offset by several geophysical factors. For example, geophysical factors can limit a maximum useful radius for geophone coverage.

By moving a patch and recording more salvos using simultaneous discharge of excitation vibrations from multiple vibrator trucks or air guns as an example, into the group of source points, one can accumulate overlapping subsurface coverage and build statistical repetition over each subsurface reflecting area referred to as a "bin". The quality of the subsurface image can be related to the statistical diversity of the information recorded for each bin of sub-surface coverage. For example a bin represents the smallest area of a 3-D survey that contains the entire survey statistics. The higher the number of observations obtained, that contain unique measurements of the acoustic reflections from a subsurface, the better the re-construction is of the subsurface geological configuration that caused those observations. Terms bin and CMP (common midpoint) bin are used interchangeably. It is a small rectangular area with dimensions ½ source line spacing by ½ receiver line spacing comprising of all mid-points that lie inside the area are assumed to belong to a common midpoint. All seismic traces that lie inside the bin will contribute to the fold of that bin and will be CMP stacked.

Techniques for producing conventional PSTM and PSDM volumes, used as an input to process 100 are well known in the art. For example, Oz Yilmaz's book (and references therein), *Seismic Data Analysis—Processing, Inversion, and Interpretation of Seismic Data, Volume I and II, pages* 1-2024, 2001, published by Society of Exploration Geophysics, provides a discussion of methods for producing PSTM and PSDM seismic volumes all the way from seismic data acquisition. In some examples, the seismic data is obtained in a preprocessed format where the seismic data is correctly imaged with the seismic signals focused, where the unwanted energy, such as seismic multiples, is removed, and where true amplitude seismic processing has preserved the amplitude information of seismic reflection events.

Prospect data also includes well log data 210C. Well logs provide physical rock properties for an identified petrophysical zone. These are available from wells that have already been drilled on the prospect area 211 under consideration or from wells drilled into similar source rock at another analogous prospect area. Well logs include sonic logs, bulk density logs, gamma ray logs, neutron porosity logs, and resistivity logs. A sonic well log, such as dipole sonic log, can also include sampling of both compression (p-wave) velocity and shear (s-wave) velocity within a well bore. Basic Well Log Analysis for Geologists by George Asquith and Charles Gibson, 1982, pages 1-215 and references therein, published by American Association of Petroleum Geologists, Tulsa, Okla. provide an introduction and discussion of different wells logs and their relationships.

Well log data can be used to calibrate and tie actual rock and fluid properties for a formation of interest at a known well, to seismic data for the known well. Such well log data can also be used to interpret attributes found in the seismic data for the known well. As discussed in more detail below, well log data 210C for the seismic volume can be used to predict rock and fluid properties in a seismic volume using seismic data from the seismic volume of a prospective well. The well log data 210C can been edited and corrected for issues such as noise bursts, cycle skips and fluid replacements or can be obtained in such a format.

Prospect data can also include rock physics data 210B includes information regarding type of geological source rock, such as sandstone, limestone, dolomite, and shale, being targeted for exploration, such as is identified by the exploration criteria. Term. Rock physics relates the geological properties (e.g. porosity, lithology, saturation) of a rock at certain physical conditions (e.g. pressure, temperature) with their corresponding elastic and seismic properties (e.g. elastic modulus, velocity, p-wave impedance, s-wave impedance). Using rock physics modeling, one skilled in the art can predict the elastic (seismic) properties from the geology, or using rock physics inversion can predict geology from elastic (seismic) observations. Also, derived attributes such as brittleness, defined as the ratio of compressive strength to the tensile strength for the rock is derived from Poisson's Ratio and Young's modulus, measured based on rock core samples in the lab. Brittleness can be derived using Vp/Vs ratio where Vp, Vs denotes p-wave and s-wave velocities respectively or approximated using p-wave impedance/s-wave impedance. Once source rock types (i.e., rock that is a potential source of hydrocarbons) are identified for a prospect, rock physics tables can be obtained for basic litho logical and geomechanical properties of the rock types and their granularity combinations. The source rock types can be identified by well logs 210C for existing wells including seismic data obtained for those existing wells. Rock physics data 210B includes properties enumerated in terms of sonic compression-wave velocity, shear-wave velocity, brittleness, Young's modulus, and relationships for sonic velocity changes across different rock facies.

At 115, a subsurface formation of interest of the subsurface volume 220 is identified for further analysis. The formation of interest is located in a prospect located in the prospect area 211. The subsurface formation can include for example layer 225 shown in FIG. 2. A prospect may have multiple separated hydrocarbon bearing pay-zones present in the subsurface. For example a Permian Basin well-bore may have hydrocarbon pay-zones within the Spraberry, Dean, Clearfork, Wolfcamp, Atoka, Strawn, Devonian, Fusselman, Ellenberger formations, all of which need to be individually selected and independently analyzed as in 115. Analysis 100 may be used to analyze one or more or all of the formations between surface and maximum depth covered by the seismic data. Conventional interpretation is used to identify seismic horizons or subsurface reflecting surfaces that separate the multiple subsurface formations. A horizon is a reflecting surface separated by different layers in depositional environments and characterized by different seismic reflection properties. These are separated by curves in 2-D data and surfaces or facies in 3D data. Facies is defined as a distinctive rock unit that forms under certain conditions of sedimentation, reflecting a particular geological process or sedimentary depositional environment. From an image processing perspective, seismic horizons are edges on the seismic image serving to delineate formations such as structural and stratigraphic features (such as faults) and patterns. Oz Yilmaz's book referred above provides a detailed treatment for conventional methods to determine seismic horizons in seismic volumes.

At 118, the seismic data in the seismic volume 220 for the prospect is processed for voxelization. Voxelization is defined as the computational process of decomposing seismic volume into 3-D volume cells which are then analyzed for rock and fluid properties. The term voxelized data refers to seismic volumes that have been decomposed into smaller 3-D volume cells and to data relating to attributes for those 3-D volume cells. As discussed in connection with FIG. 3, the seismic data is spectrally decomposed into separate spectral decompositions. Spectrally decomposing the voxelized data can help in determining frequency bounds for prospect voxel data (also referred to as prospect voxels or as voxelized data) in step 120. The term prospect voxel refers to a singular prospect voxel data while prospect voxels refers to plurality of prospect voxel data. The seismic data can be broken up into frequency separated volumes such as separated by high (e.g., between 80 Hz and 100 Hz for onshore data), low (e.g., between 3 Hz and 10 Hz), and prime amplitude (e.g., between 12 Hz and 70 Hz) frequencies.

At 120 the seismic data 210A, for the seismic volume 220 is voxelized into multiple three-dimensional volume cells, referred to as voxels, for further analysis, as shown by the multiple voxels 235 in FIG. 2. In some examples, voxelizing the seismic data at 120 includes determining a size and orientation of the voxels which depends on the resolution of the acquired seismic data, geological understanding of the depositional processes that led to development of hydrocarbon reservoirs in the prospect area within a field or basin and the formation of potential traps in the subsurface lithological formation of interest on the prospect. Dimensions can be specified as x (feet or meters) by y (feet or meters) by z milliseconds for time-based seismic volumes, or x (feet or meters) by y (feet or meters) by z (feet or meters) for depth-based seismic volumes. In some examples, the vertical z dimension for a voxel is set to the seismic sample acquisition sampling rate (e.g., 0.5 ms, 1 ms, 2 ms, or 4 ms). The higher the sampling rate the higher the resolution of the voxels and ultimately of the result of analyzing the voxels. Also, the areal x and y dimensions are limited by the seismic survey design or the "bin size" (x by y dimension) of the PSTM/PSDM gathers. In many seismic processing algorithms that can be used, the seismic data is processed before being obtained at 110, the bin size is established early in the process and final seismic data is bin-size limited. If bin size is coarse in the seismic data, then re-binning and reprocessing is performed to generate smaller bin sizes. If reprocessing is not possible then each voxel is sized to (2 times x-dimension of the bin) by (2 time y-dimension of the bin) by (sampling rate or processing depth resolution). If re-binning and reprocessing is possible for the seismic data, then voxels sizes can be set to as low as (0.5 times the x-dimension of the bin) by (0.5 times the y-dimension of bin) by (sample rate or depth resolution). The dimension of the voxels determines the final attribute resolution that is produced by the analyzing step 125.

At 125, the voxelized data is analyzed. The voxelized data is analyzed, voxel by voxel, to determine the existence of attributes as well as the areal and vertical extent of attributes of interest in the seismic data using, for example, quantum resonance interferometry. The attribute of interest can be defined by the exploration criteria. Examples of attributes of interest are shown at 122, and include: rock properties, porosity, lithology, geomechanical properties, brittleness, fluid presence, type of fluid (oil, gas, brine, and/or water), and anisotropy. For example, for each voxel, a percentage of porosity can be identified, lithology characteristics can be identified, and the existence of fluids can be identified such as water, gas, or oil. The result of the analysis can include multiple attributes for each prospect voxel. For a voxel, the seismic data can be analyzed multiple time for multiple attributes of interest. Examples of how the voxelized data can be analyzed is provided in the discussion in connection with FIGS. 1 to 20.

Once the Prospect voxel s in the formation of interest are analyzed an attribute volume can be produced at 130. The analyzed voxels are combined according to their original layout in the seismic volume 220 to produce an attribute volume that can include rock and fluid properties that are combined to find areas of high net-pay or favorable combinations of porosity and fluid-type (oil and or gas). The analyzed voxels are assembled into one or more 3-dimensional attribute volumes, graphically depicted in FIG. 2 as a first attribute volume 275 for porosity, a second attribute volume 280 for fluid volume, and a third attribute volume for lithology. The first attribute volume for porosity shows areas of high porosity in the formation of interest. Each of the analyzed voxels in the first attribute volume 275 show a degree of porosity analyzed for the voxel. The second attribute volume 280 shows a distribution of fluid in the formation of interest. For example, the distribution of gas, oil, and water can be depicted in the second attribute volume 280. The third attribute volume 285 shows a distribution of rock properties such as brittleness of the rock.

At 140, a reservoir is delineated at 140. For example, the exploration criteria can identify cutoff values for which a desired reservoir is desired. For example, for porosity, a cutoff value can be defined above which the reservoir of interest is delineated. In other words, all of the voxels in the attribute having a value above the cutoff, can be delineated as part of the reservoir. In some examples, the cutoff value can be dynamically selected which it turn produces a delineated reservoir of different sizes.

In some implementations, data for the delineated reservoir of step 140 can be provided for further processing and output at 150. For example, the data for the delineated reservoir including the analyzed voxel data can be provided to another processing module, such as a flow model, for further processing. In some implementations, at step 140, it is determined whether all the formations of interest have been analyzed. If not, the process 100 is repeated for steps 120-140 for another formation of interest. At 150, if there are no further formations of interest, the process 100 continues on to step 160 where the data for the delineated reservoir is used to produce one or more drill maps. FIG. 2 shows examples of a drill map—a 3-dimensional drill map 292 with an identification of a drill location and a drill trajectory and a 2-dimensional map also with indicators of where to drill.

Figure 3:
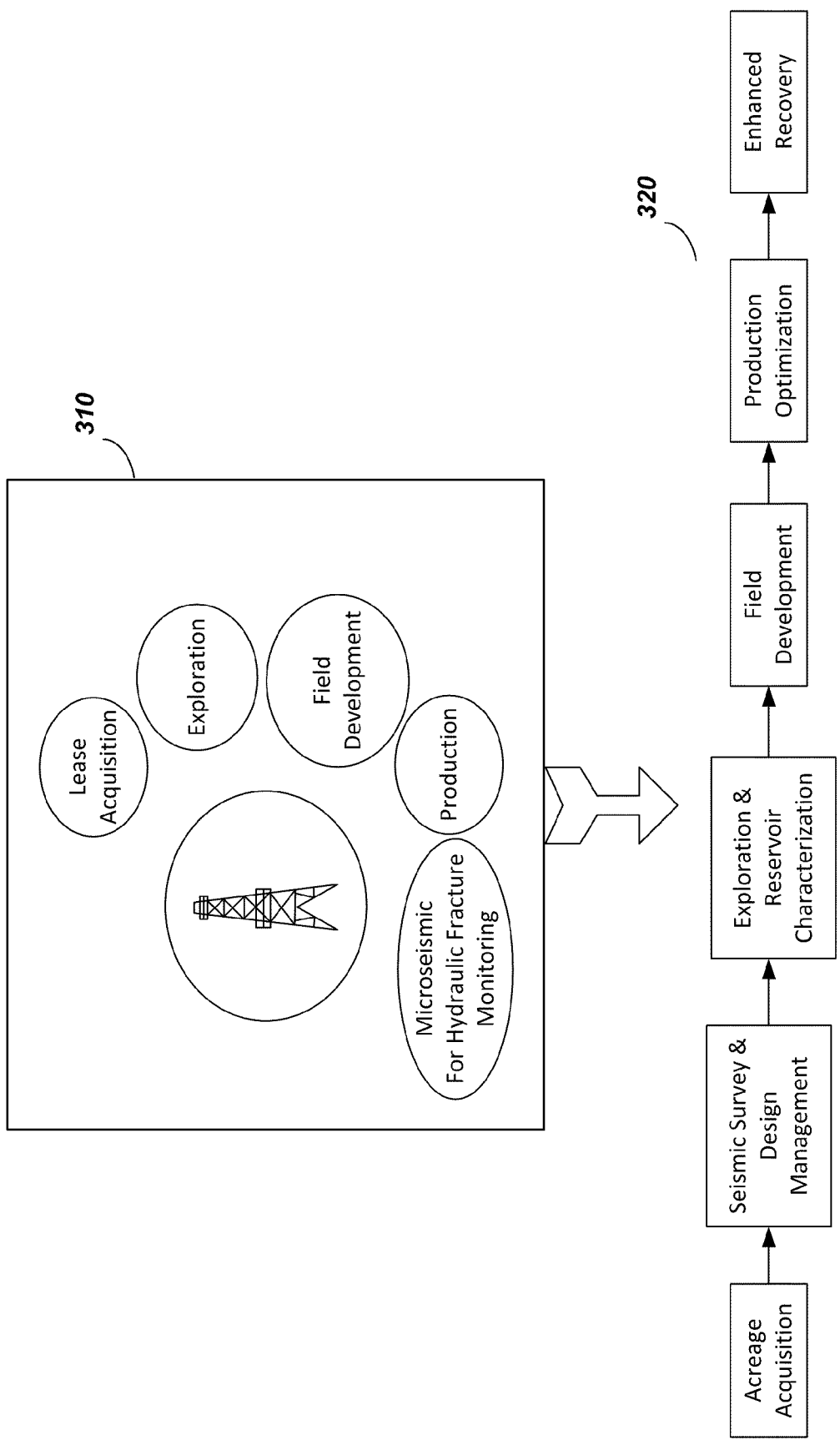
FIG. 3 shows applications of the systems and techniques for reservoir characterization and microseismic analysis for hydraulic fracture monitoring

The outputs produced by FIG. 1 can be used in various areas of oil and gas exploration and production. For example, FIG. 3 shows applications of the systems and techniques disclosed in this disclosure. For example, the systems and techniques disclosed herein can be used, for example in oil and gas lease acquisition 330 to provide accurate subsurface mapping, to estimate hydrocarbon formation boundaries, to optimize prospect acreage, to analyze the onset of subsurface fracture events during hydraulic fracturing using single component and multiple component microseismic acquisition surveys, and to optimally extract hydrocarbon and drill wells. Also, the systems and techniques disclosed herein can be used in seismic and microseismic survey design 333 by determining subsurface characteristics which provides insightful guidance on how to acquire additional 2D, 3D and multi-component seismic data or setup parameters to achieve high quality imaging. For example, reservoir properties using vintage seismic to drill exploration wells or offset wells can be analyzed, for example using existing legacy data, to develop new surveys and design quality seismic data and optimal frequency spectrum for imaging potential structurestratigraphic traps, complex fracturing and nonconformal lithologies.

Also, the systems and techniques disclosed herein can be used for completion and exploration of new wells. For example, analysis can be performed on end-to-end, available geotechnical, geological, stratigraphy and geoseismic data to discover reservoirs, characterize formation boundaries, porosity and properties, develop net pay models, determine effectiveness of hydraulic fracturing, and recommend drilling targets and mitigate dry-hole risk. Also, well trajectories and well-bore deviations can be designed to maximize recovery from nonconformities and fractures. Also, the systems and techniques disclosed herein can be used for positioning development wells in producing or proven fields. For example, locations can be determined for placing offset wells to maximize recovery and minimize the number of wells required to cost-effectively drain hydrocarbon formations. And, the systems and techniques disclosed herein can be used for enhancing currently producing wells by designing perforations and injection laterals for maximal drainage from productive formations and multi-zone wells pays to extend reservoir life and recovery.

As in 320, the methods described in this invention in FIG. 1 through 20, can be used to enable and enhance various upstream oil and gas during primary, secondary, enhanced hydrocarbon recovery and redevelopment of fields or reentry of old wells that have been capped or abandoned or extending depth of existing wells to discover new sources of hydrocarbon production and to find bypassed and missed pockets of hydrocarbon.

Figure 4:
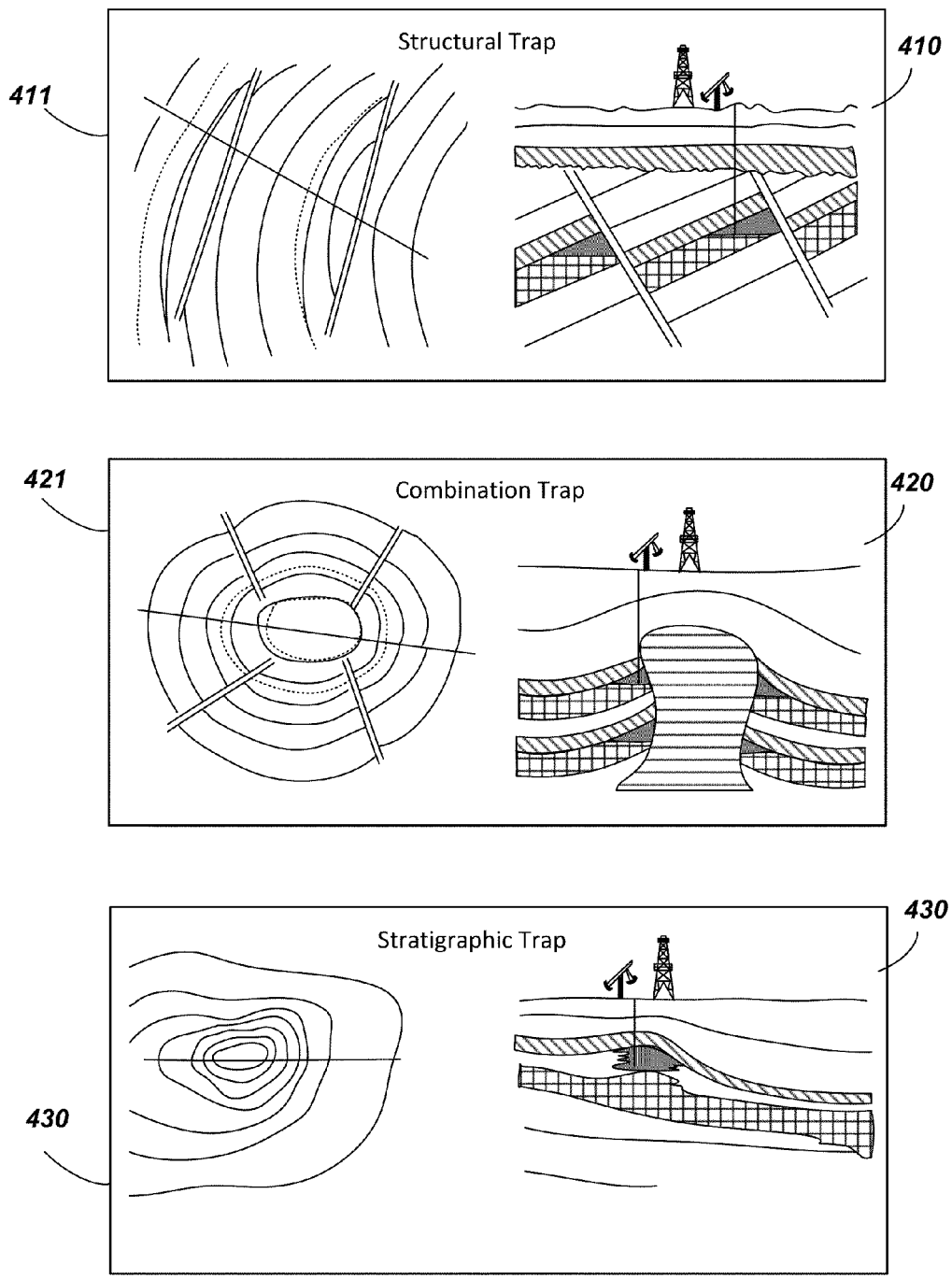
FIG. 4 shows examples of subsurface reservoir traps.

FIG. 4 shows examples of subsurface reservoir traps that can be analyzed using the systems and techniques described herein in each of the stages of oil and gas exploration described above in connection with FIG. 3. The techniques and systems described herein can be used for analyzing post-drilling microseismic data from surveys designed to assess the effectiveness of hydraulic fracturing and other permeability enhancement and well stimulation techniques for completion of wells drilled in reservoir types and formations described in FIG. 4. Traditionally, reservoir characterization has been a subjective process with the outcome highly dependent upon the experience and quality of the geophysical interpreter, quality of seismic processing and formation complexity. Also, the types of onshore and offshore formations are diverse and complex forcing analysts to differentiate themselves based on expertise in specific formation types (e.g., structural plays, stratigraphic plays, or combination traps such as salt domes), geological basins, and resource plays (e.g., Permian Basin, Bakken or Gulf of Mexico).

Structural Traps, formed by deformation of reservoir rock such as anticline or fault, such as Anticline, Normal Fault Trap, Baldheaded Anticline, Reverse Fault Trap, Faulted Anticline, Tilted Fault Block, Dome, Drag Faults on Thrust Fault, Fractured Reservoir, Rollover Anticline on Growth Fault, Antithetic or Synthetic Faults on Rollover Anticline. Stratigraphic Traps formed by deposition of a reservoir such as reef or river channel or erosion of reservoir rock. Examples include Barrier Reef, Atoll, Pinnacle or Patch Reef, BioHerm, Angular Conformity, Shoestring-Sandstone Channel, Buttress or onlap sands, Oolite Shoals, Granite Wash, and Updip Pinchout of Sandstone. Combination Trap which are formed by both structural and stratigraphic elements. These include salt-domes (and overlying domes and faults), Salt Dome—Cap Rock, Salt-Dome-Flank Traps, Updip Facies Change, Compaction Anticline, Secondary or Tectonic Dolomite.

Examples of three of these formations are shown in FIG. 4—a structural trap 410, and combination trap 420, and a stratigraphic trap 430. Each formation is shown with an exemplary graphical depiction of seismic data obtained for these formations: structural trap seismic data 411, combination trap seismic data 421, and stratigraphic trap 430. There are multiple types of oil and gas formations each having unique seismic data.

The seismic data for each of these formations is defined by the underlying rock, fluid, and lithology attributes such as porosity and fluid type. Similar attributes can be obtained post-drilling from well logging and coring data, which entails taking rock samples and performing detailed laboratory analysis.

The systems and techniques disclosed herein enable porosity determination, lithology characterization, fracture event detection, and fluid characterization by specifying a fundamental alternate re-formulation of reservoir characterization process as weak signal detection problem. A quantum resonance interferometry engine is configured to harness nonlinear quantum stochastic resonance phenomenology to detect weak signals in seismic data as a disturbance to noise in a high noise and high interference environments.

Conventional geophysical processing removes noise; but systems and techniques disclosed herein exploit subtle variations in low (such as 3 to 10 Hz) & high frequency. (such as 80-119 Hz) low dB noise amplitudes within seismic data to increase resolution. The changes in these low and high frequency amplitudes can be very small and the invention deploys a software-based quantum resonance Interferometry engine with noise injection computation (implemented, for example, as Vialogy's VirtualVibe™ to separate hydrocarbon from non-hydrocarbon bearing lithology.

For example, oil and gas exploration objectives for the various structural formations, such as those shown in FIG. 4, are formulated as weak signal processing problems that are addressed using a resonance interferometry. For the structural trap 410, the structural trap seismic data 411 is analyzed to detect structural traps and to detect an amount of oil saturation, such as oil saturations above 40%. Seismic data near a fault is analyzed to detect hydrocarbon bearing lithology with an oil-water contact boundary. This hydrocarbon lithology is treated as a signal of interest in the seismic data that is analyzed by a resonance interferometry engine with all other lithologies treated as noise.

For the combination trap 420, the combination trap seismic data 431 is analyzed to detect porous and permeable tertiary sands that updip around a salt dome. Porosity above a certain percentage (e.g., above 10%) in a porosity channel is treated as the signal of interest in the combination trap seismic 411 by a resonance interferometry engine with all other facies treated as noise. For the stratigraphic trap 430, the stratigraphic trap seismic data 431 is analyzed to locate pinnacle reefs with carbonate. Porosity anomalies within stacked sandstone or shale beds are treated in a signal of interest in the stratigraphic trap seismic data that is analyzed by a resonance interferometry engine with all other lithologies treated as noise.

The ability to reformulate broad prospect and formation specific questions into specific weak signal processing objectives enables the systems and techniques disclosed herein to be applied to a broad range of oil and gas issues, including: types of formations, formation complexity, onshore & offshore wells, new fields (using analog) & existing fields, data modalities (active/passive—such as 3D/multi-component seismic; magneto-telluric; gravitational). Moreover, various oil and gas drilling or recovery challenges for a multitude of formations can be posed as a weak signal processing question and solved using the systems and techniques described herein.

Figure 5:
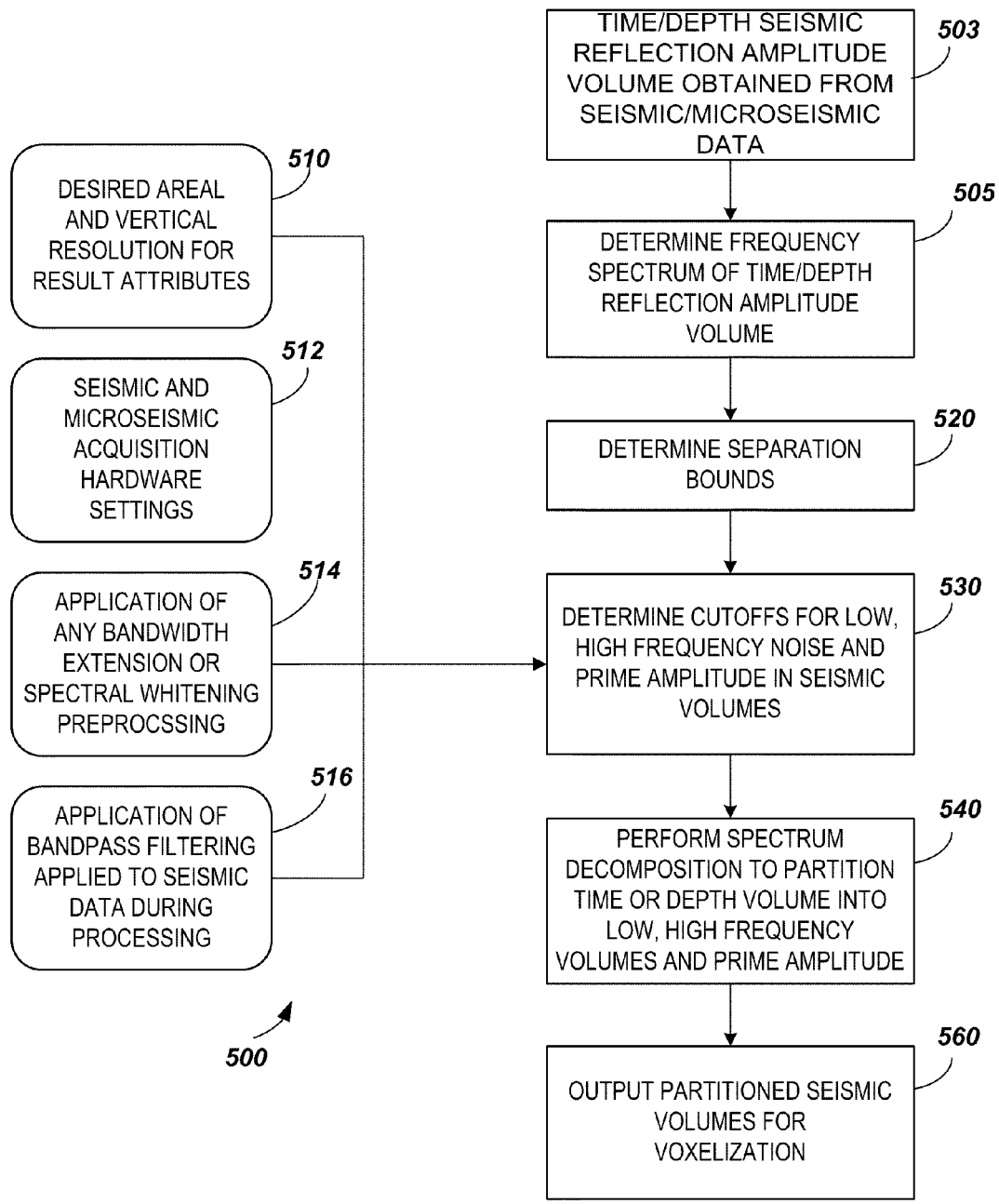
FIG. 5 shows an example of a flow chart for processing seismic data for a prospect prior to the seismic data being voxelized.

FIG. 5 shows an example of a flow chart 500 for processing seismic and/or microseismic data for a prospect prior to the seismic or microseismic data being voxelized for a formation of interest. At 503 seismic data is obtained for a formation of interest. The seismic data can be in the form of a pre-stack time or depth amplitude migrated volume. Migration is a geophysical process by which geophysical events (i.e., changes in acoustic reflection energy) are geometrically re-located in either space or time to a location the event occurred in the subsurface rather than a location where the event was recorded at the surface, thereby creating an accurate image of the subsurface. Migration operators are well known in the geophysics art and are applied in both time and space domains to produce time amplitudes and to produce depth amplitude volumes, respectively. A difference between the two is how well the migration operator represents the velocity model.

Seismic data in 503 can be obtained by applying time migration algorithms such as Stolt migration, Gazdag, Finite-Difference migrations. Example of depth migration algorithms includes Kirchoff migration, Reverse Time Migration, Gaussian Beam Migration and Wave equation migration. At 505 a volume amplitude spectrum is determined for an amplitude volume. For example, the amplitude volume can be analyzed in a low frequency amplitude spectrum (e.g., 3 Hz-10 HZ), a high frequency amplitude spectrum (80 Hz-130 Hz), and a prime frequency amplitude spectrum (e.g., 12 Hz-70 Hz) independently to estimate and predict reservoir rock and fluid properties using spectral decomposition techniques that entail breaking down the seismic signal into its component frequencies. A fully processed seismic survey amplitude volume depending on seismic acquisition hardware settings 512, contains frequencies that are capable of being recorded by geophones/hydrophones used for that particular survey.

During a seismic survey, seismic energy (e.g., acoustic energy) in the form of a seismic wave front, propagates downward into the subsurface and at each lithological facies and geologic boundary (e.g., an unconformity, bed boundaries, etc.), the seismic energy is reflected, refracted, and/or absorbed. Also, as the seismic wave front propagates into the underlying sediments, it attenuates, causing the frequency content of the seismic wave front to decrease with depth. For example high frequencies are better preserved near the earth's surface, are "drowned" by the more dominant, lower frequencies. In practice, spectral decomposition assesses seismic response at different, discrete frequency intervals. For example higher frequencies image thinner beds, while lower frequencies image thicker beds. While it is known in the art that seismic reflection from a thin bed has a characteristic expression in the frequency domain that is indicative of its thickness in time, the seismic response is non-unique and attenuation cannot be ascribed to a particular attribute.

Steps 505 through 560 describe series of spectral decomposition operations to estimate a bandwidth of acquired seismic data at a formation of interest at different signal to noise ratios for the amplitudes, and partitioning the bandwidth or processed seismic data into three regions—a high frequency region, low frequency region and prime amplitude where most of the seismic energy is concentrated.

The physics of rock and fluid property computation seeks to analyze the following effects:

1. Hydrocarbon/Fluid Saturation—is discriminated on basis of spectral energy attenuation (or absorption) in seismic reflection amplitudes at low frequency. These low frequency amplitudes are treated as noise by conventional seismic processing method and filtered out.

2. Vshale (is defined as the volume of shale expressed as a decimal fraction or percentage). Vshale is estimated from small amplifications in the high frequency amplitudes. These high frequency amplitudes are treated as noise by conventional seismic processing method and filtered out.

3. Porosity attribute is discriminated on the basis of scatter in high frequency noise. These high frequency amplitudes are treated as noise by conventional seismic processing method and filtered out.

4. Brittleness—a geomechanical property determine based on phase variation in low and high frequency noise. Both these low and high frequency amplitudes are treated as noise by conventional seismic processing method and filtered out.

Spectral decompositions are used in 530 to partition the seismic volume bandwidth into high and low frequency attributes. The frequency bandwidth taken into consideration during spectral decompositions includes amplitudes as low as −24 dB in one implementation approach. The specifics of frequency bands separating the three regimes are dependent upon the parameters of an quantum resonance interferometry engine used in the actual calculation of attributes as described in connection with the quantum resonance interferometry engine 828 in FIG. 8 and FIG. 10. Depending on the parameters of the quantum resonance interferometry engine, separation bounds for the three regions are determined at 520. The advantage of a having a 2 dB to 4 dB separation in seismic amplitudes between the spectral decomposition seismic volumes produced in 530 is that it reduces artifacts introduced by use of trapezoidal shaped wavelets (e.g., Ormsby) used in the processing sequence to prepare seismic data 110. As an example, the separation bounds for the three regions can be determined in 520 as follows: A bandwidth in the prime frequency amplitude regions can include reflection amplitudes above −6 dB or above −10 dB cut-off; low frequency amplitudes can be set between [−12 dB or −16 dB] and [−22 dB or −24 dB] on frequencies lower than the central frequency of the obtained seismic data; and high frequency amplitudes are set between [−16 dB] and [−22 dB or −24 dB] on frequencies higher than central frequency of the obtained seismic data. A 2 dB or 4 dB separation filter between the bands and amplitudes covering additional 10 to 12 dB yields up to additional 4 Hz to 20 Hz of data depending on the acquisition quality of the seismic data?

If data has been denoised or band-passed, as in 516 then these spectral decompositions are not effective and seismic data in 503 needs to be reprocessed using a processing workflow that does not apply frequency filtering. If seismic data in 110 has been pre-processed using noise attenuating spectral whitening as in 514, that broadens or equalizes the spectral of the signal making it similar to white noise spectrum, then the spectral decomposition intervals have to be extended to obtain low and high frequency spectral decomposition in the −20 dB to −40 dB regime to offset the unintended increase in noise power due to spectral whitening. This is performed as spectral whitening operations when applied to pre-stack seismic traces enhances both the signal and noise amplitudes. Also the trace-by-trace variations in the wavelet's frequency content produced by spectral whitening is an undesirable effect is output produced by this method in 170 are to be use to drive amplitude-versus-offset (AVO), amplitude-versus-angle (AVA) processing or time lapse seismic studies on a reservoir. While there is limited data on resolution gain by working in the extended low and high frequency amplitudes as in 516, as shown in the empirical studies conducted using this method the vertical resolution could be increased significantly or even doubled. For example in a typical survey shown to have 10 Hz to 50 Hz bandwidth for amplitudes above −10 dB, extending the bandwidth to 4 Hz to 90 Hz effectively doubles the vertical resolution.

At 520 separation bounds are determined in the volume amplitude spectrum. In some examples, the frequency regimes can be set to a low frequency regime ("LowF") covering a lower 5th percentile of the volume amplitude spectrum, an upper frequency regime (HighF) covering an upper 5th percentile of the volume amplitude spectrum, and prime amplitude regime ("PrimeAmp") covering a middle 8th to 92th percentile of the volume amplitude spectrum. This is useful for performing sensitivity analysis on resolution vis-a-vis data quality as required by quality control (QC) processes applied to outputs produced by this method.

At 530, cutoffs are determined for different frequency regimes. As a result of this step, three SEGY partitioned volumes are created for each seismic horizon. Depending on the targeted porosity range, prospect voxels are extracted from one or more of the frequency regime volumes. As an example, if the porosities of interest are expected to be less than 8% to 10% (e.g., for some limestone, dolomite formations) or the geobodies are discontinuous or stratigraphically stacked; then HighF volume is preferred for porosity determination. If the porosities are expected to be high and vary over a larger range (e.g., >15%) then PrimeAmp is preferred. If the porosity is expected to have very little variability (less than 2% to 3%) over the prospect area then LowF can be used.

At 540 All the three regimes are however important to QC and check consistency (continuity) of the porosity computation. If the upstream processing sequence was unable to preserve spectrum, then use of HighF volume is preferred. Band limited frequency volumes derived from results of an spectral decomposition are used as inputs to the voxelization process. Seismic volumes generated without denoising are preferred. Notwithstanding the selection of frequency limited volume, it is important to ensure that rock physics model and seismic data noise in FIG. 9A through 9D are derived and optimized to the same frequency regime.

At 560, the partitioned seismic volumes are output for voxelization at 560. Process 500 allows seismic data to be transformed to a representation that allows exploitation of subtle changes in high and low frequency amplitudes which would otherwise be treated as noise in a conventional process and filtered out. Errors in rock and fluid property determination for a formation of interest are reduced by focusing processes in FIGS. 5 and 6 on optimal input data.

Figure 6:
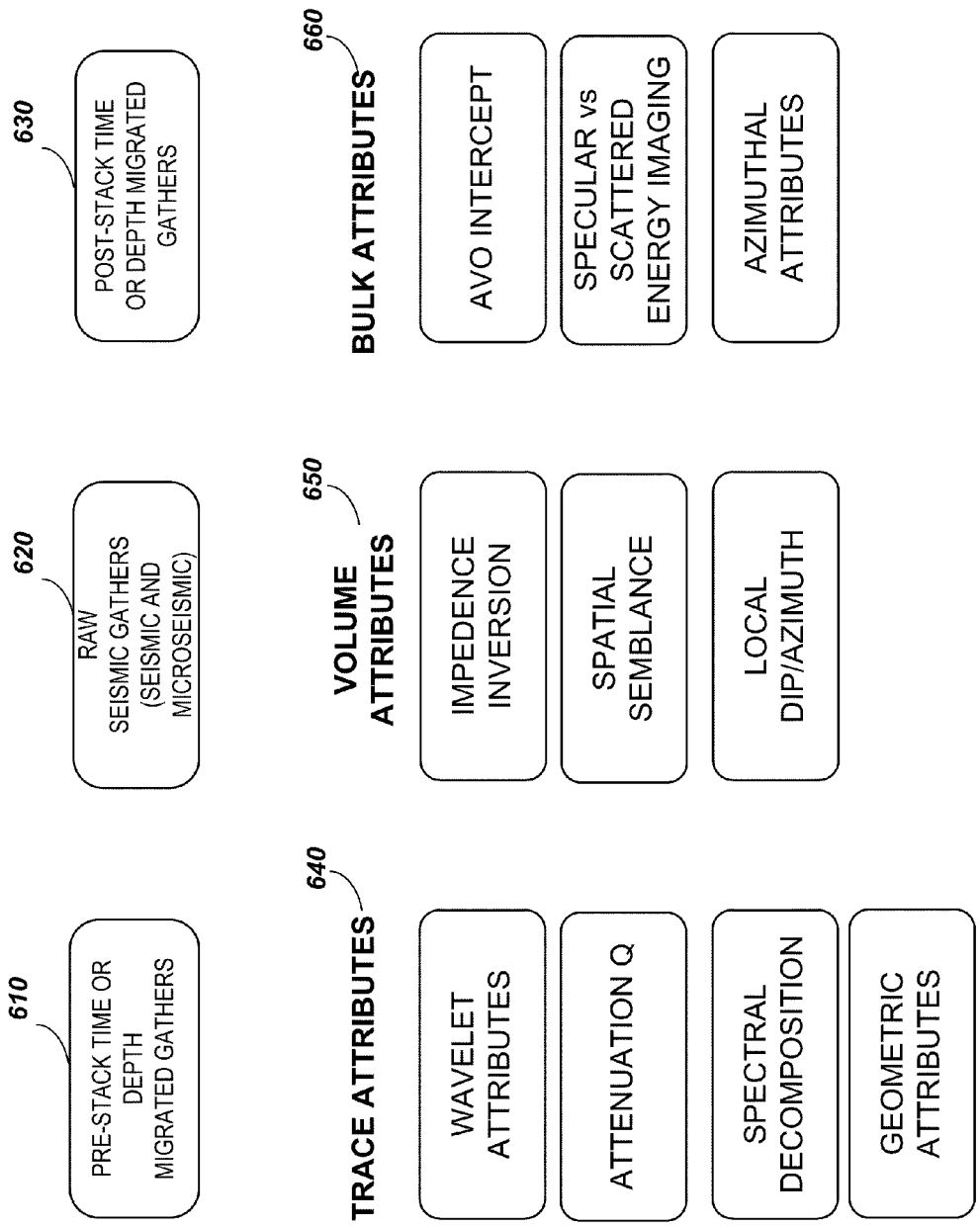
FIG. 6 enumerates examples of some subsurface volumes and their taxonomy for a prospect.

FIG. 6 enumerates examples of some subsurface volumes (e.g., subsurface volume 220) and their taxonomy for the prospect discussed at 110 in FIG. 1. These subsurface volumes can be analyzed for potential formations of interest as discussed at 115 in FIG. 1. These specifically drive Unit 503 in FIG. 5. The inputs can be broadly classified into six categories, including pre-stack time or depth migrated gathers 610, raw seismic gathers 620, and post stack seismic or depth migrated gathers 630, trace attributes 640, volume attributes 650, and bulk attributes 660. Fracture events in microseismic survey data are typically analyzed using raw acquisition data from velocity or acceleration geophones. Microseismic acquisition gathers present velocity or time amplitudes recorded by receivers over time using variety of acquisition geometries and topologies include star-configuration, rectangular patches and spiral or cob-web type geometries.

The pre-stack time (PSTM) or depth migrated (PSDM) seismic gathers in 610 are obtained by conventional 2-D, 3-D or multicomponent seismic processing sequences that is well known in the art. In some examples of FIG. 1 and FIG. 2, it is preferred that processing sequences for the seismic gathers 610: preserve amplitudes, preserve spectrum, preserve phase, remove ground-roll and other out-of-formation coherent noise, do not apply denoising transformations to remove random in-formation noise, use high density tomography grids for velocity estimation, process data at the acquisition sampling resolution, and remove traces that are highly spectrally attenuated.

Post-Stack time or depth gathers of 630 can be processed according to FIG. 1 but, in some examples, voxelization described in the process 700 introduces artifacts.

Raw gathers 620 can be processed according to process 100 in FIG. 1. In some examples, the raw seismic gathers best use is in a confirmatory mode when trying to predict drilling outcome prior to actually drilling. If a prospective well has been positioned at the prospect (using the systems or techniques disclosed herein or using another conventional method and a second opinion is desired to see what outcome can be expected) then the raw seismic gathers 630 or acquired raw seismic traces can be used to estimate rock and fluid properties at the prospective well.

Inputs to 220 can be derived using one or a combination of post-stack trace attributes 640 include that include wavelet attributes, Instantaneous attributes 642 such as an instantaneous phase volume or an dominant frequency, or an envelope response volume, can be used according to the systems and techniques disclosed herein to answer questions specific to structural stratigraphy and facies modeling. There are over 50 standard geometric and wavelet-based post-stack attributes that can be generated using commercial software packages. Other trace attributes, include attenuation Q attribute volume 642 and spectral decomposition attribute volume 646. Trace attributes 640 can be used according to the systems and techniques herein to improve signal to noise of a specific attribute or focus on a sub-region with prospect of interest.

Volume attributes 650, include full volume attributes such as impedance inversion 652 (i.e., simultaneous pre-stack inversion). Volume attributes 650 also include local dip/azimuth 654 actually take a subset of neighboring seismic around each location of interest in the prospect when predicting reservoir properties at a new location. Volume attributes 650 also include spatial semblance 656, which can be used to highlight subtle discontinuities in seismic volume that stem from faults and complex dips. Volume attributes 650 can be used to conduct quality control on the results produced, for example, at 160 in FIG. 1 and to address reservoirs with known structure challenges, such as complex dips. Volume attribute 650 can also be used for analyzing clastic or sandstone reservoirs which includes laminates, channel sands, levies and bars.

More complex pre-stack derived attributes in 660 such as AVO attribute (including AVO Intercept, AVO Gradient, AVO curvature and derivatives known to one skilled in the art), a specular versus scattered energy imaging attribute 664 or azimuthally-sectored attributes 666 are applicable to analyzing for complex carbonates, fracture reservoirs, and prospects with known anisotropy. They provide higher signal-to-noise compared to PSTM/PSDM volumes of 610 and also concentrate random noise.

Subsurface volumes can be produced in an industry format such as SEGY, as inputs for further processing in FIG. 1. If any of the attributes in 630, 640, 650 or 660 are used as inputs as in 220, then detailed processing workflow scripts are required to understand how the attributes are constructed, algorithmic parameters used in their production and any smoothing operators that may have been applied.

Figure 7A:
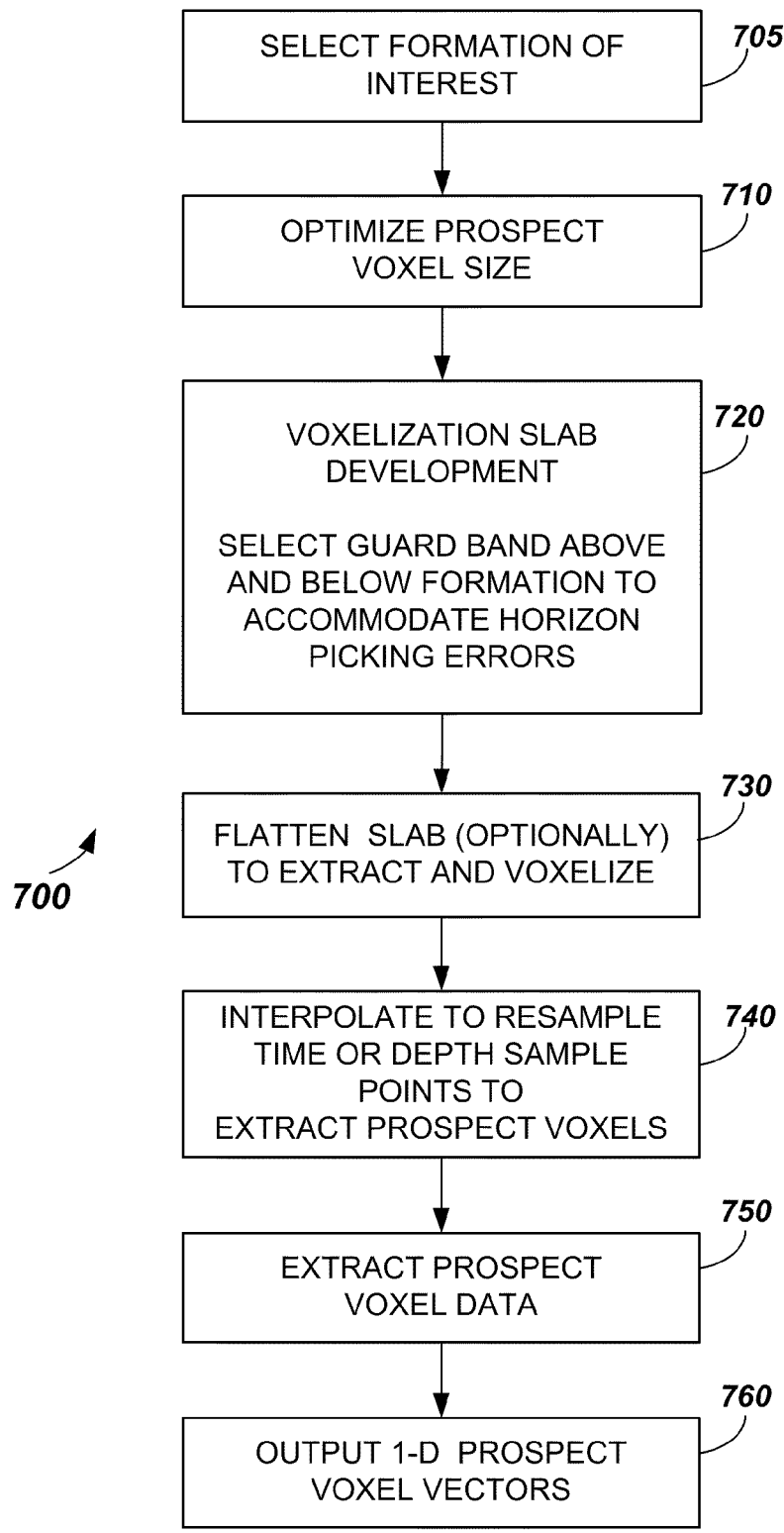
FIGS. 7A-7B show examples of processes for voxelizing seismic and/or microseismic data for a formation of interest.

FIG. 7A shows an example of a process 700 for voxelizing seismic data for a formation of interest. An offshore or an onshore prospect can have several formations at varying depths hypothesized to be hydrocarbon bearing. For example, a multi-formation geological cross-section can have hydrocarbon formations such as a Grayburg Sandstone (at 5000 feet), a ClearFork at 6200 feet depth, a Spraberry at 8300 feet, a Wolfcamp Carbonate at 9800 feet, an Atoka limestone at 12600 feet. In this example, each of these formations of interest is independently analyzed and processed using the process 700 in FIG. 7. At 705, a particular formation of interest (e.g., a Clear Fork) is selected from, for example, multiple formations of interest in a seismic volume. Bounding horizons (e.g., a top and bottom horizon) are determined for the selected formation of interest. Horizons are edges on a seismic image or form a vertical cross-section. The bounding horizons can be determined using a conventional n automatic horizon picker software program based on one or more techniques, such as conventional reflection amplitude, coherency attribute, impedance inversion, or spectral decomposition. The bounding horizons can also be determined using sonic well log derived wavelets or vertical seismic profiling (VSP) or cross-bore hole seismic to manually pick a top and bottom horizon for the formation of interest. In some examples, the seismic data obtained at 110 can be obtained, such as from another geophysical or petrophysical software application or another computing device, preprocessed with the top and bottom horizons determined. In some example, seismic horizons can be derived using seismic attributes such as Reflection amplitude volume; Amplitude versus Offset (AVO) attribute volume (gradient, intercept, fluid factors etc); Amplitude-versus-angle (AVA) volume; instantaneous phase; etc. One or more of these attributes can be inputs into the voxelization process 700. All seismic attributes enumerated in 630, 640, 650 and 660 can be derived from a starting pre-stack time migrated (PSTM) gather volume or a pre-stack depth migrated (PSDM) gather volume. The PSTM/PSDM gathers could have been be migrated isotropically or anisotropically depending on the structural complexity, or formation anisotropy (fracturing).

At 710, voxel size for the formation of interest is set to. For example, a PSTM volume with 1 ms sampling and 25 m by 25 M bin size can be analyzed using voxel dimensions of 12.5 m by 12.5 m by 10 m or 25 m by 25 m by 1 ms, by re-gridding and reprocessing the data to 12.5 m by 12.5 m. The vertical depth or time dimension is set to the sampling resolution for voxel depth. The actual traces are resampled to 5× times the sampling interval. Also, the volume is re-binned to 2× the common depth point (CDP) resolution. CDP denotes a common reflection point for dipping reflectors and complex velocity fields generated using seismic acquisition survey. For computational and cost reasons, it is possible to proceed with voxels at the CDP binning resolution or even 2*CDP by 2*CDP resolution by sampling resolution.

In some examples, notwithstanding the accuracy of horizon determination, guard zones above and below the horizon in 720 are developed. Guard zones are used to offset upstream processing errors, suboptimal statics solutions, process-to-processor variability, and/or limitations in the seismic velocity model estimation, which may have led to inaccuracies in the input volume in 705. Seismic velocity model are a list of pairs (time/depth, velocity) for a given location in the subsurface where velocity analysis has been done. The analysis of various attributes, such as porosity continuity properties of the formation of interest, using the systems and techniques disclosed herein (e.g., the analyzing at 125 in FIG. 1), yields structurally more refined reservoir attribute volumes with revised horizon boundaries.

Guard zones in 720 can be selected based on the thickness of the formation of interest. For example, if a formation of interest is less than 20 ms (depth measured in time) or 200 feet gross thickness (depth measured in feet) then guard-zones can be selected to be +/−8 ms or +/−40 feet respectively to ensure horizon event tie errors and small polarity shifts are accounted for. If the formation of interest is greater than 20 ms gross thickness or greater than 200 feet then guard-zones are selected at 20% of horizon thickness. For small formations, (less than 60 feet thickness) two guard zones are set to a combined thickness that at least matches (is at least 100%) the formation thickness.

In some examples, guard-zone thickness can be determined to be 10 times the upper bound of seismic velocity model estimation error bounds, reported during PSTM/PSDM processing of seismic data, for depths shallower than 10,000 feet and 20 times the velocity estimation error for deeper depths to compensate for imaging errors. Also, it is assumed that formation dips and structural complexity is properly accounted for in the seismic horizon development process.

At 730, once the guard zones have been established, the horizons including the guard zones can optionally be flattened to a fixed time/depth value using a flattening operator to produce a flattened slab. In some examples, analysis in 740 can also proceed with an unflattened formation of interest with upper and lower bounds and guard zones. Horizon Flattening, through time or depth shifts, is a standard utility operation available in most geophysical software packages At 740 seismic traces are interpolated. A seismic trace represents the response of the elastic wavefield to velocity and density contrasts across interfaces of layers of rock or sediments as acoustic energy travels from a source through the subsurface to a receiver or receiver array. All seismic traces (components of a PSDM/PSTM seismic volume) in the flattened slab are interpolated to report amplitudes at 5 times the sampling rate. For seismic data in the slab having low resolution surveys with processing sampling rate of 2 ms resampling at 10 times the PSTM/PSDM processing sample rate is implemented.

At 750, voxels are extracted in the formation of interest with a flattened horizon. Common midpoint (CMP) gathers in the seismic data in the slab are partitioned into "mini-bins" to allow processing at 2×, 3× or 4× up-scaled areal resolution of conventional survey design resolution. For 3D seismic survey, the large bins sizes are preferred and designed to satisfy spatial aliasing criterion (given by $$\text{bin size} \leq \frac{v}{4 \cdot f \cdot \sin\xi}$$

where v is the minimum velocity,
f is the maximum frequency of the seismic signal
and ξ is the maximum reflector dip.

Traces are stacked within mini-bins. Areal resolution can be increased with high offset acquisitions of seismic data to increase areal resolution. Voxels are constructed by combining the amplitude from multiple traces in multiple mini-bins. Grid based on common depth point (CDP) binning is sized, to accommodate at least 4 (2×2) user-sized mini-bins per voxel, prior to any stacking. An example of a voxel size can be 42.5'×42.5', 21.25'×21.25° in areal dimension. In the vertical (time or depth) dimension, examples of a voxels sizes can be 2 ms, 4 ms, and 8 ms (i.e., 8', 16', 20' depth). Traces are interpolated to 0.4× sampling time, e.g., 0.4 ms for 2 ms sampled acquisition. The entire flattened horizon for formation of interest, within the upper and lower horizon guard zones is then extracted into voxels of a targeted size in 750 using software process that copies the seismic amplitudes contained a voxel boundaries to a data structure. Voxels preset a spatial and temporal resolution to which a formation is analyzed. Reservoir attributes are determined by iterative analysis of individual voxels, one voxel at time. For each voxel that is extracted in 750, a spiral unwrapping algorithm is incorporated herein by reference from Gulati U.S. Pat. No. 7,466,851.
is used to transform the 3-D voxel data structure into a 1-D data vector of seismic amplitudes in 760. While both row and column unwrapping, as in from Gulati U.S. Pat. No. 7,466,851 incorporated by reference are applicable, row unwrapping is preferred to minimize aliasing effects.

Figure 7B:
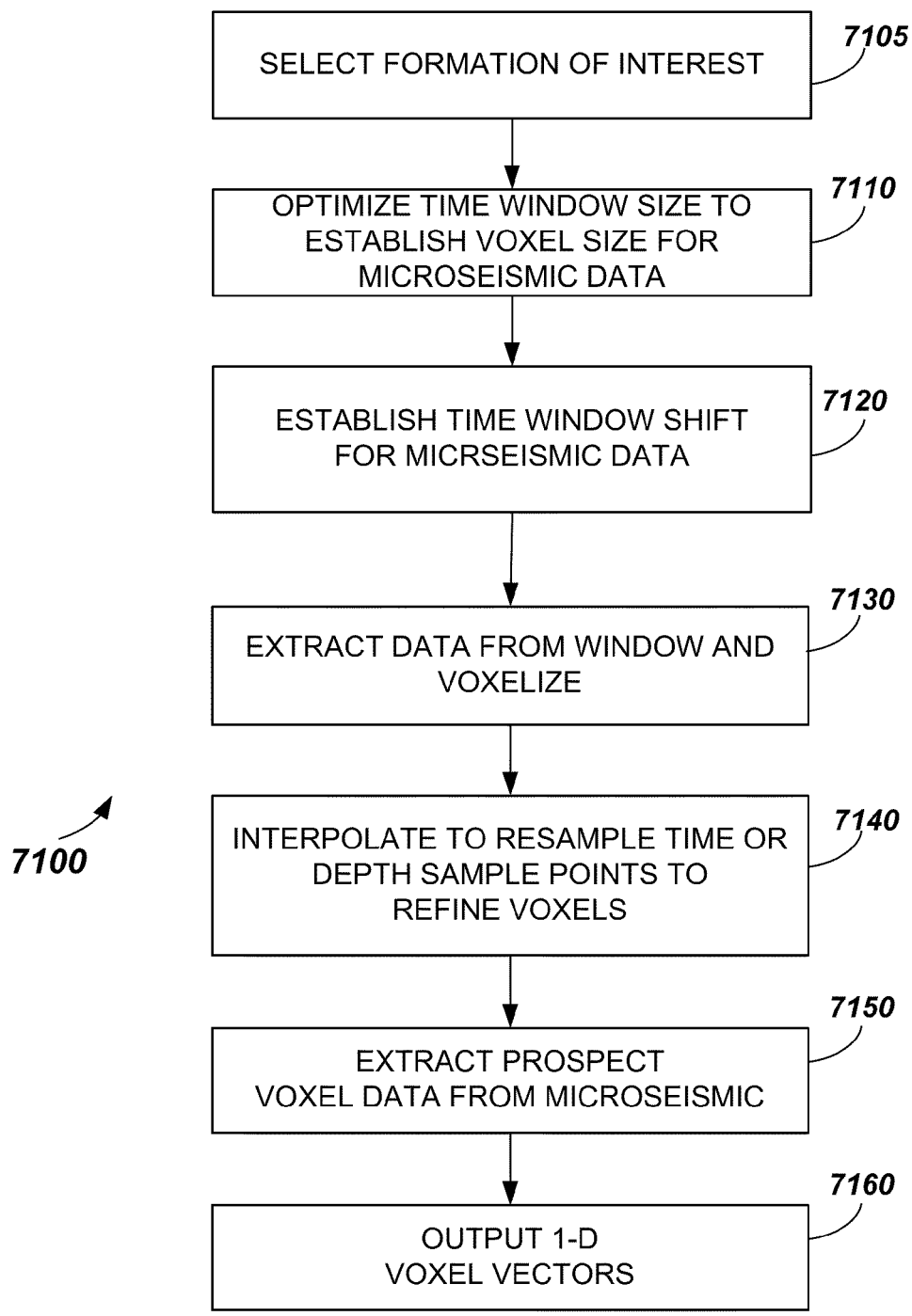

FIG. 7B shows an example of a process 7100 for voxelizing microseismic data for a survey targeted to a well designated for hydraulic fracturing in a formation of interest. An offshore or an onshore prospect can have several formations at varying depths hypothesized to be hydrocarbon bearing. One or more zones can be stimulated using hydraulic fracturing at one or more stages. At 7105, a particular formation of interest (e.g., Escondido sandstone) is selected from, for example, multiple formations of interest in a microseismic survey volume. Microseismic traces may range from few milliseconds to several seconds and in some cases hours or days of data. This data includes velocity or acceleration arrival amplitudes over time sampled at durations ranging from 1 ms to 10 ms. Individual subsurface fracture events, depending on the lithology and geomechanical rock properties, can be persist over few to 10 s or 100 s of milliseconds; the arrival amplitudes are analyzed in an windowed manner. Time windows for analysis of microseismic data using methods described herein range from 30 milliseconds to few seconds of data.

At 7110, voxel size for the formation of interest is set to the optimal window size depending on estimation of fracture event properties and duration of well stimulation protocol. At 7120, time-window shifts are established. Time-window shifts include a number of sample points by which each time-window is shifted to generate successive voxels. Window-shifts can range from 1 sample point to 10000 sample points or 1 ms to 1 seconds. Shifts larger than 1 second can be used for slow or long duration events but often result in missing subsurface fracture events that occur close together in time.

At 7130, recorded acceleration or velocity amplitudes are extracted from the time windows to develop 1-D voxel data. Voxel data for microseismic analysis is in the form of acceleration or velocity arrival amplitudes over some time duration. At 7140 seismic traces are interpolated. This is an optional step used in low resolution surveys that deploy coarse time grids such as recording data every 10 ms. At 7150, voxels are extracted in the formation of interest to a data structure that preconditions microseismic data for interferometry processing. The result is output 7160 as 1-D vectors with length corresponding to size of time window selected in 7110.

Figure 8A:
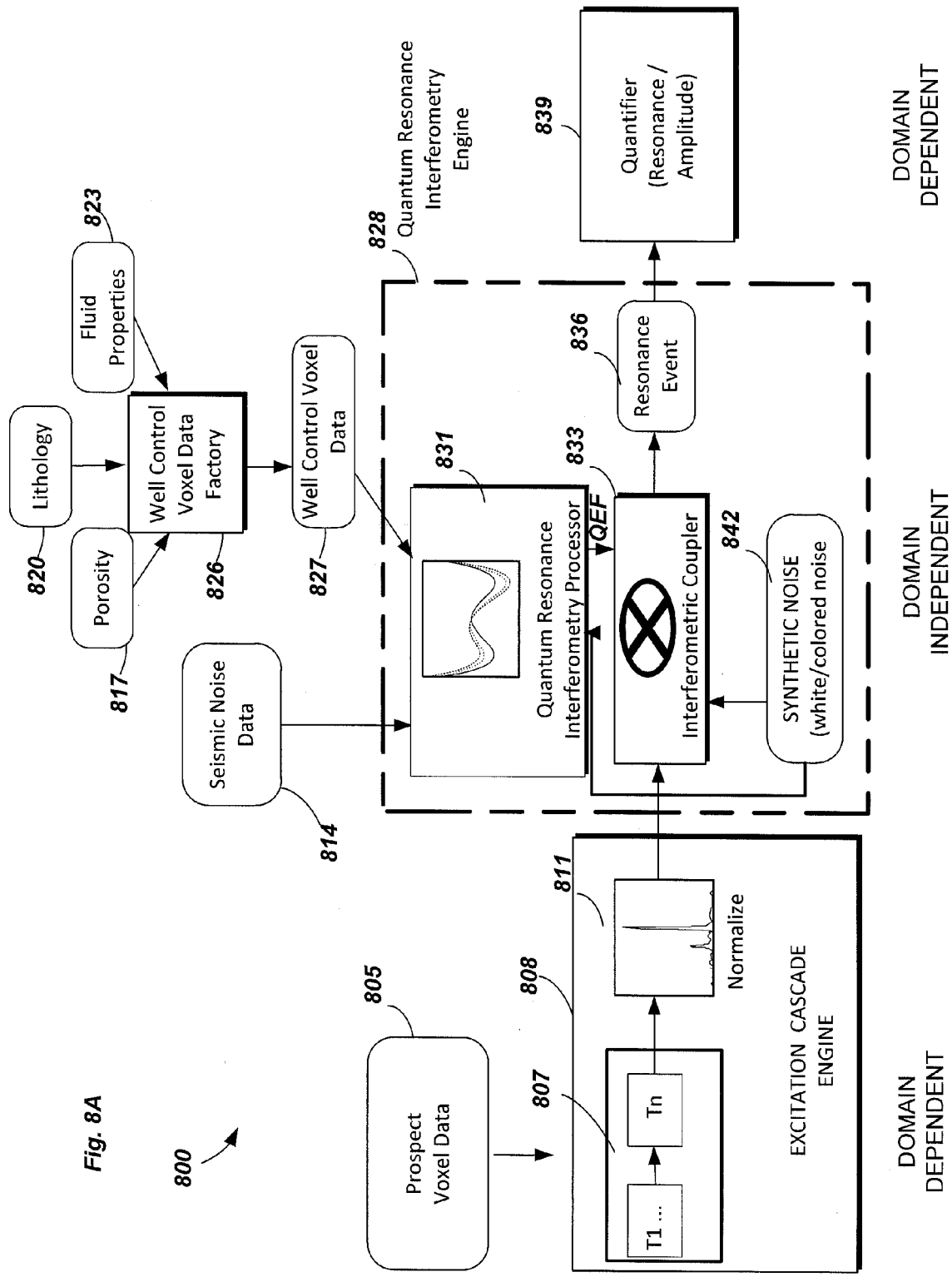
FIGS. 8A-8C show an example of a work flow for analyzing voxelized data from seismic and/or microseismic data acquisition surveys.

FIG. 8A shows an example of a work flow 800 for analyzing voxelized data using quantum resonance interferometry processing. Machinery, such as excitation cascade engine 807, RI processor 831, well control voxel data factory, interferometric coupler 833, and quantifier 839, described in connection with FIG. 8A represents an example of the analysis performed at 125 in FIG. 1. The machinery can be implemented by a computing device such as a data processing apparatus. For example, the machinery can be implemented as computer code that when run by a processor performs the functions described in connection this machinery. In some examples, the machinery can be implemented as computer modules receiving inputs and producing outputs. Such computer modules can be implemented on the data processing apparatus. In some examples, the functions performed by the machinery can be performed by multiple computing devices, such as multiple computing devices connect through a network.

The work flow 800 has multiple inputs, including voxel data 805 derived from a spectral decomposition on a PSTM or PSDM amplitude volume, seismic noise data 814, petrophysical well log data, including porosity data 817, lithology data 820, fluid property data 823, and computer generated synthetic noise 842. The computer generated synthetic noise 842 drives the resonance interferometry dynamics which lead to resonances when the incoming voxel data has an attribute of interest such as rock and fluid properties of interest.

The voxel data 805 can be a finite-length 1-dimensional output vector, including spatial frequency amplitudes, produced by process 760 shown in FIG. 7. As the input voxel data 805 for the voxels of a formation of interest can be short 1-D spectral sequences with lengths such as <200 data points, they are also referred to as spectral fragments.

The voxel data includes for each voxel seismic data such as seismic amplitudes from a specific spectral decomposition, that is LowF, HighF or PrimeAmplitude volume obtained in FIG. 5 at 560. The voxel data 805 for the voxels in the formation of interest can be analyzed voxel by voxel by the machinery in FIG. 8A according to a geometric sequence. Various geometric sequences can be used. For example, the sequence can start from any formation corner, and can proceed by way of row major traversal or column major traversal, or by depth major orientation. In some examples, a voxel can be selected for analysis directly from a geographical 3-d arbitrarily shaped body.

In some examples, a sequence can be designed to implicitly capture address and/or the precise coordinates and orientation of the voxel within the formation of interest. In some examples, at step 120 in FIG. 1, a copy of the voxel data for the voxels is made where the analyzed voxel data can be output as an attribute volume. At 130, the results of the analysis of the voxel data for the voxels is written back to the same location as the copy. This mirrored read-write operation of voxel input and result ensures that the address of the voxel is accurately preserved.

Figure 8B:
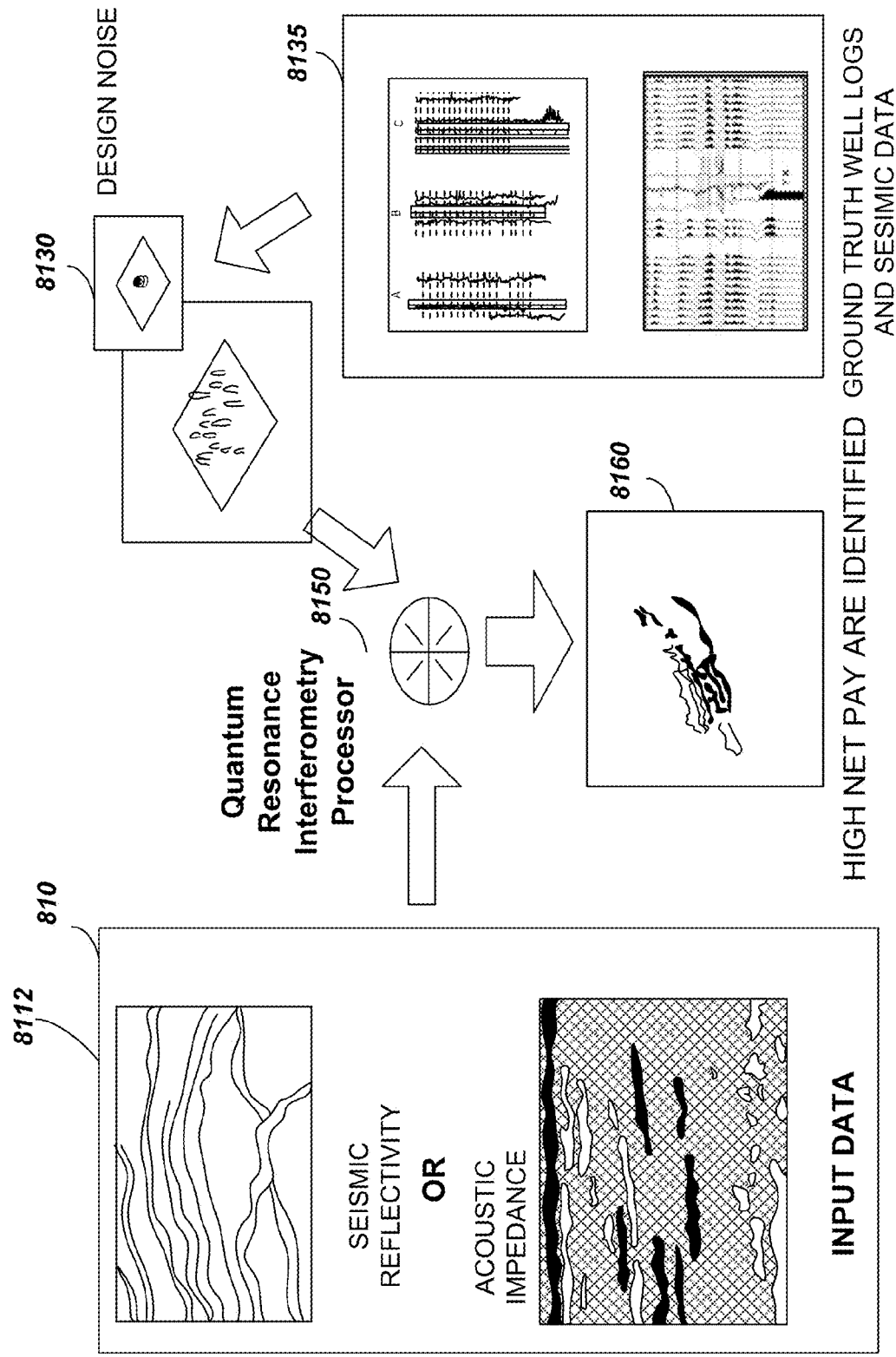
Figure 8C:
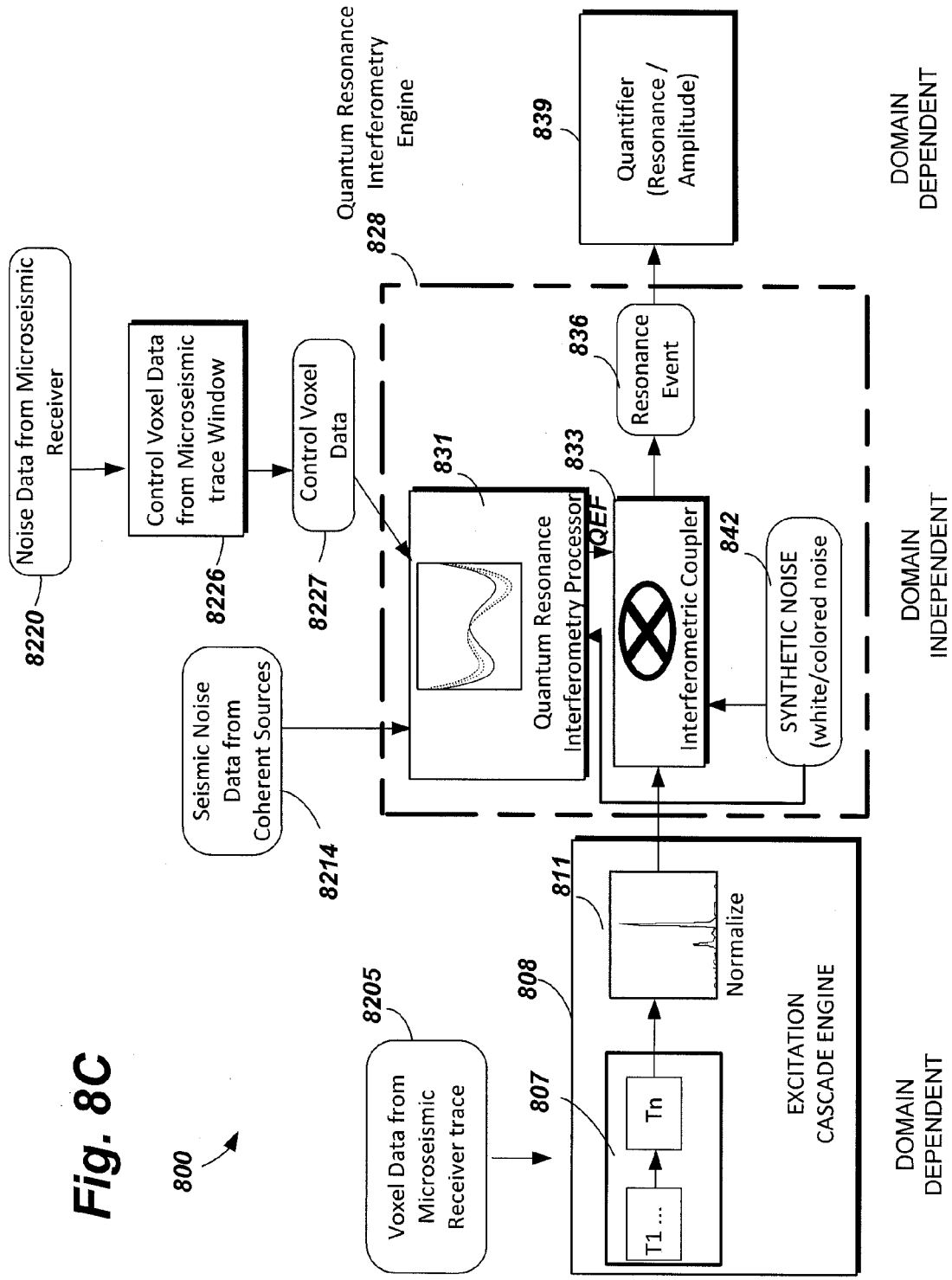

The seismic noise data 814 includes a noise model from amplitudes outside the low and high frequency bands obtained as in 560 and being used in the computation of reservoir attributes. These low and high frequency bands are derived through a procedure detailed in FIGS. 9 through 11 to ensure that the noise model uses information outside the low and high frequency information being analyzed in the voxel data for the voxels. FIGS. 8A through 8B show an example of a process for determining seismic noise data 814. The interferometry engine 828, discussed in more detail below, can have a calibrated signal to noise enhancement of up to 100 times. However, the calibration of the interferometer engine 828 depends upon the amplitudes of the voxels being analyzed. For example, for amplitudes of voxels being analyzed ranging from −16 dB to −22 db, during a noise model design stage shown in FIGS. 9-B through 9-D care is exercised that input value of noise power of the noise band processed by FIGS. 8B-8D is well separated from the −16 dB through −22 dB signal power amplitudes. The interferometry engine 828 can be recalibrated as various decibel ranges are analyzed such as discussed in connection with the waterfall in FIGS. 26 and 27.

Well logs can be selected from analogous, existing wells such as those in the same prospect as the seismic data being analyzed or from other non-local wells that have similar rock types, similar formations, and similar trap construct as the area from which seismic data is being analyzed. As mentioned above, well log data includes porosity data 817, lithology data 820, fluid data 823 (e.g., type and fluid saturation), and rock property data 824 for analogous existing wells. Subsurface sections from such well logs are analyzed to develop a reference model of what different ranges of porosity, percentage of Vshale and fluid type can be expected in the formation of interest. Wells logs for an analogous well can include gamma ray logs, neutron porosity, dipole sonic logs and resistivity logs that represent subsurface sections in the well. Well log sections can show a variability in rock and fluid properties for the analogous well. These well log sections can be, in some examples, 10 feet thick, 16 feet thick, or 32 feet thick in a zone of interest for sampling resolutions of 1 ms, 2 ms or 4 ms, respectively.

A voxel and its attributes is defined by voxel data. The well log data is processed by a well control voxel factory 826. Well control voxel factory 826 produces well control voxel data 827. Well control voxel data (such as voxwells used by ViaLogy of Pasadena, Calif. in QuantumRD 3.0) and their attributes are also defined by well control voxels. Well control voxel data includes data indicative of an attribute of interest derived from sources other than the seismic data that produced prospect voxel data 805 for the formation of interest. For example, in FIG. 8A well control voxel data are extracted for an attribute of interest from seismic data using well logs of known wells with known attributes. In other words, these well control voxels are extracted from the seismic data from a well bore of an analogous well. The well control voxel data can be transformed into 1-D vectors using a normalized excitation cascade transformation that yields a monotonic correlation between their energy spectral density and actual attribute value as described in FIG. 13A through 13D. For example, the well control voxel data can transformed into 1-D vectors using the same process as in FIG. 7 to produce the output 760.

FIGS. 13A through 13D show an example of a process for processing well log data to produce well control voxel data 827 for attributes of interest such as for porosity, Vshale, fluid saturation, and brittleness. For example, for an attribute of interest, such as porosity, energy spectral density is derived from sonic log sections from one or more analogous wells to identify locations of known porosities. Then seismic data corresponding to those locations are identified based on identified locations. Well control voxels are extracted from the seismic data corresponding to sonic sections. For example, in well control voxel data factory 826, sonic logs are used to estimate acoustic impedance changes for regions of interest, such as an area of having a desired porosity, in an analogous well. Wavelet kernel, such as a Ricker wavelet, is used to parameterize the sonic well logs over frequency intervals that are similar to the spatial frequency bandwidth of the Fourier Transforms implemented in transforming voxel data to an excitation cascade in 807 used to develop 1-D voxels for input data in 760. The wavelet kernel uses the same spectral decomposition that generated the amplitude volume that was voxelized in 805 (i.e., as shown in step 540 of FIG. 5). A calibrated well control voxel data represents energy spectral density of the Fourier Transform of wavelet model used to parameterize and model the sonic section in 826. The energy spectral density describes how the energy of a spatial frequency vector, derived from wavelet used in the well control voxel data factory is distributed with frequency. A method for building well control voxel data is described in FIG. 12.

If f(t) is a square integrable finite-energy signal, and the spectral density $\Phi(\omega)$ of the signal is the square of the magnitude of the continuous Fourier Transform of the signal then $$\Phi(\omega) = \left| \frac{1}{\sqrt{2\pi}} \int_{-\infty}^{\infty} f(t) e^{-i\omega t} dt \right|^2 = \frac{F(\omega) F^*(\omega)}{2\pi}$$

where $\omega$ is the angular frequency ($2\pi$ times the ordinary frequency) and $F(\omega)$ is the continuous Fourier transform of f(t), and $F^*(\omega)$ is its complex conjugate.

As the spatial frequencies of the wavelet kernel used to model the attribute presence event as seen in the sonic log section, for a well log section is discrete with values fn, ranging over an infinite number of elements, the energy spectral density for well control voxel data is given by $$\Phi(\omega) = \left| \frac{1}{\sqrt{2\pi}} \sum_{n=-\infty}^{\infty} f_n e^{-i\omega n} \right|^2 = \frac{F(\omega) F^*(\omega)}{2\pi}$$

A Discrete Fourier Transform can be used as a wavelet kernel is of finite length. The energy spectral density is a function of spatial frequency, not a function of time.

Figure 12A:
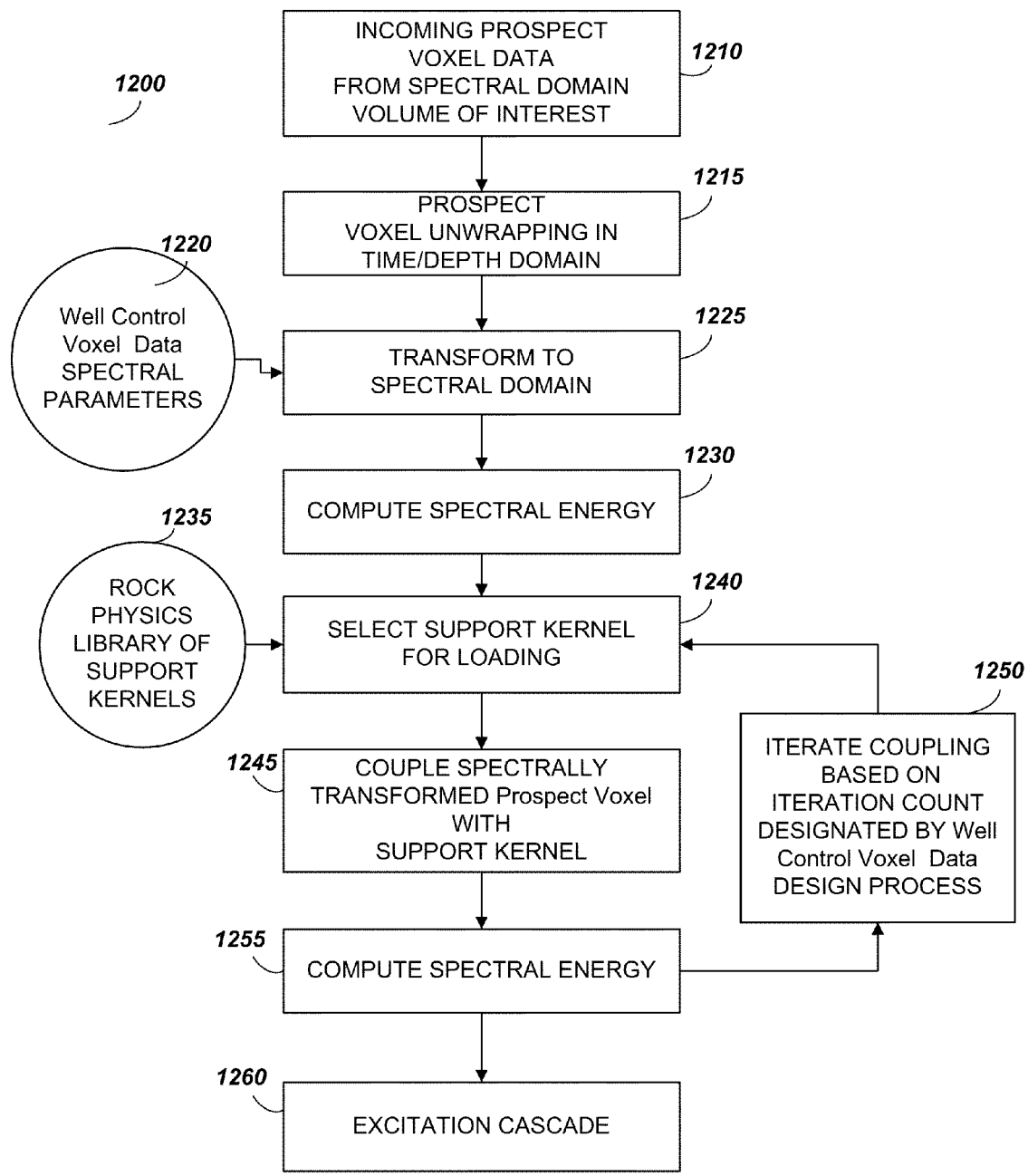

The prospect voxel data 805 is transformed to a 1-D spectral vector by an excitation cascade engine 807 and then is normalized to form a normalized excitation cascade of the voxel data 805. Normalization compensates for high variability in the amplitude values depending on the input seismic volume in selected in 220 and spectral decomposition selected in 540. FIG. 12A shows an example of how the excitation cascade is determined at 808. FIG. 12B shows an example of how the excitation cascade is normalized based on energy spectral density.

The normalized excitation cascade 811 is then analyzed by a quantum resonance interferometry engine 828, such as by the quantum resonance interferometry engine (such as "QRI Engine" produced by Vialogy of Pasadena, Calif. in QuantumRD 3.0). The quantum resonance interferometry engine 828 includes a quantum resonance interferometry processor 831 ("RI" processor) which processes the seismic noise data 814 and the well control voxel data 827 to produce spectral data such as a quantum expressor function ("QEF") 831. FIG. 8 is discussed in the context of a QEF, however, the systems and techniques that involve work flow 800 can be performed using any spectral data, including a QEF. A QEF includes complex noise that is below a threshold required to conclude the presence of an attribute of interest. For example, a QEF can include periodically modulated synthetic noise constructed using seismic data noise 814 that is modulated by a synthetic colored noise and processed through a quantum resonance interferometry processor 831 implementing quantum stochastic resonance (QSR) dynamics.

The quantum resonance interferometry processor 831 combines the seismic noise data 814 and well control voxel data 827 using a master rate equation for a quantum mechanical model to produce, for example, a bistable quantum function and drives the combination through a quantum resonance interferometry engine. Examples of how the RI processor 831 produces a QEF are discussed in connection with FIG. 14 and FIG. 18. Other examples of QEFs are described in further detail in U.S. Pat. Nos. 6,963,806, 7,571,056 and 6,780,589 which are incorporated herein by reference in its entirety.

The interferometry engine also includes an interferometric coupler 833 which couples the normalized excitation cascade 811 and the QEF produced by the RI processor 831, using synthetic noise 842 to drive the coupling. The synthetic noise, such as white noise or colored noise, can be generated by random number generators. For example, a sequence of random numbers can be generated and scaled to fall within a uniform scale. The scale is a defined by a cutoff bound such as +/−10% of an average of the energy spectral densities of well control voxel data derived using well log sections that do not possess the attribute of interest. Well control voxel data deficient in the attribute of interest are defined by negative control voxel data. Well control voxel data derived from well log sections that possess the attribute of interest are defined by positive well control Data. Negative control voxel data used in noise design is obtained using the flow of FIG. 13A, 13B, 13C or 13D depending on the output of interest. In FIG. 11, this cutoff can be set when the interferometric coupler is initialized at 1122. Subsequent initializations can produce different cutoffs for finding resonances at those different cutoffs. This can be used to maintain monotonicity of the resonances. An example of synthetic noise is a sequence of random numbers generated to indicate energy spectral densities of 10% of that of an average well control voxel data. The interferometric coupler 833 uses a quantum mechanical model to couple, repeatedly, the normalized excitation cascade and the QEF to generate quantum stochastic resonance. For example, a nuclear magnetic resonance ("NMR") master rate equation can be used produce QSR. An example of NMR-based QSR implementation performed by the interferometric coupler 833 is presented in FIG. 17 and FIG. 21. In some examples, QSR can also be implemented using Spin boson model, optical cavity model, and SQUID model. Examples of quantum mechanical models are described in U.S. Pat. Nos. 7,567,876 and 6,780,589 and 6,920,397 which are incorporated herein by reference.

The interferometric coupler 833 represents an active nonlinear coupling between prospect voxel data and an expressor function designed using combination of synthetic noise and seismic derived noise. Purpose of the computation is to track whether the incoming prospect voxel data and expressor function can couple to produce new information termed as resonance events. This interferometric coupling to produce resonances can be implemented as using a nonlinear interaction between prospect voxel data and any spectra datatype defined herein as an expressor function. Nonlinear operators that can be used to implement expressor functions to produce resonance events include stochastic resonance, quantum stochastic resonance, quantum resonance interferometry, monotone potential operators, quasi-linear elliptic differential operators, angle bounded operators, Galerkin operators, nonlinear information filter and extended kalman filters. Any semi-group operator that implements a nonlinear embedding function can be used as well.

If an attribute of interest is found in the normalized excitation cascade of the voxel data, then a stochastic resonance 836 will occur when the QEF function for that attribute of interest is coupled with the normalized excitation cascade. Resonance 836 can indicate the presence of that particular attribute of interest. In some examples, as described in FIG. 17, the interferometric coupler implements a Master Rate equation describing the time dependent evolution of a system capable of exhibiting NMR. When resonance occurs due to quantum tunneling events, as simulated within 833, the output is recorded and reported as a resonance event in 836. Also, a transformed and enhanced data vector is output in 833. The enhanced data vector is the result of modification of normalized excitation cascade through interferometric coupling at 833 with the QEF from 831. The quantifier 839 implements an rms (root mean square) amplitude summation to generate a resonance amplitude for the voxel being analyzed. The quantifier 839 can determine that an attribute of interest is found in the voxel when the resonance amplitude value is above a pre-established threshold. Also, at 839, the resonance data can be quantified to produce an indication of the amount of the attribute of interest that is found in the voxel. For example, a resonance in 839 may indicate presence of oil, gas, or water in a voxel derived from a specific region in the formation of interest.

FIG. 8B shows an example of a work flow described in FIG. 8A to compute a porosity attribute volume and highlight sections of the formation of interest that are above a prespecified porosity threshold (e.g., 20%) as in 8160. Input data 8110, including pre-stack migrated seismic reflectivity amplitude volume 8112 in time or depth, or an acoustic impedance seismic inversion in 8114 are processed according the process 100 in FIG. 1 to produce voxels at 120. Also, the reflectivity volume 8112 and/or the acoustic impedance seismic inversion 8114 are extracted using the methods 500 and 700 of FIG. 5 and FIG. 7, and transformed into a normalized excitation cascade as discussed in connection with FIG. 8A at excitation cascade engine 808. Also, well log sections 8135 are derived from the wells from the same prospect from which the input data 8110 was obtained to develop porosity well control voxel data using the method 1300 described in FIG. 13-A. Design noise 8130 is the result of combining the synthetic noise and well control voxel data for log sections of interest. Design noise 8130 represents the output of the RI processor 831 in combining seismic noise and well control voxel data to develop a model that is used by the interferometric coupler 833 to analyze voxel data derived from the input data 8110 using. Map 8160 represents a vertical section of a porosity-cube volume derived from the results of individual voxel result assembly as contemplated by 160, and furthermore achieved by combining the results of 839 using the porosity workflow process described in FIG. 19-A.

QRI processor 831 in FIG. 8-A combines amplitude and phase information derived from seismic noise data 814 derived from spectral decomposition of PSTM/PSDM gathers or other attributes identified in FIG. 6 with well control voxel data 827 to produce a quantum expressor function ("QEF") to the interferometric coupler 833. The interferometric coupler 833 couples incoming voxel data 805 (that has been transformed as in 811 to the same 1-D representation and vector length as the 1-D QEF vector output by the QRI processor 831) to generate resonance indicative of the presence of reservoir attribute of interest such as porosity. The seismic noise data of 814 sets a energy spectral density threshold that must be exceeded by the output of the interferometric coupler 833 to produce a resonance event 836. The threshold is specified to indicate absence or presence of an attribute value from seismic above a threshold for that attribute of interest. The outputs of the excitation cascade engine 808 and the QRI processor 831 combine in the interferometric coupler 833 to produce enhanced data vectors and with resonance events to together provide basis for detection and quantitation of rock or fluid properties for a formation of interest.

FIG. 8C shows the process of FIG. 8A as applied to microseismic data analysis. As shown in FIG. 8C, the well control data is replaced by microseismic data collected prior to onset of fracture events to establish noise parameters specific to the survey of interest and limited to the number and types of receivers used at the microseismic survey site. For example, at 8220 noise data, collected prior to hydraulic fracturing from microseismic receivers is used to develop control voxel data including control voxels at 8226. Control voxel data 8227 include parameters for detecting events of interest that are distinct from coherent and random noise in the microseismic dataset. Control voxels 8227 are derived from the control windows in the microseismic reference data using method of FIGS. 6 and 7, (i.e., data acquired prior to start of hydraulic fracturing are used to develop control voxels 8227) to establish baselines for noise and amplitudes that are not indicative of fracturing events. Microseismic dataset includes hydraulic fracturing protocol that details the time when hydraulic fracture process is started. Control voxels can be derived from the time windows collected prior to the start of hydraulic fracturing (also denoted as "frac").

Additional inputs in 8214 include time windows during which coherent sources of noise are recorded. These are derived by processing the raw microseismic data in conjunction with Observer Logs (or field notes from equipment operator). Observer Logs are field note that summarize the conditions under which data is recorded. These may include observations related to, e.g., aircraft overflight, variations in wind-conditions, traffic in the vicinity, other machinery operating in the vicinity of the survey, such as pumping equipment on wells on the prospect. Coherent noise sources can produce acceleration and velocity amplitudes in the same spectral regimes such as fracture events and lead to interference and signal degradation. Seismic noise 8214 provides reference examples of windows with low or high coherent noise that is used in false alarm rejection. Low noise amplitudes would be below 70 dB while amplitudes between −70 dB and −30 db would be considered high.

Figure 9A:
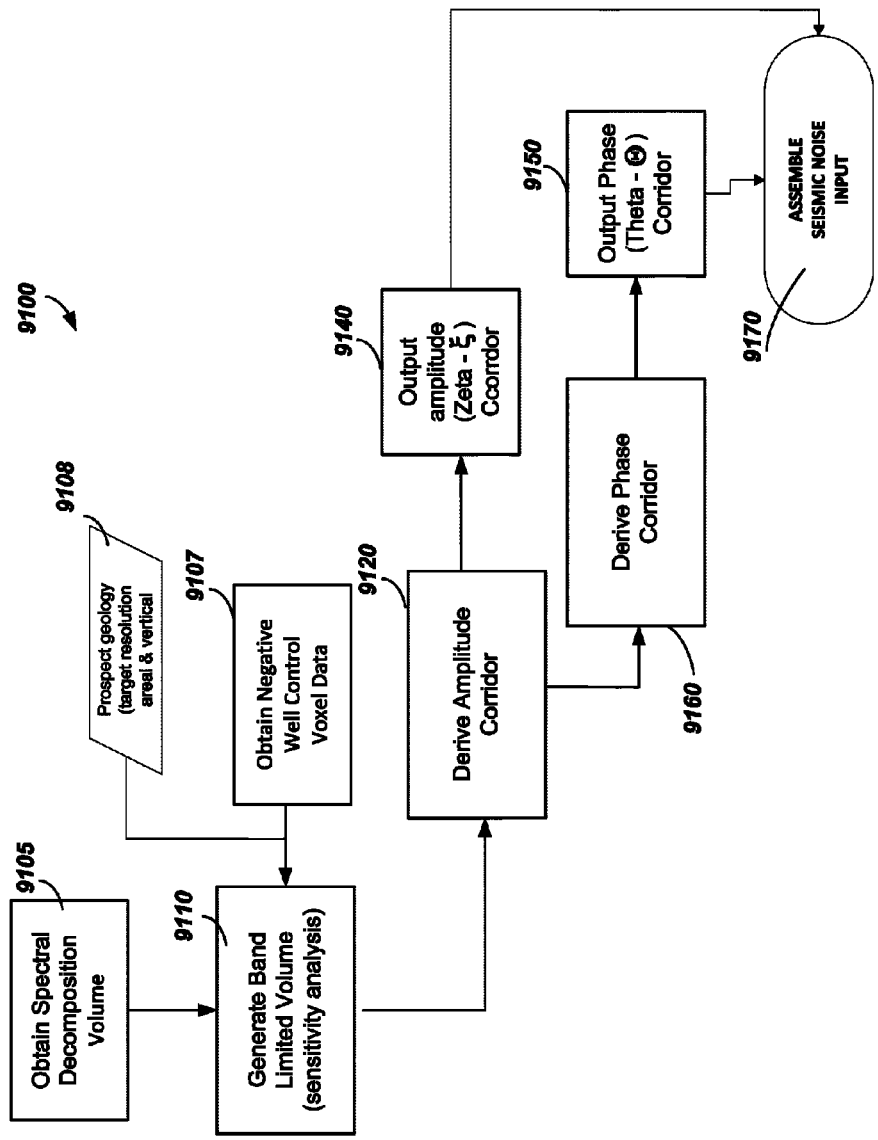

FIG. 9A shows an example of a process 9100 for determining seismic noise data 814. At 9105 a partitioned seismic volume is obtained. For example, the results of process in FIG. 5 implements spectral decomposition computation to produce partitioned seismic volumes 560 in low frequency, high frequency, and prime amplitude regimes, which are inputs to the noise design process 9100. These are also referred to as spectral decomposition volumes. The process 9100 is independently applied to the low frequency, high frequency, and prime amplitude regimes to generate low frequency, high frequency, and prime amplitude seismic noise, one of which is used in the process flow 800 specified in FIG.

8A depending on the nature of the amplitude volume input 9105, also referred to as a spectral decomposition volume of interest. For example low frequency noise is used in the determination of fluid saturation or type of fluid—oil, water or gas. High frequency noise is used in the computation of Vshale to generate lithology attribute.

Also, a target resolution for the prospect under consideration is obtained at 9108. This is set by the client requirements, geology, and/or knowledge of the prospect, constrained by seismic data acquisition hardware settings and seismic survey design. In some examples, the resolution requirements obtained at 9108 can be the same as set in 510, 512, 514 and 516. The target resolution can include both a target areal resolution and a target vertical resolution for an attribute of interest such as porosity.

At 9108, well control voxel data are obtained using the regions from known, analogous wells on the prospect that do not meet cut-off threshold criteria for an attribute of interest. For example, in a porosity workflow implemented to estimate porosity for a formation ranging, with expected values of porosity ranging between 5% and 20%, sections of well log with porosity below 5% are used to obtained well control voxel data using the process described in FIG. 13A. As previously defined, well control voxel data obtained using well control voxel data from wells that do not contain the attribute of interest are referred to as negative control voxel data.

At 9110, band limited volume regimes are selected. The partitioned volumes are sub-banded into small frequency bands to estimate the sensitivity of amplitude and phase sensitivity changes in the partitioned seismic volume. Once sensitivity analysis 9110 is completed, noise can be appropriately designed to be consistent with the negative control voxel data amplitudes driving the computation for an attribute of interest.

At 9120, an amplitude corridor is determined to estimate the variation in voxel data amplitudes for a partitioned seismic volumes due to inherent seismic noise. This provides parameters for an amplitude to be used in noise design which is used by the quantum resonance interferometry processor 831 and 1022. At 9160, a phase corridor is determined. This provides parameters for phase of noise design which will be subsequently used by the quantum resonance interferometry processor 831 and 1022.

Figure 17A:
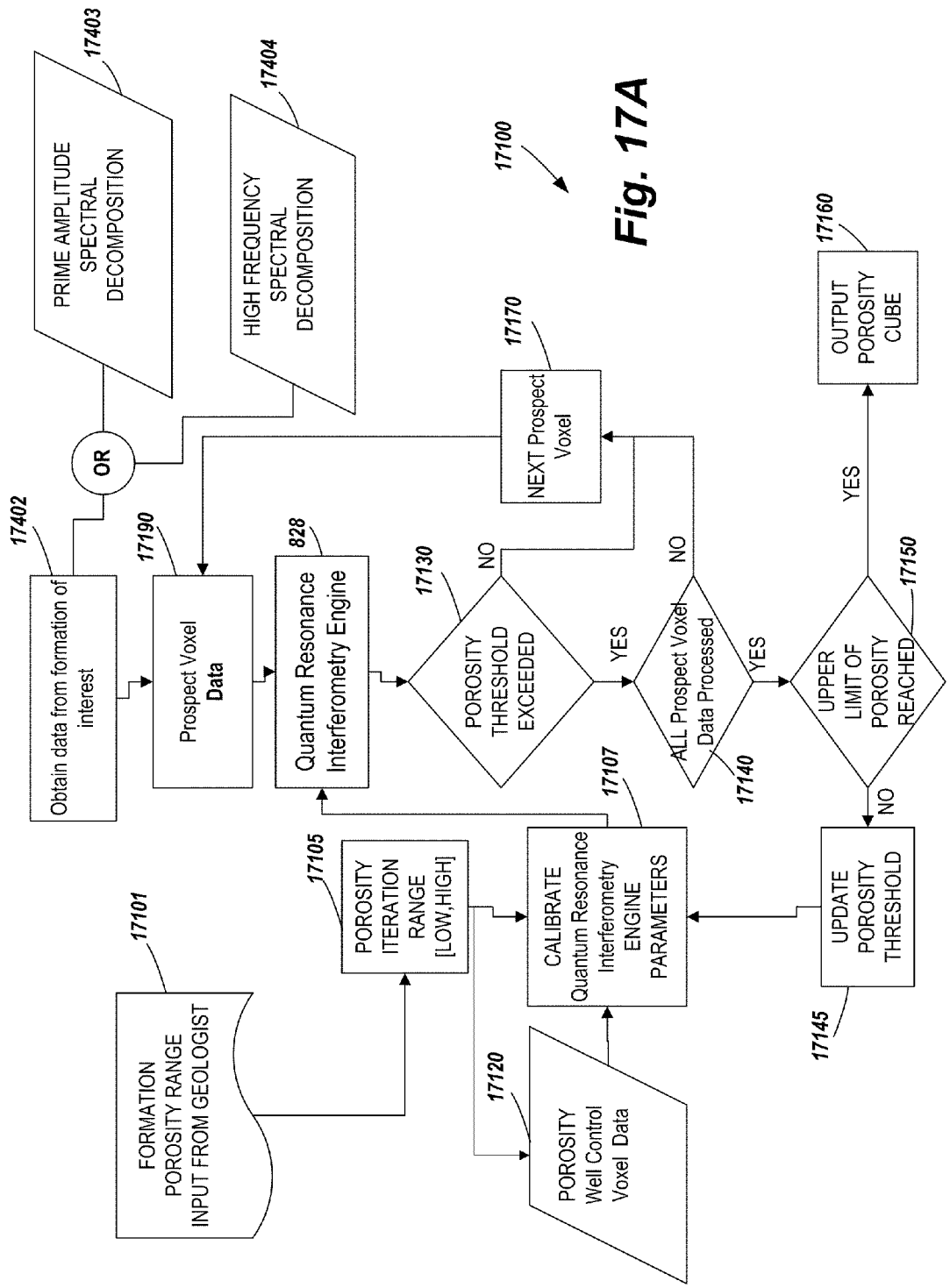
FIGS. 17A-17D show examples of a processes for computing attribute data from seismic data.

Steps 9110, 9120, and 9160 are described in more detail in FIGS. 9B, 9C and 9D. Steps 9110, 9120 and 9160 determine variation in amplitude of all prospect voxel data in 805 under certain conditions of interest, and determine variations in phase polarity of amplitudes in seismic partitioned volumes under the same conditions of interest. Variability in both the amplitude and phase of the partitioned seismic volumes in specific regions of well on the prospect is used to develop a seismic derived noise 814 used in FIG. 8A and FIG. 10. For example, log sections with porosities below 4% are used to develop noise amplitude and phase parameters if the objective of porosity attribute workflow in FIG. 17A is to find regions of porosity over 4%.

At 9108, higher spectral fidelity in seismic derived noise computed using an instantaneous spectra amplitude and phase attribute enables higher resolution of seismic rock and fluid attributes. Synthetic wavelets are used to test against well logs to establish frequency boundaries required to resolve spatial features for specific depths. For example, frequencies at formation depths of interest around 100 Hz can resolve seismic reflections separated by 16 to 20 feet.

Steps 9110, 9120 and 9160 use a sub-banding operating to analyze frequency sub-bands of seismic partitioned volumes, implemented using variations of the Gabor-Morlet Transform Method which is available in conventional seismic processing software tools, to produce narrow-band analytic traces. The sub-banding operation is performed in 9120, 9120 and 9160 for different reasons. Sub-banding in 9110 is performed for the purposes of analyzing frequency sensitivity of changes in seismic amplitude changes and seismic phase changes in partitioned seismic volumes. Sub-banding in 9120 and 9160 is performed to developed corridors or maximum variation that can be tolerated due to random, in-formation seismic noise. The amplitude and phase of each narrow band filtered output obtained applying a Gabor-Morlet Transform Method represents an average amplitude and phase of the narrow-band part of the trace. Sub-band window or a 2 Hz to 4 Hz separation between sub-bands derived from partitioned seismic volume, is an example of a user setting. The number of sub-bands (k) is derived by dividing the frequency bandwidth of the starting partitioned volume by sub-band window. Then k-Gabor-Morlet kernels are applied to the entire partitioned seismic volume to produce k-sub-band traces. The sub-band trace volumes are used at 9120 and 9160 to output zeta-amplitude and phase corridors as detailed in FIGS. 9-B and 9-C which represent the details of 9160 and 9140.

In FIG. 9B an amplitude corridor is selected using sub-band volumes generated at 9110 to perform sensitivity analysis and assess variation of noise intensities. An amplitude corridor is selected by recombining sub-bands volume amplitudes produced applying Gabor-Morlet Transform Method discussed above, if the energy spectral density is unchanged in the well log sections of a well used for developing well control voxel data.

The output at 9250 establishes the sub-bands that will be used in the noise amplitude and noise phase parameter computation at 9170.

A standard complex discrete wavelet transform (CDWT) is used at 9210. For one skilled in the art, a CDWT separates the angular information in the seismic data and the polar scale. The directionality of CDWT transform is obtained by the projection of the wavelet coefficients onto positive and negative frequencies separately. The transformed data results in a complex wavelet transformation with a quasi-quadrature relationship between its real and imaginary parts and with strong directional selectivity, important for ensuring sufficient energy and directional selectivity. The CDWT is applied at 9210 to generate multiple (some integer k number of) sub-bands. Once the sub-bands have been generated, as an example those separated by 2 Hz or 5 Hz, are used to assess noise sensitivity.

At 9220, a normalized amplitude attribute is computed and used as an input in the computation of an instantaneous phase attribute which outputs a cosine of the instantaneous phase angle of seismic traces within the seismic partitioned volume. Operation in 9220 amplifies the phase component of the compression seismic wave-propagation responsible for reflection amplitudes acquired in seismic survey. As 9220 provides an estimate of phase velocity, it has no amplitude information and is well suited for noise design.

As in 9230 a region of interest is selected around the wells on the prospect, targeting the formation of interest, and within +/−5 CDP (common depth point) Bins of the well. Values in the instantaneous phase volume of 9220 are smoothened in 9240. Derivative of output of step 9220 is implemented by computing an instantaneous acceleration, and checked to ensure that resulting values in the derivative, range over a small interval, is a fraction (e.g., within +/−50%) of the amplitudes in the spectral decomposition voxelized to estimate rock and fluid attribute computation of 110 in FIG. 1. If the amplitudes in the Instantaneous Acceleration volume of 9240 are outside the +/−50% limit then well list is modified to eliminate well log sections with high "signal content". If 9250 meets satisfies the condition for finding amplitudes within +/−50% of prospect voxel data that do not have properties of interest, such as porosity below cut-off then seismic data can be used to design noise.

FIG. 9C describes a process for estimating noise amplitudes to design seismic noise in 9100. At 9310, a trace sub-band frequency corridor is selected by recombining sub-bands using the same sub-banding transform as used in 9110. At 9320, recombined sub-band volumes are Hilbert transformed and the real and imaginary parts of the output separated at 9330 and 9340. This is accomplished in time domain by applying a complex Butterworth filter. Real part (zero phase) of the filter generates the real part of the seismic trace, thereby ensuring that both the real and imaginary parts will have the same spectral characteristics. A band limited Butterworth filter, is an exemplary filter that satisfies the band limited requirements of the Hilbert transform. The imaginary part of the complex trace has identical amplitude spectrum as the real part. Real and imaginary traces are used to generate the real and imaginary parts used in the analysis described by FIG. 9C.

At 9350, a wavelet envelop operator is applied to assess the variability of the real part of the Hilbert transformed to develop 9340. The instantaneous amplitude value at the maxima of the envelop is computed for sub-band volumes generated in 9340. In parallel, an instantaneous bandwidth is computed for the sub-volume of 9310. The real part of the Hilbert transform output in 9350 is also used to compute the residual of the real part. The instantaneous amplitudes are organized to produce a histogram in 9370 which is used compute residuals for noise in 9380. In some examples, percentages lower than 2% or lower than 5% of the residual noise amplitudes can be used in 9360 to obtain the noise volumes.

In FIG. 9D the optimal trace corridor is selected using sub-band volumes generated in 9410. At 9410, the envelope modulated phase attribute is computed in 9410. Intensities of the instantaneous phase represent the trace envelope magnitude. It is used to assess the phase variation of the strong events, without the interference of weaker events as in the instantaneous phase volume and vice versa. It amplifies the phase component of the wave-propagation. At 9420, an instantaneous phase attribute is computed and its normalized amplitude is used to assess the phase sensitivity. At 9420, a normalized amplitude attribute is computed to generate the cosine of the instantaneous phase angle. Operation in 9420 amplifies the phase component of the wave-propagation. As it provides an estimate of phase velocity, it has no amplitude information and is well suited for noise design.

At 9430, a second derivative of envelope attribute with respect to time is computed. Results of 9430 captures all reflecting interfaces visible within seismic bandwidth. As this attribute is traditionally used in seismic analysis to assess sharp changes in lithology and shows sharpness of event, it captures discontinuities in the data effectively. At 9450, the Time derivative of Envelope attribute is also computed from seismic sub-band volume to assess phase propagation properties. As output of 9450, highlights the sharpness of the rise time relative to absorption of seismic energy, it is more effective in treating phase propagation.

The results of 9450 are again sub-banded at 9460 to understand phase variability in the data. At 9440, the intensities from Envelope 2nd Derivative attribute are correlated to the well control voxel data derived in the vicinity of well log in zones of interest. If the correlation is low, such as below 20% then Envelop 2nd Derivative can be treated to tie the seismic around well control. Once the noise phase and noise amplitude corridors are available using FIG. 9C and FIG. 9D the results are combined to provide noise required to drive the quantum resonance interferometry engine and Interferometric Coupler. These volumes of noise amplitude and noise phase have useful interpretive properties in their attribute; can assist in fault/anisotropy distribution. Results from 9380 and 9450 are combined in 9170 to design noise that is used by the Quantum Resonance Interferometry Processor to generate resonance on incoming, uncharacterized voxel data.

Figure 10:
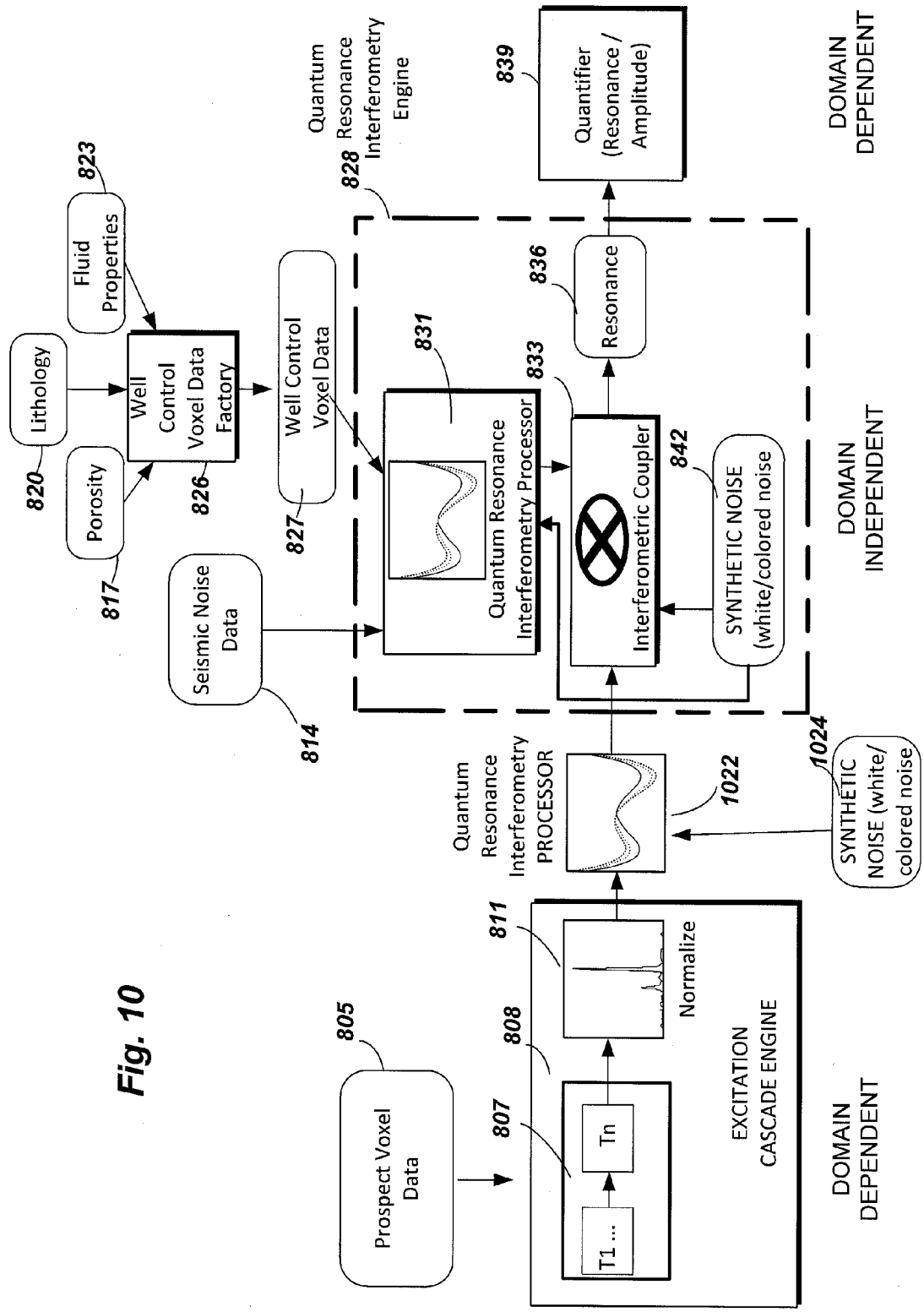
FIG. 10 describes a process for upscaling or upconverting analysis of attributes of interest.

FIG. 10 describes a process for upscaling or upconverting analysis of attributes of interest from one areal/vertical (time and/or depth) seismic resolution to a higher resolution; and to produce multi-scale reservoir attributes (i.e., output at multiple resolutions in the same or different iterations of workflow described in FIG. 1), wherein the same attribute volume of rock or fluid properties are generated at multiple resolutions. This is preformed to enable different applications such as (i) de-risk drilling locations, (ii) drive reservoir-flow and reservoir-state models, (iii) perform geostatistical applications, (iv) designing fracturing/hydraulic Frac protocols, (v) plan water/CO2/N2 injections for enhanced oil/gas recover, (vi) address reservoir production or hydrocarbon flow issues, and/or (vii) perform sizing of hydrocarbon reserves.

For example outputs of the process 100 in FIG. 1 can help in managing production and making decisions on which areas to drill next or on which wells to complete for future production. Output of process 100 is also used to drive a reservoir model software simulation to make operational decisions that are external to this invention and its output generated by flow 100. An external reservoir model may be simultaneously running computations at different resolutions. Process flow in FIG. 10 can be used to generate a multi-resolution output, using coarse seismic resolution to output a higher resolution to drive a reservoir model software simulation. As most reservoir models work with gridded cells or use 3-D volume cell representation to manage and store reservoir attributes, which are then used to manage and make engineering or operational decisions for a formation of interest or under production: more accurate, upscaled reservoir attributes including porosity, Vshale and fluid saturation from FIG. 10 output results for voxels in a format and areal/vertical resolution that can be directly used by an external reservoir model software simulation.

As an example, FIG. 10 process enables inputs obtained using coarse seismic resolution in the vertical dimension, to generate voxel outputs 839 at close to the starting well log resolution. An example of upscaling performed by FIG. 10 would be to use seismic amplitude volumes as input, with 55 feet by 55 feet by 2 ms bin in time (or 55 feet by 55 feet by 30 feet in depth) resolution and wells logs at 2 feet sampling, to provide outputs for voxels up-scaled to 27.5 feet by 27.5 feet to 0.5 ms in time (or 27.5 feet by 27.5 feet by 10 feet in depth). FIG. 10 enables upscaling. Another RI Processor 1022 is used to transform the normalized excitation cascade output 811 to a different resolution with different properties. The other RI processor 1022 uses different initialization parameters and inputs from those used by RI Processor 831 in the quantum resonance interferometry engine 828. As a result, the RI processor 1022 produces voxel outputs at a higher resolution than the voxel data 805. As a result, outputs by produced by the work flow 1000 shown in FIG. 10 will be different from work flows without the RI processor 1022.

As mentioned above, the voxel data 805 is transformed to a 1-D spectral vector and normalized by an excitation cascade engine 808, The RI processor 1022 combines the normalized 1-D spectral vector with synthetic broadband colored/random noise 1024 and drives the combination inputs through a RI engine that uses a quantum mechanical model uses QSR dynamics data (such as "Virtual Vibe" as used in ViaLogy of Pasadena, Calif.'s QuantumRD 3.0). For example, an NMR model can be used combine the synthetic broadband colored/random noise and the 1-D spectral vector. A different quantum mechanical model can be used in the RI processor 1022 than was used in the RI processor 831. QuantumRD 3.0 produced by Vialogy of Pasadena, Calif. uses a NMR-based implementation to implement RI processor 831. As an example, the uniform scaling interval for the synthetic broadband colored/random noise is set to match 10% of the average energy spectral density amplitudes of the negative control voxel data 805.

In some examples, RI processor 1022 is introduced to increase robustness of resonance event 836 and prevent attributes of interest from being influenced by high amplitudes in noisy or low quality seismic data, or by frequency periodicity in the data in seismic traces from which voxel data is obtained. For example, periodicity in excitation cascades produced by excitation cascade engine 808 can potentially trigger resonance events 836. This can be a challenge for the identification of fluid markers described in FIG. 13C used to determine fluid properties. Also, running a normalized excitation cascade through RI processor 1022 can be used to detect weak signals buried near the boundaries of input volumes i.e., around −22 dB or around −24 dB.

RI processor 1022 also serves as a preconditioning mechanisms that preconditions 1-d normalized excitation cascades that are introduced into the interferometric coupler 833 by providing a shaping to certain frequencies which are directly related to rock or fluid properties of interest. For example, low frequencies are relevant to fluid saturation estimation. So, RI processor 1022 can be configured to enhance amplitudes in, for example, a 3 HZ or 4 HZ window. RI processor 1022 provides an independent degree of control to bias the workflow of FIG. 1 to regions of the frequency spectrum that are more important for specific rock and fluid properties. In some implementations, multiple RI processors, such as RI processor 1022, can be introduced, to receive the output of 1022 as an input, and to further condition the input to generate outputs that yield higher frequency or higher resolution attributes.

FIG. 11 shows a process 1100 for establishing monotonicity of resonance event 836. For example, when resonance is achieved by the interferometric coupler 833, process 1100 is applied to finalize the resonance event 834. At 1110 voxel data, such as 1-D spectral vector produced by the excitation cascade engine, is obtained for processing by the process 1100. At 1122, the coupler is initialized. During initialization, an initial cutoff bound (i.e., threshold) for the intensity of synthetic colored noise 842 is set. The cutoff bound is set, for example, to a fractional intensity of the average intensity of the prospect voxel data in the input seismic data in process 100 at 118. For example, the synthetic noise 824 is constructed using random number generator algorithms. An example of a fraction used as a synthetic noise cutoff bound is a scaling intensity of 10% of the intensity of partitioned volume.

At 1120, the interferometric coupler is run to produce resonance. If at 1125 a resonance is not achieved, the voxel data for the voxel is failed at 1160, which means that a robust resonance event was not established for the voxel, and therefore the voxel does not exhibit the attribute of interest. The failed voxel is assembled at 1150 into a voxel assembly 1150 with an indication of an absence of the attribute of interest for that voxel. These results are written to the same voxel address (that is the same location, orientation and size) as in the input volume from which the voxel data was derived. The process 1100 is repeated for another voxel at 1110.

If a resonance is achieved at 1125, it is determined whether the monotonicity (e.g., persistence) of a resonance event has been established at 1130. For example, it is determined whether resonance has been found at a sufficient number of cutoff bounds for the voxel. If not, the cutoff bound is adjusted (e.g., increased) to a different cutoff bound. For example, the cutoff can be doubled, such as by increasing from 10% to 20% of the intensity of the partitioned volume. The coupler is reset at 1122 with the adjusted cutoff bound and the process is repeated.

If at 1130, monotonicity is established for the voxel, the voxel is assembled in the voxel assembly with an indication that a robust resonance event was determined for the voxel, and thus the attribute of interest was found for the voxel. By establishing monotonicity in according to process 1100, the resonance is deemed to be robust and not an artifact of noise in the voxel data or an artifact of the external synthetic noise 842 being at added to the interferometric coupler 842. In some examples, monotonicity is established when resonance is achieved at three different cutoff bounds, such as at 10%, 20%, and 30%. The process 1100 proceeds with another voxel at 1110.

FIGS. 12A through 12B describe a process for generating and normalizing excitation cascade data, with output represented as a 1-D data vector that is used in the computation of porosity, Vshale, Fluid Saturation and Brittleness attributes using the process detailed for each voxel in FIG. 8A and FIG. 10. For example, FIGS. 12A and 12B provide an example of a process that can be performed by the excitation cascade engine 808. The process of generating an excitation cascade output is dependent on the prospect voxel attribute being analyzed as it uses different positive well control voxel data and negative well control voxel data parameters 1235 depending on the attribute under consideration.

The process of FIG. 12A is as follows. The incoming voxel data in 1210 obtained using the process 700 in FIG. 7, is transformed to a 1-D data vector using an unwrapping operation in 1215. Extracted data from a three dimensional (3-D) data structure used to managing seismic dataset in the industry standard SEGY notation, is produced as a 1-D data vector. Variations of unwrapping can be applied to transform data. For example, some variations of types of unwrapping are discussed in U.S. Pat. No. 7,466,851 which are incorporated herein by reference. In some examples, unwrapping that is used in seismic data processing can entail traversal of data elements in a 3-D voxel to transform into 1-D data using row-major (row-by row—x-dimension travel and then each successive layer in time or depth), or column-major (column-by column—y-dimension travel and then each successive layer in time or depth), or outward spiral (in clockwise or anticlockwise sequence starting the center or corner of the prospect voxel data and then spiraling outwards and downwards in increasing time or depth or spiraling upwards in decreasing depth or time). Same method is also used for generating an excitation cascade from positive control voxel data and negative control voxel data as in FIG. 13A through 13D. For notation purposes the seismic trace bins enclosed within a 3-D voxel boundaries are referred to as "mini-bins" to distinguish them from the CDP bins that correspond to seismic trace locations in a PSTM/PSDM seismic volume or seismic attribute volumes as in FIG. 6. If voxels use multiple CDP bins then the mini-bins may correspond to CDP bins.

In some examples, unwrapping to transform 3D prospect voxel data into a 1-D vector is clockwise outward spiral traversal starting at top left-corner (e.g., geographical north-west) of a 3-D voxel, each time or depth layers at time, going downwards in increasing time/depth. For a voxel with a 2 by 2 trace mini-bins only, this implies writing top-left corner, top-right corner, bottom-right corner and bottom-left corner for each successive layer going top down (or in increasing time or depth in a SEGY representation of seismic data). Inward spiral approach is used for voxels with number of mini-bins>2. This approach works with odd number of bins as well. Alternately, an outwards spiral approach could be used just as well for voxels with odd mini-bin dimensions (e.g. 3 by 3 or 5 by 5) starting at the location in the center of the voxel layer. The output of 3-D voxel unwrapping in 1215 results in a 1-D data vector with seismic amplitude values at each mini-bin location.

In some examples, starting seismic amplitude slabs can be voxelized to have the center of voxel correspond with the top of seismic horizon. For most prospects, voxels sizes of 2 by 2 CDP bins and 5 sample points in depth or time are preferred designing a voxel, with the time and depth dimension are resampled by a factor or 5 or 10 depending on target spatial resolution. So, a 1-D transformed output from 1215 has 2 by 2 by 5 or 100 data points in 1-D starting data vector for seismic data sampled at 1 ms or 2 ms resolution; or 2 by 2 by 5 by 10 or 200 data points in starting 1-D vector for seismic data sampled at 4 ms or higher resolution.

The 1-D vector, initially including seismic amplitudes from a band-limiting spectral decomposition process applied to PSTM or PSDM gather volumes, is then Fourier transformed to a 1-D vector of spatial frequencies at 1225. The spatial frequencies are amplified based on relationship and periodicity of neighboring data elements in the 3D voxel data in all the x, y and z dimensions. Well control voxel data parameters for an attribute of interest as generating using the methods described in FIG. 13A through 13D, and maintained at 1220 are used to partition the 1-D data vector into k-RMS-bands (root mean square) where k is at least 1 and less than half the length of 1-D data vector derived from prospect voxel data. The value of k is determined using the process of FIG. 13A thru 13D for different attributes of interest. Also the k-rms-band represents the results of computing the square root of means square amplitude of spectral components in 1-D vector at 1215 for each of the k-bands of interest. Energy spectral density of all k-rms-bands is computed as in 1230.

The steps 1240 through 1255 describe one or more modulation transformations that are required to be performed on the spectrally transformed voxel data at 1225 to generate an excitation cascade where the energy spectral density value satisfy conditions determined in the well control voxel data generation process. The representation and types of modulation kernels are determined by the rock physics input for the prospect as in FIG. 2. The modulation kernels are different for different source rock types (source of hydrocarbon) such as sandstone, dolomite, limestone, siltstone.

These modulation kernels in 1235 are deployed to offset uncertainty due to the fact the limited (even with large numbers of wells on the prospect) well-control cannot always capture the full variability and complexity of underlying source rock grain matrix (e.g., dolomite) and seismic reflections only capture a bulk property of the formation. A library of wavelet kernels (e.g., using Ricker or Ormsby wavelets) is maintained for different facies change in high/low/prime amplitude frequencies ("model") for different configurations such as shale-limestone-shale or chert-dolomite-chert. These facies represent the changing acoustic impedance boundaries imaged by sonic logs in the well-bore. The method uses well-control/analogs to assess field specific variability in recognition kernels that can separate the seismic facies in different frequency regimes as wavelet kernels. Also, the energy spectral density (or power spectral density) of each recognition kernel is computed. Using a Rock Physics handbook—tables that provide actual experimental data for measurements of changes in p-wave, s-wave velocities for different rock compositions and grain sizes, "uncertainty bounds" can be established. At 1240, based on analysis of well control quality (seismic-synthetic from log tie) energy spectral density or a derived power density metric is computed as required to recover "rock recognition kernels" from seismic data in any spectral decomposition of interest. At 1245 the 1-D spectral data is convolved with a rock recognition kernel (represented as the parameters of a standard synthetic wavelet kernel) in the library 1235. Once the appropriate kernel from the library 1235 is convolved with output produced at 1225, the resulting energy spectral density is computed at 1255. The results produced at 1255 are compared with the energy spectral density criteria set during well control voxel data design process for the attribute of interest using 1250. If a sufficient threshold of energy spectral density is not reached then another kernel is selected from 1235 and the process is repeated. If more than 2 convolutions are required to enhance the energy spectral density to the threshold set during well control voxel data design then the voxel spectral vector produced at 1225 is resampled and interpolated to double the length, e.g. go from a length of 100 data points set in 1215 to 200 data points. The number of iterations required in 1250 is also set during the well control voxel data design process of FIG. 13A thru 13D. The results of process shown in FIG. 12A are output at 1260 and denoted as an excitation cascade 1260.

FIG. 12B shows an example of a normalization process applied to prepare and condition an excitation cascade for introduction to Interferometric Coupler 833 in FIG. 8A and FIG. 10. As the amplitudes of the starting seismic data from which the voxels are derived are different and could take values over a very large domain over real number space, all data is uniformly rescaled such as to $[-1.0,1.0]$ or to a another range between $[-F,+F]$ where F is a real-number in 12170. Rescaled excitation vector obtained at 12170 is then frequency modulated with a periodic signal at 12180 using modulation parameters from a repository 12185. This can entails the encoding of a sinusoidal carrier wave by variation of its frequency in accordance with an input i.e., excitation vector to emphasize the variations in instantaneous frequency. Also, the subtle variations in instantaneous frequency of the excitation cascade data from voxel data is used to generate resonances if the events match as those seen in well logs. As an example, modulation parameters from 12185 can be selected to enhance instantaneous frequency by a factor of 10. The results of this modulation, also referred to as loading the data on a sinusoidal carrier are output in 12190.

Figure 13A:
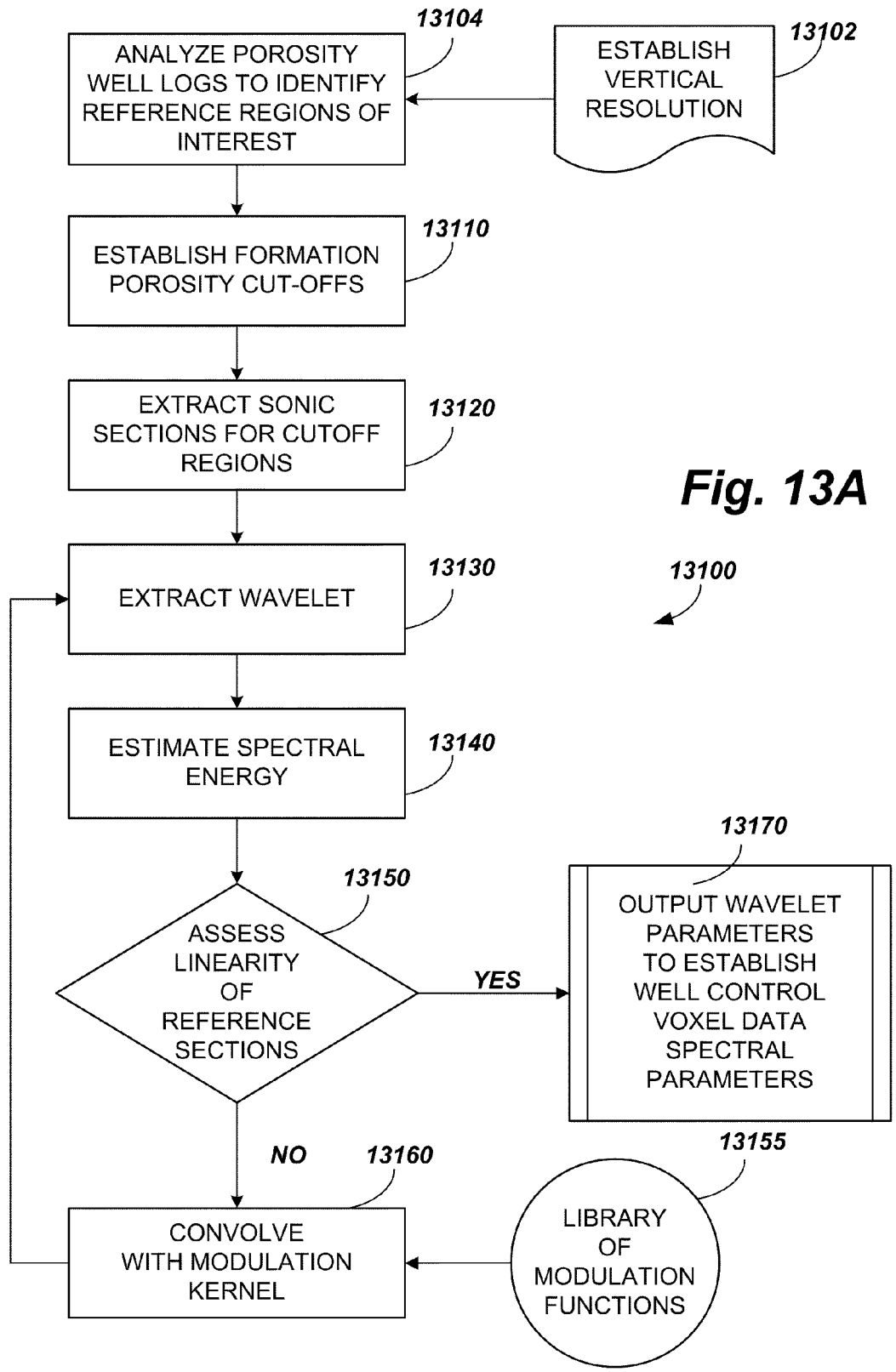
FIGS. 13A-13D show examples of how attribute-specific well control voxel data is developed.

FIG. 13A shows an example of how a porosity-specific well control voxel data is developed. For example, the well control voxel data can be developed in the processes of converting porosity log data 817 of FIG. 8A and FIG. 10 into a well control voxel data at 827. The parameters of the well control voxel data as output in 13170 and established by processes described in FIG. 13A, are used in the implementation of FIG. 8, FIG. 10 and also in the computation of excitation cascade in FIG. 12A. Different ranges of porosity are of interest in different formations in different prospects. The porosity criteria of interest for the prospect under consideration in FIG. 13A is established by a porosity workflow or a porosity-cube workflow described in FIG. 17A, specifically in 17101 and 17105. Once the porosity range of interest 17105 are specified, then the process of FIG. 13A provides for developing parameters for transformation prospect voxel data of FIG. 12A as relevant to the computation of porosity attribute. Based on prospect geology model, a vertical resolution is established as in 13102 for analyzing both well logs and seismic data. Depth sections from the neutron porosity well logs in the wells of interest on the prospect or analog are analyzed at 13104 to demarcate well log subsections that will be further analyzed. This can include geological log normalization, petrophysical normalization and effective porosity computation whereby different wells, that may have been drilled and logged by different companies at different times using different technologies and logging tools, are normalized so that these sections can be effectively compared. Either normalized or un-un-normalized and normalized well logs could be used as a starting point in 13104. Logs can be normalized for effective porosity for the formation of interest. For example, if the target formation entails determining the porosity of Goen limestone then reference logs needs to be preprocessed to a specific effective limestone porosity.

At 13110, formation cutoffs on the extracted porosity logs sections are established to ensure that they are properly normalized using standard procedures and quality control implemented by well logging companies. An example of a formation cutoff would be a range such as [2%, 18%] for Permian strawn in Central Texas, or [8%, 36%] for Frio sand in Oklahoma or [11%, 48%] for Pliocene sandstone in an offshore field off West Africa. The process in FIG. 13A can work on any interval of interest at 13110.

At 13120, sonic well log sections are extracted for regions in the well-bore that are output in 13104. Sonic log section limits are established at 13120 and sections of the logs copied and porosity values within the sections of interest extracted as (starting depth, porosity) pairs of tuples. As the same depth range is used for all processes in 13A through 13D, ending depth is not specified. Example depth sections are 8 feet, 16 feet, 10 feet, 16 feet, 32 feet or their metric equivalents for prospects that follow metric convention.

Sonic well log sections are extracted at 13120 in a manner to fully encapsulate the well log section impedance (or acoustic velocity change). For example, if 16 feet sections are used for well log analysis to design porosity examples then a 32 feet sonic section will be extracted such that the 16 feet well log section lies between the sonic section. The extraction 13120 can be also used if the sonic and well log sections are the same size and top or bottom aligned. If dipole sonic is available then the extracting at 13120 is repeated for both p-wave (compression) velocity and s-wave (shear) velocity. In some examples, compensated sonic is preferred. If sonic is not available then a sonic can be approximated from other well logs such as density log using relationships like Gardner's formula. Any method that can derive a sonic log, if one has not been acquired for the reference well, can be used to implement the extracting at 13120. If multiple wells are available or if the well has encountered a large thickness of formation of interest then multiple reference log sections and corresponding sonic sections are obtained. These well and sonic log sections are sorted and arranged in increasing order to form groups. Using a histogram construction the multiple log sections are organized in groups or porosity-bins to cover the range of porosity established in 13110. An example is groups [0-4%, >4%-8%, >8%-12%, . . . , >24%-28%].

Using wavelet analysis, underlying wavelets are extracted from the corresponding sonic log sections enclosing the porosity log sections at 13130. Sonic sections are associated with well log sections using multi-attribute software data structure such as list or n-dimensional array. The initial wavelet extracted used at 13130 is selected to match the same frequency bandwidth as the one selected for spectral decomposition. While use of high frequency spectral decomposition volume is the best mode of implementation for this method, porosity attribute computation could also be implemented on prime-amplitude or high frequency or full spectrum seismic data as in 110.

The energy spectral density of each sonic section is computed at 13140 and rearranged to form a line plot of energy spectral density versus increasing porosity-bins. Power spectral density or any power measure that can reduce the wavelet parametric derived at 13130 to a scalar number can be used to implement the check in 13150.

At 13150, a check is performed to see if the energy spectral density or an alternate scalar representation of wavelet parameter that encodes the information in sonic section is linear with a positive slope and the different sections corresponding to porosity well log are well separated, and accommodate the variance or standard deviation in different well log sections belonging to different wells. If the results produced at 13150 show linearity then the parameters are output at 13170 to be used to develop well control voxel data and also to be used in the excitation cascade engine 808. If the sections are not separated out then the results at 13130 are convolved with another kernel from the rock physics library 1235 in FIG. 12A. The same library is maintained and represented at 13155. The convolution between a rock physics modulation kernel from the library of modulation functions 13155 is implemented at 13160.

After convolution, the resulting data is again parameterized using a wavelet transform such as Ricker or Ormsby. Steps 13140, 13150 are repeated until linearity is established. Selection of each new kernel from the library of modulation functions 13155 is also used in the T1-TN steps shown at 811 to implement an excitation cascade. Satisfactory generation of output at 13170 and completion of linearity test implies that consistent well control is used to tie the well data to the seismic partitioned volume and to calibrate seismic attributes. Use of multiple kernels, with each kernel representing a higher spatial frequency dimensionality, to achieve linearity in energy spectral density or to achieve a related scalar measure is sufficient, but not necessary, to optimize the tie at wells. If linearity cannot be established in 5 or 6 convolutions, then some log sections can be dropped from the process to offset the likelihood that logging could be in error, or some wells represent a petrophysical, structural or stratigraphic nonconformity or suboptimal well normalization. Sufficiency of the linearity plot to tie well log to seismic partitioned volume using energy spectral density of convolved vectors provides accuracy in porosity prediction away from well-bore during quantum resonance interferometry engine and Interferometric coupler iterations.

Figure 13B:
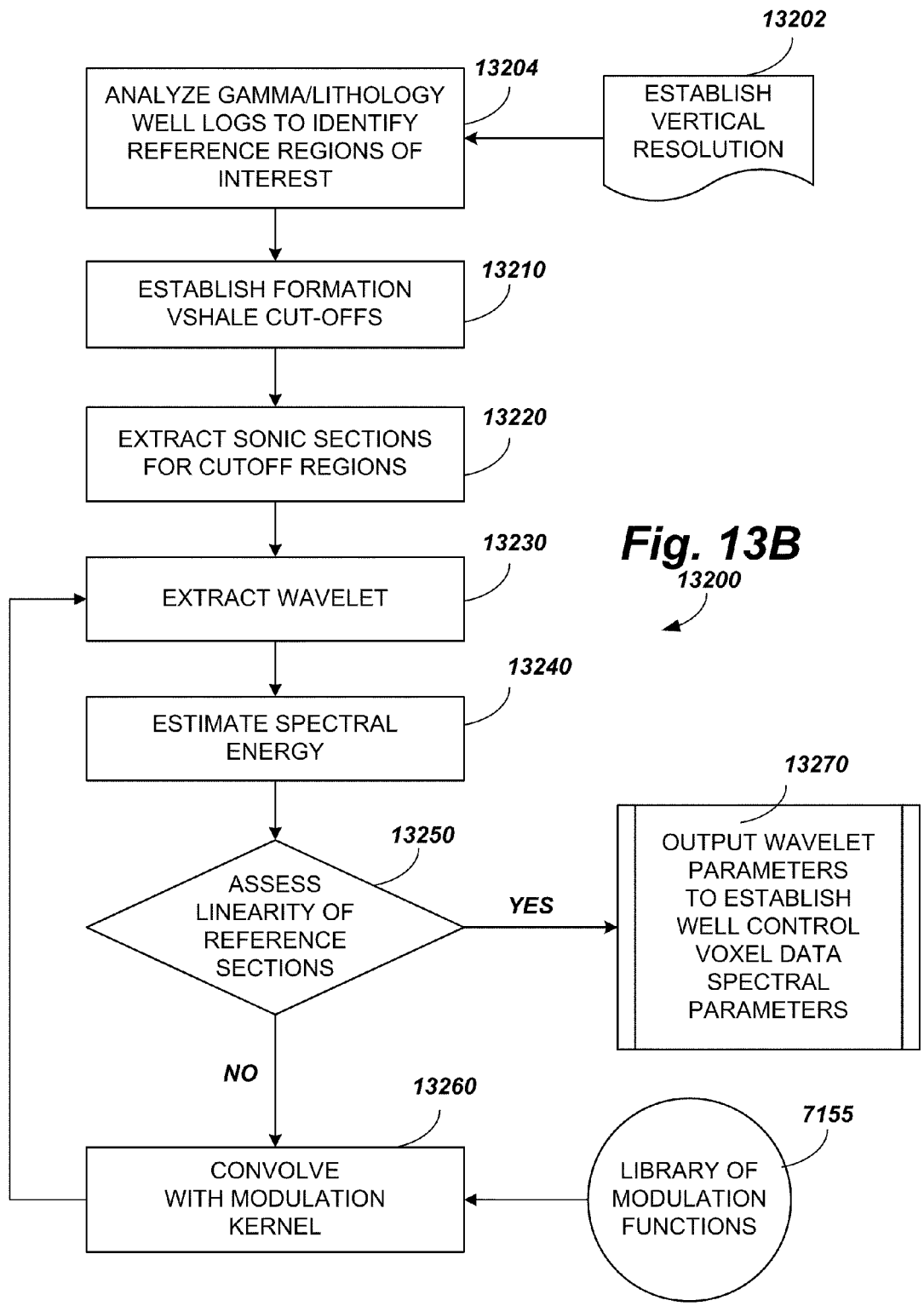

FIG. 13B shows an example of how a Vshale-specific well control voxel data is developed to analyze lithology when converting lithology (e.g., gamma ray) log data 820 of FIG. 8A and FIG. 10 into a well control voxel data in Unit 827. Vshale is a quantitative representation for lithology and particularly relevant for clastic of sedimentary types of structural, stratigraphic, and combination reservoirs. Parameters of the well control voxel data as output at 13270 and established by processes described in FIG. 13B, are used in the implementation of FIG. 8, FIG. 10, and also in the computation of excitation cascade in FIG. 12A. Different ranges of Vshale are of interest in different formation in different prospects. The Vshale criteria of interest for the prospect under consideration by the method of FIG. 13B is established by the Lithology Workflow described in FIG. 17B, specifically at 17201 and 17205.

Once the Vshale range of interest 17205 are specified then the method of FIG. 13B provides a method for developing parameters for transformation of the process in FIG. 12A, as relevant, to the computation of Vshale attribute. Based on prospect geology model, a vertical resolution is established as in 13202 for analyzing both well logs and seismic data. Depth sections from the gamma ray well logs in the wells of interest on the prospect or analog are analyzed at 13204 to demarcate well log subsections (i.e., reference regions of interest) that will be further analyzed. This can include the processes of geological logs normalization, petrophysical normalization and effective Vshale computation whereby different wells, that may have been drilled and logged by different companies at different times using different technologies and logging tools, are normalized so that these sections can be effectively compared Based on prospect geology model, a vertical resolution is established as in 13102 for analyzing both well logs and seismic data. Logs can be normalized for effective Vshale for the formation of interest. For example, if the target formation entails determining the Vshale of Wilcox sandstone then reference logs needs to be preprocessed to effective Vshale ratios.

At 13210, formation cutoffs on the extracted gamma logs sections are established to ensure that they are properly normalized using standard procedures and quality control implemented by well logging companies. An example of a formation cutoff would be a range such as [10%, 90%] for Wilcox sandstone in South-Central Texas, or [30%, 70%] for Vickersburg sand in Oklahoma or [5%, 95%] for Pliocene sandstone in an offshore field off Indonesia. The process in FIG. 13B is can work on any interval of interest at 13210.

At 13220, sonic well log sections are extracted for cutoff regions. Well log section limits are established and sections of the logs copied and Vshale values within the sections of interest extracted as (starting depth, Vshale) pairs of tuples. The computation can also be implemented in gamma ray intensity values as from logs without the need for mapping them to Vshale. In such case the resulting volume would be a gamma ray predictor as opposed to Vshale predictor. As the same depth range is used for all processes in 13A through 13D, ending depth is not specified. Example depth sections are 8 feet, 16 feet, 10 feet, 16 feet, 32 feet or their metric equivalents for prospects that follow metric convention.

Sonic well log sections are extracted at 13220 in a manner to fully encapsulate the well log section impedance (or acoustic velocity change). For example, if 16 feet sections are used for well log analysis to design Vshale examples then a 32 feet sonic section will be extracted such that the 16 feet well log section lies between the sonic section. The extraction 13220 can be also used if the sonic and well log sections are the same size and top or bottom aligned. If dipole sonic is available then the extracting at 13220 is repeated for both p-wave (compression) velocity and s-wave (shear) velocity. In some examples, compensated sonic is preferred. If sonic is not available then a sonic can be approximated from other well logs such as density log using relationships like Gardner's formula. Any method that can derive a sonic log, if one has not been acquired for the reference well, can be used to implement the extracting at 13220. If multiple wells are available of if the well has encountered a large thickness of formation of interest then multiple reference log sections and corresponding sonic sections are obtained. These well and sonic log sections are sorted and arranged in increasing order to form groups. Using a histogram construction the multiple log sections are organized in groups or Vshale-bins to cover the range of Vshale established in 13210. An example is groups [0-10%, >10%-20%, >20%-30%, ..., >80%-90%, >90%, 100%].

Using wavelet analysis, underlying wavelets are extracted from the corresponding sonic log sections that correspond to log sections selected in 13204 on basis of Vshale attribute. Sonic sections are associated with well log sections using multi-attribute software data structure such as list or n-dimensional array. The initial wavelet used at 13230 is selected to match the same frequency bandwidth as the one selected for spectral decompositions. Specifically, Vshale computation can be implemented on prime-amplitude or high frequency or full spectrum seismic data in 110.

The energy spectral density of each sonic section is computed at 13240 and the rearranged to form a line plot of energy spectral density versus increasing Vshale-bins. Power spectral density or any power measure that can reduce the wavelet parametric derived at 13130 to a scalar number can be used to implement the check in 13250.

At 13250, a check is performed to see if the energy spectral density or an alternate scalar representation of wavelet parameter that encodes the information in sonic section is linear with a positive slope and the different sections corresponding to Vshale well log are well separated, and accommodate the variance or standard deviation in different well log sections belonging to different wells. If the results produced at 13250 show linearity then the parameters are output at 13270 to be used to develop well control voxel data and also to be used in the excitation cascade engine 808. If the sections are not separated out then the results at 13230 are convolved with another kernel from the rock physics library 1235 in FIG. 12A. The same library is maintained and represented at 13255. The convolution between a rock physics modulation kernel from 13255 is implemented at 13260.

After convolution, the resulting data is again parameterized using a wavelet transform such as Ricker or Ormsby. Steps 13240, 13250 are repeated until linearity is established. Selection of each new kernel from the library 13255 is also used in the T1-TN steps shown at 811 to implement an excitation cascade. Satisfactory generation of output at 13270 and completion of linearity test implies that consistent well control is used to tie the well data to the seismic and to calibrate seismic attributes. Use of multiple kernels, with each kernel representing a higher spatial frequency dimensionality, to achieve linearity in energy spectral density or to achieve a related scalar measure is sufficient, but not necessary, to optimize the tie at wells. If linearity cannot be established in a predetermined number of convolutions (e.g., 5 or 6), then some log sections can be dropped from the process to offset the likelihood that logging could be in error, or some wells represent a petrophysical, structural or stratigraphic nonconformity or suboptimal well normalization. Sufficiency of the linearity plot to tie well log to seismic using energy spectral density of convolved vectors provides accuracy in Vshale prediction away from well-bore during quantum resonance interferometry engine and Interferometric coupler iterations.

Figure 13C:
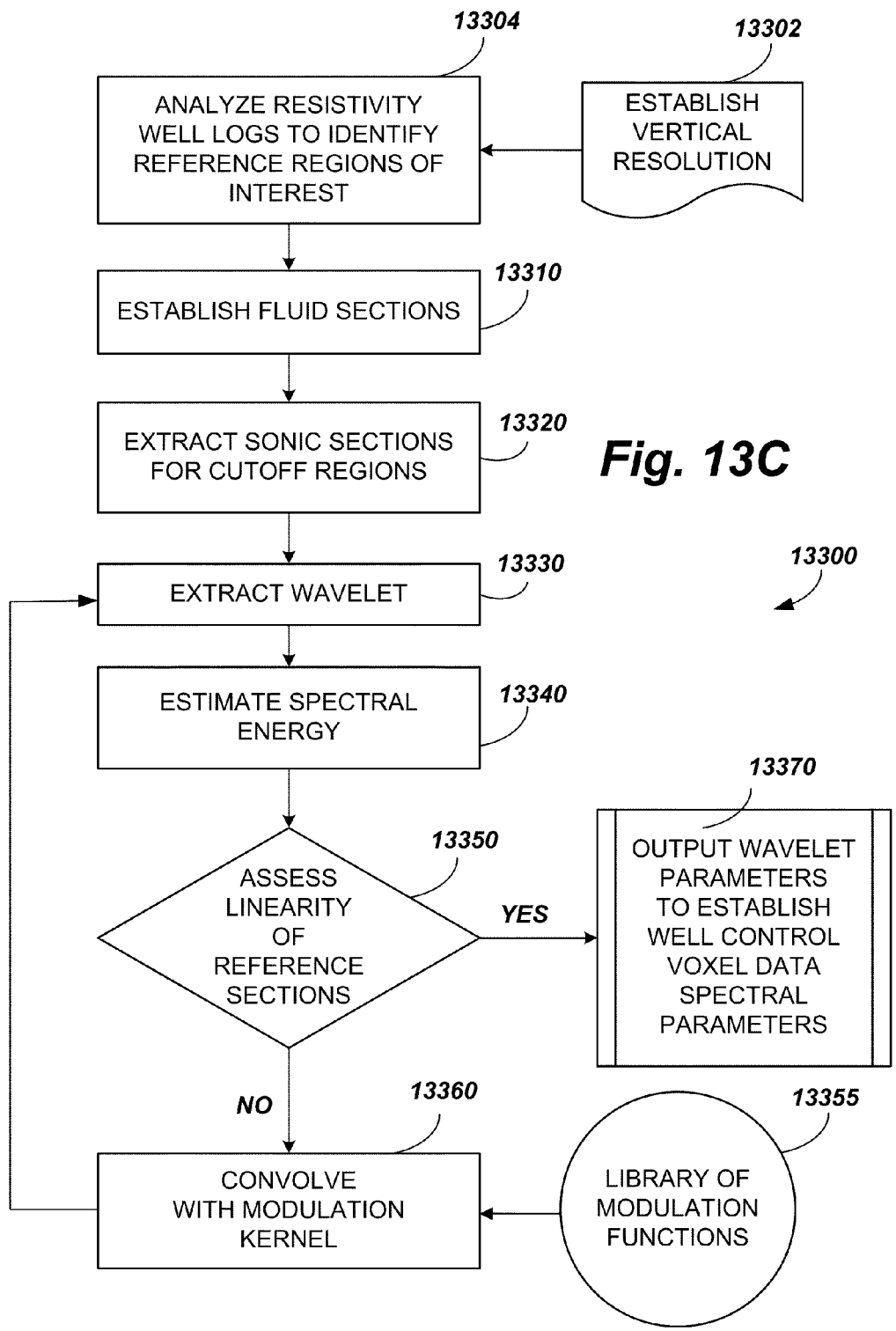

FIG. 13C shows an example of how a fluid saturation-specific well control voxel data is developed to analyze fluid properties as in FIG. 8A. Resistivity log values in sections with high effective porosity is one measure of fluid distribution and applicable analysis of carbonate, and clastic or sedimentary, types of structural, stratigraphic and combination reservoirs. Parameters of the well control voxel data as output at 13370 and established by processes described in FIG. 13C, are used in the implementation of FIG. 8, FIG. 10, and also in the computation of excitation cascade in FIG. 12A. As a distinction to porosity and lithology attribute computation, the fluid saturation sections meeting thresholds for exploration or well development interest may also be derived from results of well core analysis. Logging companies often take sidewall or other rock cores post-drilling. These are sent to core analysis laboratories to obtained detailed analysis of water and hydrocarbon saturations from regions of interest in the well. At every location in the well, where a core sample is taken, a value of fluid type (water, gas, oil) may be available. This table of values is used to annotate the regions of interest at 13304 and develop a mapping between depth and resistivity values. Different ranges of resistivity are of interest in different formations in different prospects. The fluid saturation criteria of interest for the prospect under consideration by the process of FIG. 13C is established by the Fluid Saturation Workflow described in FIG. 17C, specifically in 17301 and 17305.

Once the saturation or resistivity log value range of interest 17305 are specified then the process of FIG. 13C provides for developing parameters for transformation of the process in FIG. 12A, as relevant, to the computation of fluid attribute. For example, at 13302, vertical resolution is established. Depth sections from the resistivity well logs in the wells of interest on the prospect or analog are analyzed at 13304 to demarcate well log subsections that will be further analyzed. This can include the processes of geological logs normalization, petrophysical normalization, and effective fluid presence and fluid saturation computation whereby different wells, that may have been drilled and logged by different companies at different times using different technologies and logging tools, are normalized so that these sections can be effectively compared. Logs can be normalized for effective fluid type and saturation for the formation of interest. For example, if the target formation entails determining the saturation of Wilcox sandstone then reference logs needs to be preprocessed to effective fluid saturation levels using rock core data, if available. Gas-cut, Oil-cut, Gas-Oil-Ratio (GOR), are terms of the art used to represent saturation levels of hydrocarbon by different organizations and prospects. Any implied, derived or computed measure of fluid type or saturation that can be related back to the well and well log is a candidate for identifying a section of interest to look for in the seismic data or avoid (as in the case of water-saturated or water wet wells).

At 13310, formation cutoffs on the extracted resistivity logs sections are established to ensure that they are properly normalized using standard procedures and quality control implemented by well logging companies. An example of a formation cutoff would be a range such as [10%, 100%] for Wilcox sandstone in South-Central Texas, or [30%, 70%] for Vickersburg sand in Oklahoma or [5%, 95%] for Pliocene sandstone in an offshore field. Fluid or hydrocarbon saturation can range from 0% to 100%. The process in FIG. 13C can work on any interval of interest at 13310.

At 13220, sonic well log sections are extracted for cutoff regions. As an example, well log section limits are established and sections of the logs copied and resistivity values within the sections of interest extracted as (starting depth, resistivity) pairs of tuples. The computation can also be implemented in resistivity log intensity values (that can numerically range from 0.1 ohm to 1000 ohm as an example) as from logs, without the need for mapping them to saturation. In such case the resulting volume would be a resistivity value predictor as opposed to saturation predictor. Saturation can be obtained from a resistivity attribute prediction volume using an additional calibration table. As the same depth range is used for all processes in 13A through 13D, ending depth is not specified. Example depth sections are 8 feet, 16 feet, 10 feet, 16 feet, 32 feet or their metric equivalents for prospects that follow metric convention.

Sonic well log sections are extracted at 13320 in a manner to fully encapsulate the well log section impedance (or acoustic velocity change). For example, if 16 feet sections are used for well log analysis to design saturation examples then a 32 feet sonic section will be extracted such that the 16 feet well log section lies between the sonic section. The extraction 13320 can be also used if the sonic and well log sections are the same size and top or bottom aligned. If dipole sonic is available then extracting 13320 is repeated for both p-wave (compression) velocity and s-wave (shear) velocity. A sonic log can be derived in various ways, if one has not been acquired for the reference well and can be used to implement the extracting at 13320. If multiple wells are available of if the well has encountered a large thickness of formation of interest then multiple reference log sections and corresponding sonic sections are obtained. These well and sonic log sections are sorted and arranged in increasing order to form groups. Using a histogram construction the multiple log sections are organized in groups or fluid saturation-bins to cover the range of saturation established in 13310. An example is groups [0-10%, >10%-20%, >20%-30%, . . . , >80%-90%, >90%, 100%].

Using wavelet analysis, underlying wavelets are extracted from the corresponding sonic log sections. Sonic sections are associated with well log sections using multi-attribute software data structure such as list or n-dimensional array. The initial wavelet used at 13330 is selected to match the same frequency bandwidth as the one selected for spectral decompositions. Specifically, fluid saturation computation can be implemented on prime-amplitude or low frequency or full spectrum seismic data in 110.

The energy spectral density of each sonic section is computed at 13340 and the rearranged to form a line plot of energy spectral density versus increasing saturation-bins or resistivity. Power spectral density or any power measure that can reduce the wavelet parametric derived at 13330 to a scalar number can be used to implement the check in 13350.

At 13350, a check is preformed to see if the energy spectral density or an alternate scalar representation of wavelet parameter that encodes the information in sonic section is linear with a positive slope and the different sections corresponding to resistivity well log are well separated, and accommodate the variance or standard deviation in different well log sections belonging to different wells. If the results produced at 13350 show linearity then the parameters is output at 13370 to be used to develop well control voxel data and also to be used in the excitation cascade engine 808. If the sections are not separated out then the results at 13330 are convolved with another kernel from the rock physics library in 1235 in FIG. 12A. The same library is maintained and represented at 13355. The convolution between a rock physics modulation kernel from 13355 is implemented at 13360.

After convolution, the resulting data is again parameterized using a wavelet transform such as Ricker or Ormsby wavelet. Steps 13340, 13350 are repeated until linearity is established. Selection of each new kernel from the library 13355 is also used in the T1-TN steps shown at 811 to implement an excitation cascade. Satisfactory generation of output at 13370 and completion of linearity test implies that consistent well control is used to tie the well data to the seismic and to calibrate seismic attributes. Use of multiple kernels, with each kernel representing a higher spatial frequency dimensionality to achieve linearity in energy spectral density or to achieve a related scalar measure is sufficient, but not necessary, to optimize the tie at wells. If linearity cannot be established in a predetermined number convolutions (e.g., 5 or 6 convolutions), then some log sections can be dropped from the process to offset the likelihood that logging could be in error, or some wells represent a petrophysical, structural or stratigraphic nonconformity or suboptimal well normalization. Sufficiency of the linearity plot to tie well log to seismic using energy spectral density of convolved vectors provides accuracy in fluid type or fluid saturation prediction away from well-bore during quantum resonance interferometry engine and Interferometric coupler iterations.

Figure 13D:
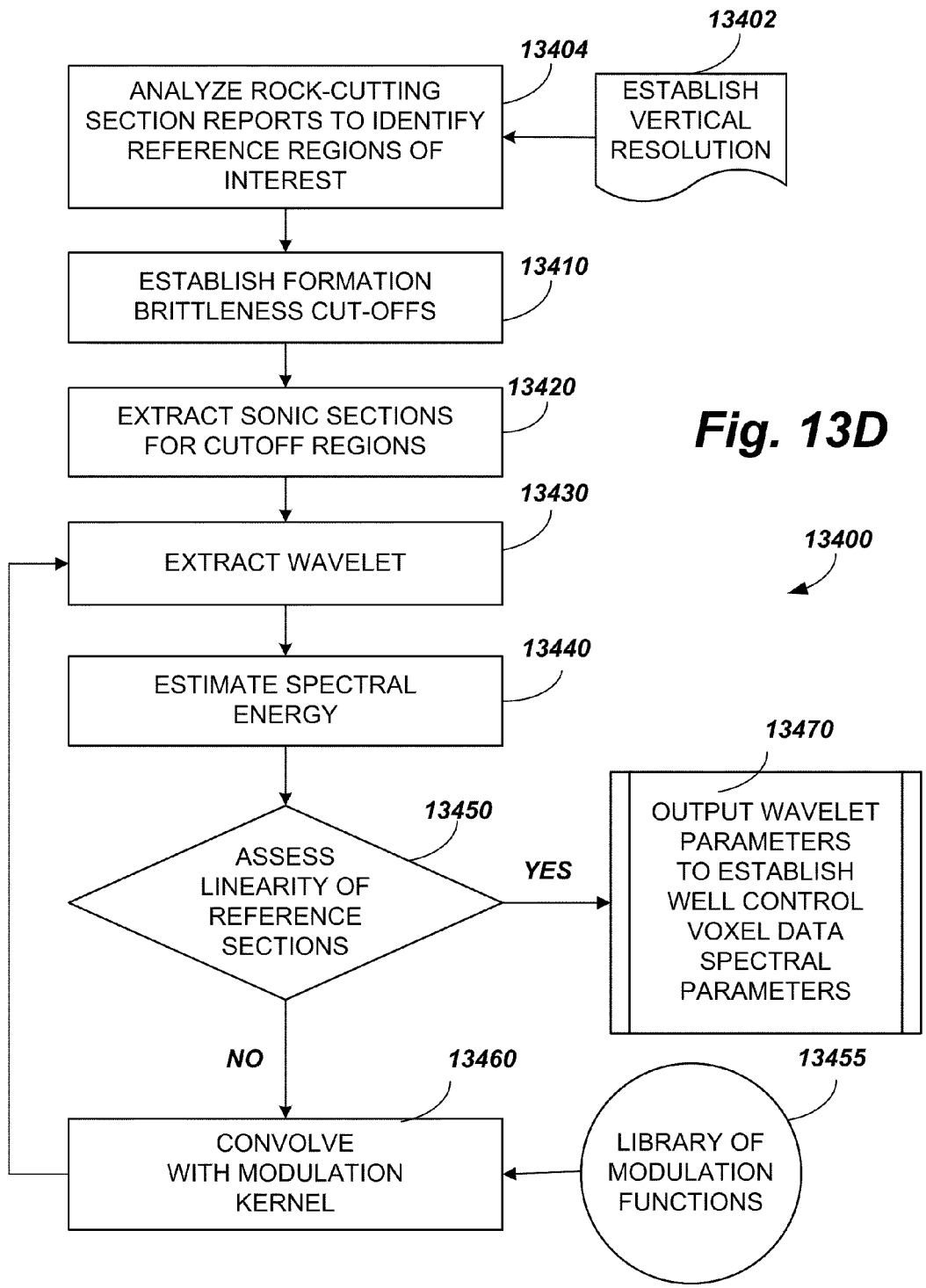

FIG. 13D shows and example of how a geomechanical attribute such as brittleness-specific well control voxel data is developed to analyze subsurface rock brittleness properties. FIG. 8A well control voxel data. Brittleness attribute has been shown to be important for developing nonconventional resources such as shale gas prospects which have their own classifications in terms of structural, stratigraphic and combination reservoirs. The parameters of the well control voxel data as output at 13470 and established by processes described in FIG. 13D, are used in the implementation of FIG. 8, FIG. 10, and also in the computation of excitation cascade in FIG. 12A. Brittleness values meeting thresholds for exploration or well development interest are derived from results of well core sample analysis or cutting section analysis. Logging companies often take sidewall or other rock cores and cuttings during drilling (as in logging while drilling) or post-drilling. These are sent to core analysis laboratories to obtained detailed analysis of brittleness, elasticity, grain size from regions of interest in the well. At every location in the well, where a core sample is taken, a value of brittleness may be available. An association table of values is used to annotate the regions of interest at 13404 and develop a mapping between depth and brittleness values. Different ranges of brittleness are of interest in different formation in different prospects. The brittleness criteria of interest for the prospect under consideration by the process of FIG. 13D is established by the Brittleness Volume Workflow described in FIG. 17D, specifically in 17401 and 17405.

Once the brittleness value range of interest 17405 are specified then the process of FIG. 13D provides for developing parameters for transformation of the process of FIG. 12A, as relevant, to the computation of brittleness attribute. For example, at 13402, vertical resolution is established. Depth sections from the in the wells of interest on the prospect or analogs are analyzed at 13404 to demarcate well log subsections that will be further analyzed. This can include the processes of geological log normalization, petrophysical normalization, and effective brittleness computation whereby different wells, that may have been drilled and logged by different companies at different times using different technologies and logging tools, are normalized so that these sections can be effectively compared.

At 13420, sonic well log sections are extracted for cutoff regions. As an example, well log section limits are established and sections of the logs copied and associated with brittleness values from core analysis within the sections of interest extracted as (starting depth, brittleness value) pairs of tuples. The resulting volume would be a direct brittleness value predictor from seismic data volumes. Additional geomechanical properties such as Young's modulus for a unit rock section can be obtained from a brittleness attribute prediction volume using an additional calibration table. As the same depth range is used for all processes in 13A through 13D, ending depth is not specified. Example depth sections are 8 feet, 16 feet, 10 feet, 16 feet, 32 feet or their metric equivalents for prospects that follow metric convention.

Sonic well log sections are extracted at 13420 in a manner to fully encapsulate the well log section impedance (or acoustic velocity change). For example, if 16 feet sections are used for well log analysis to design saturation examples then a 32 feet sonic section will be extracted such that the 16 feet well log section lies between the sonic section. The extraction 13420 can be also used if the sonic and well log sections are the same size and top or bottom aligned. If dipole sonic is available then the process of 13420 is repeated for both p-wave (compression) velocity and s-wave (shear) velocity. A sonic log can be derived in various ways, if one has not been acquired for the reference well and can be used to implement 13420. If multiple wells are available of if the well has encountered a large thickness of formation of interest then multiple reference log sections and corresponding sonic sections are obtained. These well and sonic log sections are sorted and arranged in increasing order to form groups. Using a histogram construction the multiple log sections are organized in groups or brittleness-bins to cover the range of interest established in 13410.

Using wavelet analysis, underlying wavelets are extracted from the corresponding sonic log sections of the well where brittleness cores were taken. Sonic sections are associated with well log sections using multi-attribute software data structure such as list or n-dimensional array. The initial wavelet used in 13430 is selected to match the same frequency bandwidth as the one selected for spectral decompositions. Specifically, brittleness computation is implemented on prime-amplitude or high frequency or full spectrum seismic data in 110. The energy spectral density of each sonic section is computed at 13440 and the rearranged to form a line plot of energy spectral density versus increasing brittleness. Power spectral density or any power measure that can reduce the wavelet parametrics derived at 13430 to a scalar number can be used to implement the check at 13450.

At 13450, a check is performed to see if the energy spectral density or an alternate scalar representation of wavelet parameter that encodes the information in sonic section is linear with a positive slope and the different sections corresponding to brittleness well section attribute are well separated, and accommodate the variance or standard deviation in different well sections belonging to different wells. If the results produced at 13450 show linearity then the parameters are output at 13470 to be used to develop well control voxel data and also in the excitation cascade engine at 808. If the sections are not separated out then the results at 13430 are convolved with another kernel from the rock physics library in 1235 in FIG. 12A. The same library is maintained and represented at 13455. The convolution between a rock physics modulation kernel from 13455 is implemented at 13460.

After convolution, the resulting data is again parameterized using a wavelet transform such as Ricker or Ormsby wavelet. Steps 13440, 13450 are repeated until linearity is established. Selection of each new kernel from the library 13455 is also used in the T1-TN steps shown at 811 to implement an excitation cascade. Satisfactory generation of output at 13470 and completion of linearity test implies that consistent well control is used to tie the well data to the seismic and to calibrate seismic attributes. Use of multiple kernels, with each kernel representing a higher spatial frequency dimensionality to achieve linearity in energy spectral density or to achieve a related scalar measure is sufficient, but not necessary to optimize the tie at wells. If linearity cannot be established in a predetermined number of convolutions (e.g., 5 or 6 convolutions), then some log sections can be dropped from the process to offset the likelihood that logging could be in error, or some wells represent a petrophysical, structural or stratigraphic nonconformity or suboptimal well normalization. Sufficiency of the linearity plot to tie well log to seismic using energy spectral density of convolved vectors provides accuracy in brittleness prediction from seismic datasets, away from well-bore during quantum resonance interferometry engine and Interferometric coupler iterations.

Figure 14:
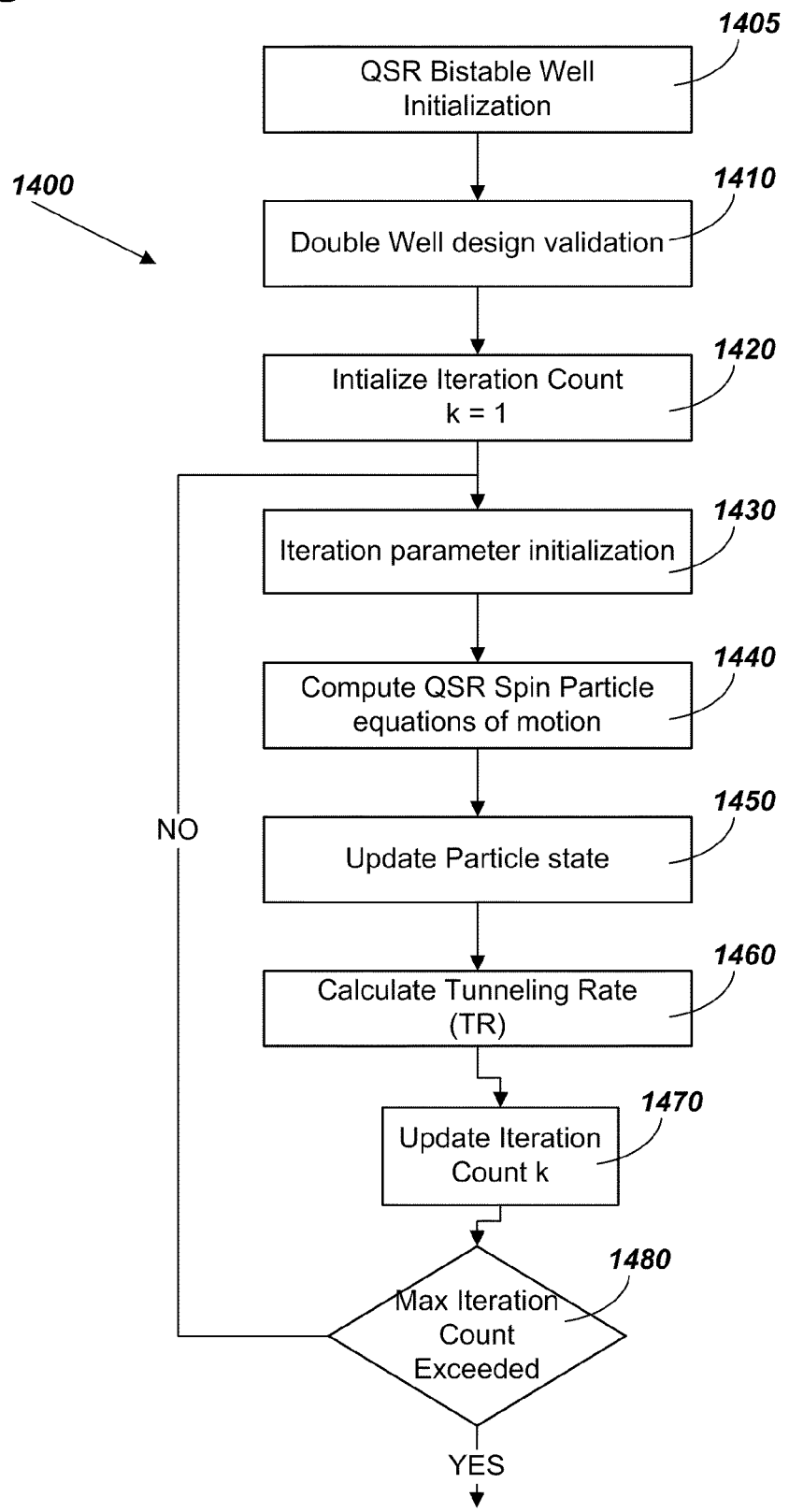
FIG. 14 describes an example of a process of implementing an interferometry engine and a quantum resonance interferometry processor.

FIG. 14 describes a process of implementing a quantum resonance interferometry engine 828 in FIG. 8 and quantum resonance interferometry processor 1022 in FIG. 10 based on a mathematical model known to exhibit a quantum stochastic resonance ("QSR") phenomenon when driven by synthetic noise, such as synthetic noise 842. The QSR phenomenon yields resonance events when certain conditions are met in the incoming data as in the output of excitation cascade engine 808 applied to prospect voxel data 805. The quantum resonance interferometry engine in conjunction with the interferometric coupler 1022 detects weak signals in the form of subtle variations in the intensity of data as in 811 by exploiting nonlinear interactions between (i) appropriately preconditioned voxel data transformed to a normalized excitation cascade from 805, and, (ii) a synthetically designed and dynamically conditioned complex noise output using 831 derived by mixing white/colored noise and noise from seismic. Denoted as a QEF this "synthetic complex noise" results from classical projection of a digitally simulated, 1-D quantum-mechanical (Q-M) system, modulated by classical white noise. In Gulati U.S. Pat. Nos. 6,920,397, 6,963,806 and 7,567,876 incorporated herein by reference, spin-boson system dynamics for implementing a quantum resonance interferometry dynamics is described. Methods presented in these patents are incorporated herein by reference as an alternative implementation of quantum resonance interferometry engine 828. FIG. 14 shows a new process for implementing a QSR algorithm based on a master rate equation derived from a two level system for nuclear magnetic resonance (NMR) effect. Software implementation of a master rate equation for an NMR-spin based approximation to a 1-D spin-boson system is used to emulate the dynamics of a underlying quantum-mechanical (Q-M) systems exhibiting NMR. Output of 831 couples with the input data samples from output of 811 to generate resonance event 836. A novel scalar observable output (that tracks changes to the dynamics of the simulated Q-M system) provides the basis for detection and quantitation of signal content in the input data. The process 1400 includes selection and customization of the 1-D Q-M system and its nonlinear dynamics; and, selection and specification of the scalar observable used to conclude detection of an event that defines a condition for prospect voxel data to confirm the presence of an attribute of interest above a limit-of-detection established using positive control voxel data and negative control voxel data for an attribute of interest in FIG. 13A through 13D.

FIG. 14 describes an efficient method for developing quantum expressor functions to drive the interferometric coupler 833. It has been shown by those skilled in quantum mechanics theory that using variational methods, density operators could be used to unify different quantum mechanical theories, and classical mathematical approximations could emulate complex quantum mechanical effects in software implementation and reduce computational complexity and development time. Subject to the same stochastic limit approximation (SLA) which is at the core of QSR phenomenology in spin-boson systems, tunneling resonance events can be demonstrated in a broad class of systems whose time dependent dynamics can be described using the Bloch Rate equations. Furthermore, incorporating a master rate equation for time evolution of an NMR system, offers a simpler path for implementing tunneling resonance to detect and analyze events of interest. Within the NMR system the spin-boson bath coupling is replaced by a spin-thermal reservoir and thermal relaxation and decoherence times.

A key tradeoff, in making the switchover from spin-boson dynamics to NMR dynamics described in FIG. 14 is that dramatic tunneling changes at resonance event (observed during QSR implemented using spin-boson dynamics in Gulati U.S. Pat. Nos. 6,963,806 and 6,920,397 incorporated herein by reference, are replaced by subtle, but statistically significant and "visible" changes in Tunneling Rate (TR).

Also, as a result to the switchover to NMR dynamics, the Quantum Resonance quantum resonance interferometry engine is calibrated to assess TR changes between—no signal condition ($TR_0$), a reference control—(i.e., positive control voxel data with known results—i.e., observed attribute values in well logs and rock core samples.)—$TR_N$ and unknown data condition ($TR_U$). Signal detection is based on the decision of $$\Delta = \|(TR_U - TR_0)/TR_N - TR_0)\| \text{ where } \Delta > \zeta\text{-preset SLA corridor} \quad \text{(Eqn. 1)}$$

Some of these concepts are summarized in the following description.

Two Level System (NMR Realization) Approximation

Imafuku et al "Quantum stochastic resonance in driven spin-boson system with stochastic limit approximation", Report number WU-HEP-99-9, http://arxiv.org/abs/quant-ph/9910025v1, October 1999, introduced the theoretical concept of the "Driven Spin-Boson Model" subject to Stochastic Limit Approximation (SLA) for Quantum Stochastic Resonance in bistable systems. Their approach assumed a Fermion-populated double-well potential in a "deep cold" thermal bath. In such configuration, a Fermion sinks to the lowest possible allowed energy level, i.e. the so-called ground state (n=0) for the system. There are two ground states in each well, designated as $|L\rangle$ and $|R\rangle$ for the left well and right well ground states. Taking these two states as the basis states for a Hilbert space, they described the system by the Hamiltonian:

$$H_s = \frac{\varepsilon}{2}(|R\rangle\langle R| - |L\rangle\langle L|) + \frac{\Delta}{2}(|R\rangle\langle L| + |L\rangle\langle R|) \quad \text{(Eqn. 2)}$$

Where $\square$ is the energy difference between the two states and $\square$ is the tunneling amplitude between the two wells. Their next step is to create a superposition of these two states to create two new states $|\pm\rangle$, with the relationship between the Hilbert space with these two basis states with respect to the previous Hilbert space is achieved through a rotation transformation:

$$|+\rangle = \cos\frac{\theta}{2}|R\rangle + \sin\frac{\theta}{2}|L\rangle, \quad \text{(Eqn. 3)}$$

$$|-\rangle = -\sin\frac{\theta}{2}|R\rangle + \cos\frac{\theta}{2}|L\rangle,$$

The reason for this transformation is that it simplifies the spin system into a two state system with an energy gap $\omega_0$ given by:

$$\omega_0 = \sqrt{\varepsilon^2 + \Delta^2}.$$

A simple sinusoidal driving function (akin to the rocking of the boat in Stochastic Resonance) with a frequency $\Omega$ and amplitude $\xi$ can be used to drive such a spin system. The applied force is described the "perturbative" (not large compared to the system energy difference) Hamiltonian W:

$$W = \xi X \sin \Omega t$$

Where X is a "position" operator defined by:

$$X = |R\rangle\langle R| - |L\rangle\langle L|$$

X, they claim, is also an order parameter measuring the transitions between the states $|L\rangle$ and $|R\rangle$ under the influence of the external periodic driving force.

In this above construct, Boson Noise Source is the Boson part of the Spin-Boson model. The idea is that the Fermion system is coupled to a Boson energy reservoir that can either add or take away energy from the Fermion system. Based on the Fluctuation-Dissipation theorem in quantum mechanics, which states that reversible fluctuations are possible in a system that is coupled in equilibrium to a thermal reservoir from which it can either draw thermal energy or dissipate energy into the reservoir. The fluctuation-dissipation theorem is the basis for the so-called Brownian Motion or Johnson Noise in electrical circuits. The spectrum of this thermal equilibrium noise is white, i.e. constant across all frequencies. The Boson reservoir can be used as the analog for a thermal reservoir under the conditions of a Stochastic Limit Approximation.

Once the S-B model is set up, the response of the S-B system is monitored through the dynamics of the position operator, X:

$$X(\tau) = tr_B(\rho_B e^{iH\tau/\lambda^2} X e^{-iH\tau/\lambda^2}) \qquad (Eqn.\ 4)$$

Where the terms are:

$\tau$ = a new, re-scaled version of time "t." $\tau = \lambda^2 t$;

$\lambda$ = strength of the interaction between Fermion system and the Boson system $tr_B$ = trace of the matrix within the parenthesis over the boson degrees of freedom $\rho_B$ = Boson ground state density operator; $\rho_B = |0\rangle\langle 0|$ H = Total system Hamiltonian.

FIG. 14 implements a novel approximation to the spin-boson dynamics using a Density Operator for Two Level Systems (TLS). In conventional Stochastic Resonance (SR), stationary colored noise, not derived from the noise inherent in the input signal, is injected into the dynamical system (or into its analog or digital simulation). Finally, the noisy input signal itself—that is, the signal in which we wish to enhance and detect any signal of interest, if present—is applied (actually or in simulation) as a time-dependent perturbation to the dynamical system. The simplest classical dynamical system of this kind that exhibits the SR phenomenon is that of a point-particle moving in a one-dimensional conservative potential, and subject to velocity-dependent friction (as well as the injected noise and the input signal). There are variants of this system in electronics, chemistry, optics and other branches of natural science, but the underlying mathematical model, which is more or less the same in all classical phenomena exhibiting an SR mechanism.

As in 1405 a QSR double well is implemented, incorporating an algorithmic model in which the point particle's inertia (mass) is negligible, its response to the potential gradient, the input signal and the injected noise is through the first derivative of the particle position; in other words, the nonlinear, stochastic, driven ordinary differential equation is first-order. As example of a dynamical mathematical model used in ViaLogy QuantumRD 3.0 is:

$$\text{Error! Objects cannot be created from editing field codes.} \qquad (Eqn.\ 5)$$

where: Error! Objects cannot be created from editing field codes. is the particle's position;

Error! Objects cannot be created from editing field codes. is the potential, rescaled to encode the drag (friction) coefficient;

Error! Objects cannot be created from editing field codes. is the noisy input signal dealt with in the previous sections; and Error! Objects cannot be created from editing field codes. is the injected noise. This is a stochastic process—e.g. it could be implemented using white (Wiener) noise again, or colored noise—but it is entirely uncorrelated with the stochastic process used to model the inherent noise inside Error! Objects cannot be created from editing field codes. For example, if Error! Objects cannot be created from editing field codes. is also a Wiener process, it has its own noise strength Error! Objects cannot be created from editing field codes, independent of Error! Objects cannot be created from editing field codes.

An exemplary mathematical choice for a potential Error! Objects cannot be created from editing field codes. which leads to SR is a bistable, two-well quartic (order 4) polynomial. As in 1405, there is flexibility in setting initial condition (Error! Objects cannot be created from editing field codes.) to initialize the dynamics, as long as for any given potential and input signal, the inherent noise in Error! Objects cannot be created from editing field codes. is sufficient to "jiggle" the double-well potential sufficiently to induce the particle to cross the inter-well potential barrier in the absence of injected noise (Error! Objects cannot be created from editing field codes.). And even if such is not the case, for any given input signal one can choose the parameters of the potential Error! Objects cannot be created from editing field codes. such that the particle, having once fallen into one of the two wells, will stay there, provided Error! Objects cannot be created from editing field codes. Any periodicity buried in Error! Objects cannot be created from editing field codes. will modulate the fluctuations of Error! Objects cannot be created from editing field codes. about that well's potential minimum, but no amplification of the SOI will occur. Note that, ignoring the noise inherent in the input signal, the effect of a the pure-signal part of Error! Objects cannot be created from editing field codes. upon the bistable potential for low enough Error! Objects cannot be created from editing field codes. is, in effect, to periodically tilt it; so that for one half-cycle the right well bottom is higher than the left well bottom, while for the other half-cycle of the period Error! Objects cannot be created from editing field codes, the left well rises above the right one.

Having selected a potential that allows no inter-well transitions for the given input signal, consider what happens when the strength Error! Objects cannot be created from editing field codes. of the injected noise is gradually increased. The injected noise impels the particle to execute a type of Brownian motion, and if Error! Objects cannot be created from editing field codes. is large enough, the particle will transition as frequently as desired between the two wells. However, these transitions—which are approximately described by a two-state Poisson process—are random; so once again, their pattern does not reflect to any significant extent the periodic sinusoid buried within the input signal.

So no SR occurs when the injected noise is too low, nor when it is too high. However, at intermediate values of Error! Objects cannot be created from editing field codes, it was discovered—by a combination of analytical approximations, simulations and observations of physical system—that the inter-well transition patterns often locks step With the signal of interest, the transition time series exhibits a high correlation with a sinusoid of frequency Error! Objects cannot be created from editing field codes. This effect can easily amplify the SNR of the input signal Error! Objects cannot be created from editing field codes. by a large factor, because it is the injected noise together with the parameters of the potential—and not the amplitude Error! Objects cannot be created from editing field codes. of the signal of interest—which determines the amplitude of the output signal.

In the method of 1400, underlying QSR (Quantum Stochastic Resonance) the dependent variable in the governing differential equation—the variable out of which the output (processed) signal is extracted—does not represent an observable of the physical system, but rather quantum amplitudes and probabilities. So these quantum dynamical equations reduce to coupled ordinary differential equation (ODEs) for the inter-well instantaneous transition. It is known to those skilled in the art that quantum system exhibits a richer variety of injected noise due to the interplay of inter-well tunneling, thermalization, decoherence, entanglement which, when optimized, can result in an even higher SNR gain factor than possible in classical SR.

Interestingly, the governing equations of the QSR effect are linear in the dependent variables, and do not even require an explicit injected-noise term (additive or otherwise). The nonlinearity enters through the way in which the input signal modulates the dynamics while is Error! Objects cannot be created from editing field codes. enters the ODEs multiplicatively.

One Way of Controlling the Process is by Modulating the Ambient Temperature (Simulated or Actual).

Decoherence:

The injected noise, even if not explicitly put into the ODEs, enters through a relaxation time (or times), stemming from quantum decoherence due to interactions of the quantum system with its environment, which thus effects a partial quantum measurement upon the system.

Thermalization:

Another way in which noise is injected, is via a "quantum friction", again induced by the interaction of the quantum system with its environment.

Thus, quantum resonance interferometry engine implementation approach distinguishes between two categories of noise: inherent noise (present in the input signal and thus not controllable by the SR/QSR algorithm), and the injected noise added as part of the simulation of the dynamical physical system. Injected noise can be a combination of different types: colored noise, thermal noise, and quantum-decoherence noise.

FIG. 14 describes the QSR reformulation without Bosonic Modes. The time-dependent signal to be analyzed and denoised, which will be denoted, is used to modulate the above potential into the following time-dependent one:

$$V_1(x,t) = V(x) + f(t)x$$

Where the input signal is $$f(t) = A_0 + A_1 \cos(\Omega t + \phi_0) + \text{colored noise} \quad \text{(Eqn. 6)}$$

Approximate truncation to a TLS (Two Level System):

As the Hilbert space of a two-state system has two degrees of freedom, so a complete basis spanning the space consists of two independent states, e.g., a two-state system with the spin of a spin-½ particle such as an electron, whose spin can have values +½ or −½ in units of h. It has been shown that if there is an energy asymmetry between the two states, then complex dynamics can occur and nonlinear effects can be observed. The TLS can be represented using standard Pauli spin-matrices:

$$\sigma_x = \begin{bmatrix} 0 & 1 \\ 1 & 0 \end{bmatrix}, \sigma_y = \begin{bmatrix} 0 & -i \\ i & 0 \end{bmatrix}, \sigma_z = \begin{bmatrix} 1 & 0 \\ 0 & -1 \end{bmatrix} \quad \text{(Eqn. 7)}$$

And refer to the eigenstates of $\sigma_z$ as spin-up $$\left( \begin{pmatrix} 1 \\ 0 \end{pmatrix}, \langle \sigma_z \rangle = +1 \right)$$

and spin-down $$\left( \begin{pmatrix} 0 \\ 1 \end{pmatrix}, \langle \sigma_z \rangle = -1 \right),$$

respectively. These TLS Hilbert-space base vectors correspond, in our truncation from the one-dimensional-particle quantum degrees of freedom, to the ground states of suitable quadratic single-well (unstable) potentials centered about the right- and left well of V(x), respectively. Upon truncation, the zero-signal, zero-noise Hamiltonian KE+V(x)+$A_0$x is then approximately replaced by the unperturbed TLS Hamiltonian operator, $$\hat{H}_0 \epsilon_0 \sigma_z + \Delta \sigma_x,$$

where $$\varepsilon(t) = \sqrt{\frac{a}{b}} f(t)$$

and $\epsilon_0$, defined above, is seen to be the DC component of $\epsilon(t)$.

Density-Operator evolution via Quantum Markov Master Equation[1]:

The ambient bosonic modal-bath of the Legget-Coppersmith et al QSR formalism is replaced, in our approach, with a simultaneous, continuous process of thermalization and quantum-decoherence (the latter being equivalent to continual, partial measurement of $\sigma_z$). The resulting Master Equation for the temporal evolution of $\hat{\rho}$, the TLS density operator, is a modification of the usual QSR Bloch rate equations; it has two independently-adjustable relaxation time constants. The evolving density operator $\hat{\rho}(t)$ - - - a 2 by 2 hermitian matrix in this case - - - represents a TLS with partially-measured $\sigma_z$, so that in general, neither the well (in terms of the pre-truncation potential) nor the wavefunction is sharply determined at any given time t; instead, they are "fuzzy".

Our approximate Master Equation (linear in $\hat{\rho}$ but nonlinear in the signal) is:

$$\frac{d\hat{\rho}}{dt} = \quad \text{(Eqn. 8)}$$

-continued $$-\frac{i}{\hbar}[\hat{H},\hat{\rho}] - \frac{1}{\tau_1}\left(\hat{\rho} - \frac{e^{-\beta\hat{H}}}{tr(e^{-\beta\hat{H}})}\right) - \frac{1}{\tau_2}(\hat{\rho} - \hat{P}_+\hat{\rho}\hat{P}_+ - \hat{P}_-\hat{\rho}\hat{P}_-),$$

where: $\hat{P}_+$ ($\hat{P}_-$) is the Hilbert-space projection operator for $\langle\sigma_z\rangle=1$ ($\langle\sigma_z\rangle=-1$);

$\hbar$ is the reduced Planck's constant, a measure of "quantum fuzziness";

$$\beta = \frac{1}{k_B T}$$

with T the ambient temperature; and,
$k_B$ Boltzmann's constant;
tr denotes Hilbert-space trace; and
$\tau_1$ and $\tau_2$ represent the thermal and decoherence relaxation times, respectively.

The density operator is represented as a two-by-two matrix $$\hat{\rho}(t) = \begin{bmatrix} \frac{1}{2}+\xi & y+iz \\ y-iz & \frac{1}{2}-\xi \end{bmatrix} \quad \text{(Eqn. 9)}$$

where $\vec{r}=(\xi(t), y(t), z(t))$ now replaces the classical-ball-position variable, $x(t)$, as the output signal.

The input signal is f(t). To generate all FFT's and SNR's, replace x(t) and its transform and auto-correlation with the corresponding entities derived from $\xi(t)$ (or, alternatively, either y(t) or z(t) would have worked just as well).

The physical interpretation of $\xi(t)$ is that, were $\sigma_z$ to be fully measured at time t, the probability that $\sigma_z=+1$ would be $\frac{1}{2}+\xi(t)$.

A random number generator is used to generate "dice-throws" for successive ball positions x(t) in terms of $\xi(t)$.

It is important to note that Markovian quantum master equations generally satisfy the following conditions: (i) they describe the dynamics of time scales that are larger than the reservoir correlation time scale, (ii) these stationary solutions give the thermal equilibrium states with a reservoir. But have been shown to be valid only for single systems such as a single harmonic oscillator and a single two-level system.

So, Nuclear Magnetic Resonance (NMR) System—a TLS system can be used as the underlying model for density approximation. NMR deals generally with the behavior of the nuclear spin from the protons in the nucleus in the presence of two orthogonal magnetic fields. Basic NMR theory can be understood by taking the case of a single proton with spin=$\frac{1}{2}$. Because of its quantum mechanical spin property, the proton behaves like a tiny bar magnet. In the presence of an external magnetic field, the proton has essentially two choices: align itself with the field or oppose the field (be anti-parallel).

It takes more energy to oppose the field and this energy difference between the aligned and the anti-parallel states increases with increasing magnetic field strength. As we discussed previously for TLS, electrons (being Fermions) have non-integer values of spin. Specifically, each electron can have either spin ($m_s$)=$\frac{1}{2}$ or $m_s$=$-\frac{1}{2}$. That spin is a quantum mechanical property of an electron that is associated with magnetism, in the sense that you can think of each electron as a tiny bar magnet with a north and a south pole. This magnetic property helps the electron to align itself with an externally applied magnetic field in order to lower its energy. Obviously the energy is lowest when the electron's north pole is aligned with the external field and its energy is highest when it is opposing the external field.

Mathematically, this energy is expressed as:

$$E=-m_s\gamma(\hbar bar)B_0$$

Where,
E=energy of the electron in the magnetic field
$m_s$=$\frac{1}{2}$ or $-\frac{1}{2}$
$\gamma$=constant—also called the gyromagnetic ratio
hbar=Planck's constant (h)/$2\pi$
$B_0$=Strength of the external magnetic field.

The energy E is linearly dependent on the value of $B_0$ (all the rest of the coefficients are parameters). Normally, when there is no external magnetic field present, there is obviously no difference in the energies of electrons with spin=$\frac{1}{2}$ or $-\frac{1}{2}$. But when an external magnetic field is applied, this "degeneracy" in energies is removed and there is a distinct energy difference between the spin "up" and the spin "down" states.

This analogy was used to implement resonance for signal enhancement in QRI. The "resonance" part of NMR comes from the fact that if one can now supply the energy difference in the form of photon from an orthogonal electromagnetic (RF) field, then one can make the spins flip in their orientation. The frequency of the RF photon=E/h. In an NMR experiment, the signal results from the RF energy absorbed when these spins flip.

Spin flips can also be caused by the energy supplied by the ambient thermal environment in which the spins exist. Therefore for a solid material with zillions and zillions of protons the equilibrium ratio of the number of protons in the upper level (N") to the number of protons in the lower level ($N^{down}$) is given by:

$$N^{up}/N^{down}=e^{-E/kT} \text{ (where } k\text{=Boltzman Constant and}$$
$T$=absolute temperature).

By convention, the z-axis is designated as the axis for the spin magnetic moment. Therefore, at thermal equilibrium, the net magnetic moment of a material, $M_z$, is given by:

$$M_z=\hbar\gamma(N^{down}-N_{up})$$

Thermal Relaxation and Quantum Decoherence Relaxation:

These are understood mechanisms by which the electron spins can dissipate their energy to the environment. These mechanisms are distinct and characterized by time constants that tell you over what kinds of time scales these dissipation effects occur. By using a Thermal Relaxation time constant, we end up coupling a bistable Fermion system with a thermal reservoir and not a Boson reservoir. Therefore, the fast-approximation in QRI implementations is not for a Spin-Boson system, but rather for a Spin-Thermal Reservoir system.

Density Matrices:

Based on the Quantum Markov Approximation, spin-density matrices in a Markov-Chain Approach are set up where the future state of a system is only dependent on the current state and not on past states. The state update is implemented based on algorithm proposed by Nicholas Metropolis, Metropolis-Hastings algorithm.

The density matrix is defined as a Hermitian matrix of trace one that describes the statistical state of a quantum system. In order to obtain a value for an observable, a specific "density operator" for that particular observable, operates on the density matrix for the system to create eigenvalues corresponding to the observable. In our case, the operator is the Hamiltonian that stands for the total energy of the system.

As to the diagonal elements, they comprise of the energy difference between PotMinA and PotMinB ($\epsilon_0$) to which is added $\zeta_k$ the kth element of the input signal (power spectrum) vector.

The Delta ($\Delta$) corresponds to a transverse magnetic field that causes the spin to flip orientation from the +ive z-direction to the −ive z-direction and vice versa.

The reservoir temperature $\square$ is incremented by a factor $(1+\zeta_k)$.

Time Evolution of Magnetic Spins

Thermal Relaxation time constant ($t_1$):

When the equilibrium value of the magnetic moment ($M_0$) of a material is changed, say by applying an external RF excitation, then the system tries to get back to its equilibrium state by giving up its energy gain to the thermal environment. This thermal relaxation process (also known as spin-lattice relaxation) is governed by the following equation:

$$M_z(t) = M_0(1 - e^{t/t_1})$$

Spin Decoherence Time Constant ($t_2$):

In some NMR experiments the spins are bunched together to be "in phase" or coherent with each other during their precession around the external magnetic field direction. However, due to inhomogeneities in the magnetic field, a "decoherence" effect occurs in that the spins spread away from each other in their rotations about the z-axis. This effect can be essentially visualized as the degradation of the net magnetic moment in the xy plane. When the spins are bunched together, there is a net magnetic moment in the x-y plane. When they are completely decoherent and in random precessional orbits, $M_{xy}=0$. Thus, the decoherence relaxation process (also known as spin-spin relaxation) is governed by the following equation:

$$M_{xy}(t) = M_{xy0}(e^{-t/t_2})$$

Bloch Equations:

Now one can construct the "Bloch" Equations of Motion, which are a kind of Maxwell Equations for NMR, that describe the dynamics of spin motion under RF excitation in the presence of the thermal environment and spin-spin decoherence:

$$\frac{dM'_x}{dt} = (\omega_0 - \omega)My' - \frac{M'_x}{t_2} \quad \text{(Eqn. 10)}$$

$$\frac{dM'_y}{dt} = -(\omega_0 - \omega)M'_x + 2\pi\gamma B_1 M_z - \frac{M'_y}{t_2} \quad \text{(Eqn. 11)}$$

$$\frac{dM_z}{dt} = -2\pi\gamma B_1 M'_y - \frac{(M_z - M_{z_0})}{t_1} \quad \text{(Eqn. 12)}$$

Where $B_1$=transverse RF magnetic field ($\Delta$ in our case) and $\omega_0$ is known as the Larmor frequency (constant) and $\omega$ is the time dependent precession frequency, which I am not sure how to relate to our equations. I believe it may show up as an energy asymmetry term. Although the Bloch equations describe the evolution of the magnetic moment, they can be converted to time dependent energy equations (i.e. Hamiltonian evolution) by multiplying both sides by =B.

Denoting the time-independent Hamiltonian by H, and we label the two levels as |a⟩ and |b⟩ with corresponding orthonormal energy eigenvalues $E_a$ and $E_b$. The dynamics of the system can be specified as follows:

At some time $t_0$, let the system be in an arbitrary (and completely general) state, $$|\psi(t_0)\rangle = c_a|a\rangle + c_b|b\rangle$$

then after evolving under H, at time t, the state will be $$|\psi(t)\rangle = c_a e^{-i\frac{E_a(t-t_0)}{\hbar}}|a\rangle + c_b e^{-i\frac{E_b(t-t_0)}{\hbar}}|b\rangle$$

Where the set of all states in the two-level system can be mapped onto the Bloch sphere constrained by equations of motions discussed above.

Figure 15:
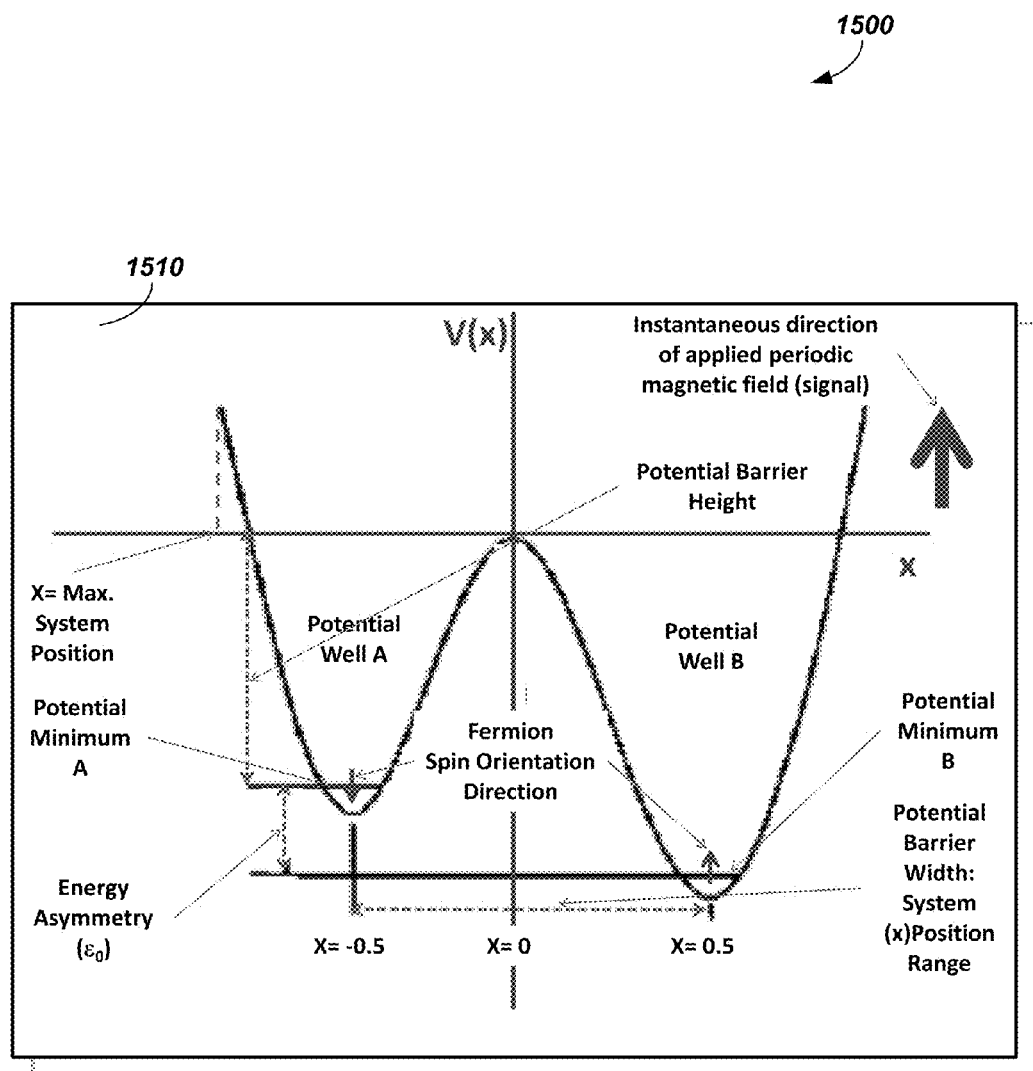
FIG. 15 shows an example of a double well function.

As in 1405, a QSR Bistable Well driven with an external driving periodic function is initialized using
systemEnergyRatio=beta $\epsilon_0$ $$x_0 = -\sqrt{\frac{a}{b}}$$

$$x = x_0$$

$$y = 0$$

$$z = 0$$

$$x' = 0$$

$$y' = 0$$

$$z' = 0$$

$$a = \frac{1}{\tau}$$

Where x, y, and z denote the variables in Bloch Rate equations customized from the general form given in Eqn. 10, 11, and 12. xo denotes the state variable for the NMR particle $x_0$ denotes the state variable for the NMR particle. $\alpha$ and $\tau$ denote the thermalization coefficients. The enhanced voxel and data and Tunneling Rate are reset per An exemplary Double Well Function is shown in FIG. 15.
enhancedData[0]=$x_0$
countCrossings=0

The noise designed using process described in FIG. 9-A through 9-D, and the amplitude corridor output in FIG. 9-C and phase corridor output in FIG. 9-D is used to design noise that is added to the voxel data input to initialize the state of the particle given by X.

At 1410, the double well as in 1510, the design is validated using conditions.

If(systemEnergyRatio>masEnergyRatio)

barrierWidth=$2\epsilon_0 e^{-systemEntegyRatio}$ x=tan h(systemEnergyRatio)

where the system energy ratio is a user set parameter.

At 1420 an iteration count is initialized to start NMR iterations.

At 1430 the NMR-QSR iteration parameters are initialized per $$\varepsilon_{now} = \varepsilon_0 + inputData[k] \cdot abs(potentialMinA)$$

$$rabiRoot = \sqrt{\varepsilon_{now}^2 + barrierWidth^2}$$

-continued $$tanArg = \beta \cdot rabiRoot$$

$$tanVal = 1$$

if $(tanhArg < maxEnergyRatio) tanhVal = \tanh(tanhArg)$

At 1440, the NMR-QSR equations of motion derived from Bloch Rate Equations are iterated according to $$tanhRatio = \frac{tanhVal}{2 \cdot rabiRoot}$$

$$x' = \frac{barrierWidth \cdot z}{hVarPlank} - \frac{x + \varepsilon_{now} \cdot tanhRatio}{thermalRelaxationTime}$$

$$y' = \frac{\varepsilon_{now} z}{hVarPlank} - \frac{y}{decoherenceRelaxationTime} - \frac{y + barrierWith \cdot tanhRatio}{thermalRelaxationTime}$$

$$z' = \frac{\varepsilon_{now} y - barrierWidth \cdot x}{hVarPlank} - z\left(\frac{1}{decoherenceRelaxationTime} + \frac{1}{thermalRelaxationTime}\right)$$

The Bloch equations are a set of coupled differential equations which can be used to describe the behavior of a magnetization vector in an NMR mathematical model under any conditions. When properly integrated, the Bloch equations will yield the x', y', and z' components of magnetization as a function of time. Only the behavior in x' is used to track changes in the particle state to conclude resonance events.

The particle state is updated at 1450 using the equation for state update given by enhancedData[k]=enhancedData[k−1]+dt·x' x=enhancedData[k]

y=y+dt·y' z=z+z' reg$_1$=regThreshold−($x^2+y^2+z^2$)

At 1460, the tunneling rate (TR) can be calculated using the logic

```
if (enhancedData[k] · enhancedData[k − 1] > 0)
    {
    wellResidencyTime++
} else {
        if (wellResidencyTime > residencyMin) {
            countCrossings += 0.5
        }
        wellResidencyTime = 0
}
```

Once the TR has been updated the iteration count k is updates at 1470.

A 1480, a check is performed to assess whether the iteration count has been exceeded. If so, then the process 1400 stops the NMR-QSR iterations and outputs a prospect voxel output. The prospect voxel output is defined as Enhanced Data in 839 and the tunneling rate TR.

Referring to FIG. 8 and FIG. 10, quantum resonance interferometry processor 831 can be implemented using the steps 1405 through step 1420 of process 1400. Also, the interferometric coupler 833 can be implemented using steps 1440 through 1480.

Referring to FIG. 10, the quantum resonance interferometry processor 1022 can be implemented using the steps 1405 through 1480. Only the enhanced data computed using 1450 is output, and re-introduced into the Interferometric Coupler 833 as an input to generate resonance 836. quantum resonance interferometry processor 831 can be implemented using the steps 1405 through 1420. And the Interferometric Coupler 833 can be implemented using steps 1440 through 1480 as in FIG. 8. And the QRI Processor 831 is implemented using the Unit 1405 through Unit 1420 as in FIG. 8.

FIG. 15 shows an example of a double well function that represents the quartic potential implemented in 1405.

Figure 16A:
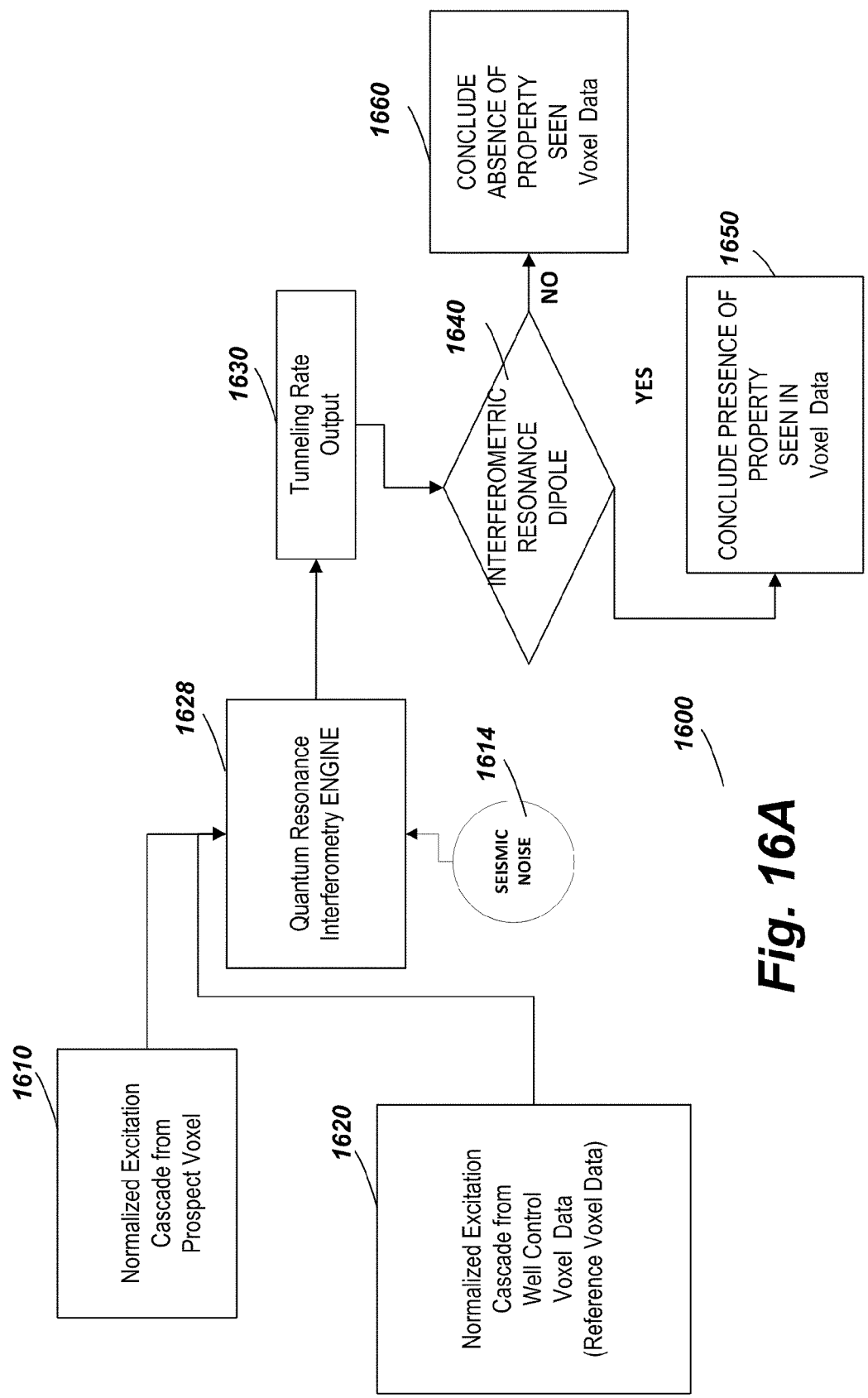
FIG. 16A-16B shows an example of work flow using a quantum resonance interferometry engine for analyzing reservoir attributes and microseismic events of interest.

FIG. 16 shows an example of work flow 1600 using a quantum resonance interferometry engine 1628, such as quantum resonance interferometry engine 828. The work flow 1600 is denoted as a differential interferometry mode whereby the presence of an attribute of interest in a normalized excitation cascade 811, derived from a prospect voxel data 805, is determined by comparing data known to possess the same attribute of interest with the output of a Well Control Voxel. Differential Interferometry mode is used to produce seismic data output volume from all Prospect Voxels in a formation of interest with the same property as found in well control voxel data, termed as a "Reference Voxel Data". Reference Voxel Data can be developed from a single well control voxel or multiple Well Control Voxels using the methods of FIG. 13A through 13D.

Differential interferometry is used to produce results for inquiries such as "Find all areas of porosity in an Escondido sandstone formation on a lease with over 20% porosity as seen in Well No. 32." or "Avoid all areas in the Goen platform on KCB lease which are water wet as in seen in Well No. 26." Inquiries relating to attributes of interest, including rock, fluid and geomechanical properties, reformulated to provide a "Presence" or "Absence" response, are collectively termed as a "prospect question of interest".

Reference voxel data is developed by analyzing the well log relevant to the prospect question of interest posed for the prospect, per the flows in FIG. 13A though 13D and determining the sections in the well logs from well control that meet criteria of interest to develop well control voxel data 1620 denoted as Reference voxel data. Once the reference voxel data has been generated, the prospect voxel data from seismic partitioned volumes as in FIG. 5 are transformed to normalized excitation cascade vectors and analyzed by the quantum resonance interferometry engine 1628. The results from quantum resonance interferometry engine 1628 are compared to see if voxel data possesses the same property as reference voxel data to answer the prospect question of interest.

Work flow 1600 shows the differential interferometry mode of operation. In this model operation as in 1600, presence of an attribute of interest in a normalized excitation cascade, such normalized cascade 811 derived from prospect voxel data 805 is determined by comparing output at 839 with the output of a normalized excitation cascade derived from a well control voxel data. A prospect voxel data could be compared against positive well control voxel data or negative control voxel data using differential interferometry mode of operation as in 1600. Also, prospect voxel data could be compared against one or more well control voxels, obtained by using the flow in FIGS. 12-A and 12-B. Output of the work flow 1600 is a determination of presence or absence of an attribute of interest in the prospect voxel data.

At 1610, a normalized excitation cascade is produced from a prospect voxel data using the process 1200 in FIGS. 12A and 12100 in FIG. 12B. At 1620, a normalized excitation cascade, termed as Reference Voxel Data, is produced from one or more well control voxels using the flow 1200 in FIGS. 12A and 12100 in FIG. 12B. Depending on the attribute of interest, the Well Control Voxels are generated and processed per the flows described in FIG. 13A through 13D.

Outputs from 1610 and 1620 are introduced into the quantum resonance interferometry engine 828, driven by both seismic noise such as seismic noise 814, produced, for example, using the flows in FIG. 9-A through 9-B, as inputs in a pair-wise sequence—1610 followed by 1620, or 1620 followed by 1610. In some examples, two versions of the quantum resonance interferometry engine 828 may be used to independently process 1610 and 1620 with the results recombined in 1630.

quantum resonance interferometry engine 1628 produces a Tunneling Rate outout 1630 per the flow described in process 1400. Once the output of 1630 has been obtained from processing inputs 1610 an 1620, the tunneling rate outputs are compared in 1640 to determine if resonance was obtained using both inputs 1610 and 1620.

At 1640, a determination is made whether the tunneling rate change output when using quantum resonance interferometry engine 1628 driven by prospect voxel data 1610 is greater than or equal to the Tunneling Rate change when quantum resonance interferometry engine 1628 is driven by Reference Voxel Data 1620. Successful conclusion of this conditional is termed as an Interferometric Resonance Dipole 1640. Interferometric Resonance Dipole requires quantum resonance interferometry engine 1628 to be configured in a manner such that resonance events occur when Reference Voxel Data is presented, and no resonance events occur when only inputs from seismic data noise as 1614 (such as seismic noise 814) are presented. Incoming, unknown, and uncharacterized prospect voxel data may or may not yield tunneling resonance when introduced into the quantum resonance interferometry engine 1628. Tunneling Resonance is concluded when there is a statistical difference between the Tunneling Rate Change as determined by observing the Tunneling Rate using prospect voxel data as an input or Reference Voxel Data as input compared to the Tunneling Rate output obtained using only seismic noise as an input. A statistical difference criterion for Interferometric Resonance Dipole 1640 is established by running multiple inputs derived from seismic noise and well control voxel data and computing the mean and standard deviations for the runs. As an example, in one embodiment 2 s different between the TR output from well control voxel data as input and seismic noise data as input is used as a measure of statistical significance to establish threshold for 1640.

At 1650, the presence of property of interest in prospect voxel data is concluded if an Interferometric Resonance Dipole is found at 1640. At 1660, an absence of property of interest in prospect voxel data is concluded if a Interferometric Resonance Dipole is not found at 1640. In some examples, the process 1600 can applied to sequence all prospect voxel data derived from the partitioned seismic volume of interest in 120.

Figure 16B:
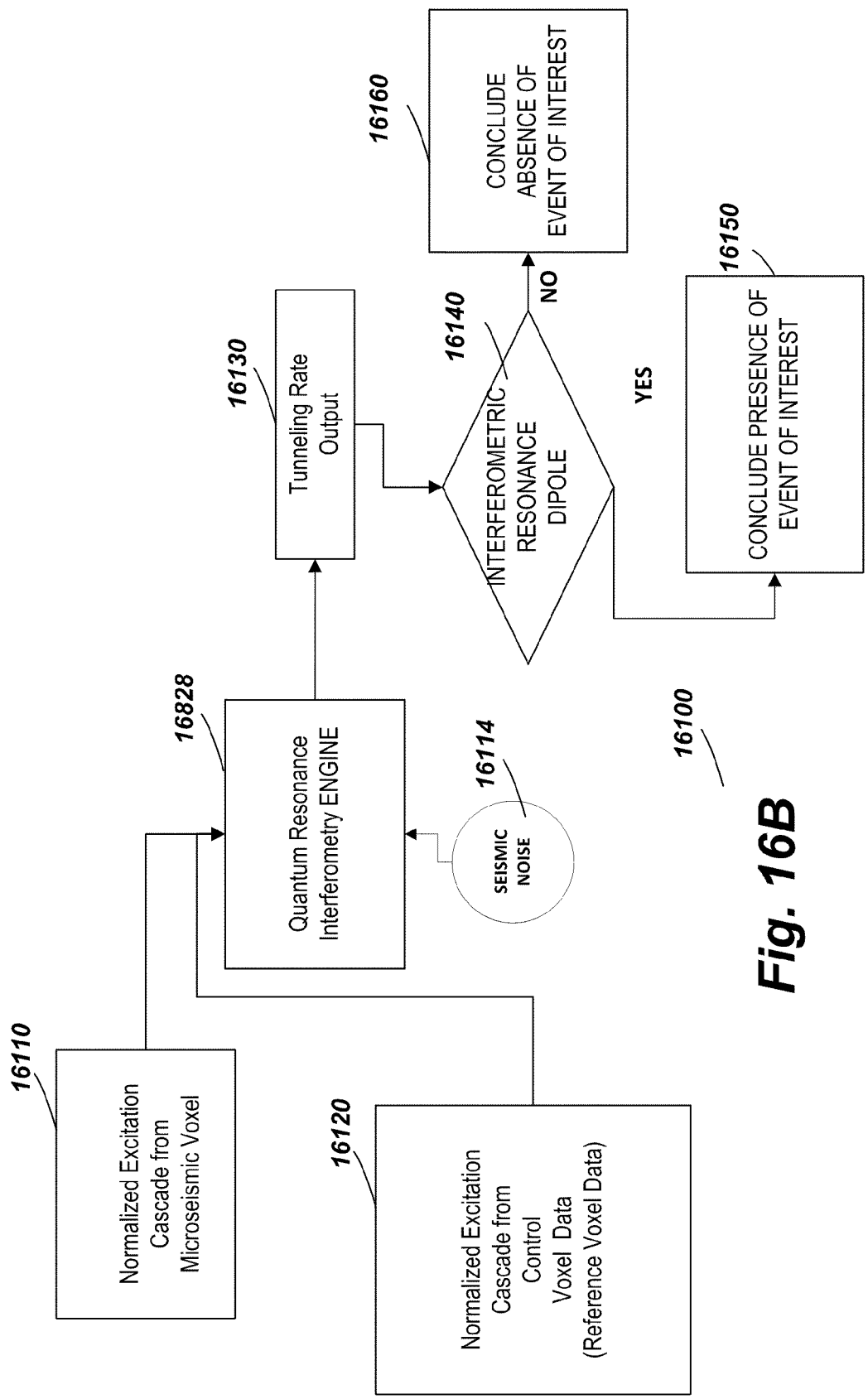

Work flow 16100 in FIG. 16B shows the differential interferometry mode of operation for processing voxels derived from microseismic data. In this model operation presence of a fracturing event of interest in a normalized excitation cascade, such normalized cascade 811 derived from prospect voxel data 805 is determined by comparing output at 839 with the output of a normalized excitation cascade derived from a control voxel data. A prospect voxel data could be compared against control voxel data using differential interferometry mode of operation in 16100. Also, prospect voxel data could be compared against one or more control voxels, obtained by using the flow in FIGS. 6 and 7. Output of the work flow 16100 is a determination of presence or absence of a fracturing displacement event of interest in the voxel data derived from microseismic dataset.

At 16110, a normalized excitation cascade is produced from a voxel. At 16120, a normalized excitation cascade, termed as Reference Voxel Data, is produced from one or more microseismic control voxels using the flow 8200 in FIG. 8C. Depending on the attribute of interest, the control voxels are generated and processed per the flows described in FIG. 8C

Outputs from 16110 and 16120 are introduced into the quantum resonance interferometry engine 828, driven by both microseismic noise such as microseismic seismic noise 8214, produced, for example, using the flows in FIG. 9-A through 9-B, as inputs in a pair-wise sequence—16110 followed by 16120, or 16120 followed by 16110. In some examples, two versions of the quantum resonance interferometry engine 828 may be used to independently process 16110 and 16120 with the results recombined in 16130.

A quantum resonance interferometry engine 828 produces a Tunneling Rate output 16130 per the flow described in process 1400. Once the output of 16130 has been obtained from processing inputs 16110 an 16120, the tunneling rate outputs are compared in 16140 to determine if resonance was obtained using both inputs 16110 and 16120.

At 16140, a determination is made whether the tunneling rate change output when using quantum resonance interferometry engine 16128 driven by microseismic voxel data 16110 is greater than or equal to the Tunneling Rate change when quantum resonance interferometry engine 16128 is driven by Reference Voxel Data 16120 derived prior to the hydraulic fracture event. Successful conclusion of this condition is termed as an Interferometric Resonance Dipole 16140. Interferometric Resonance Dipole requires quantum resonance interferometry engine 16128 to be configured in a manner such that resonance events occur when Reference Voxel Data is presented, and no resonance events occur when only inputs from seismic data noise as 16114 (such as seismic noise 814) are presented. Incoming, unknown, and uncharacterized prospect voxel data may or may not yield tunneling resonance when introduced into the quantum resonance interferometry engine 16128. Tunneling Resonance is concluded when there is a statistical difference between the Tunneling Rate Change as determined by observing the Tunneling Rate using prospect voxel data as an input or Reference Voxel Data as input compared to the Tunneling Rate output obtained using only microseismic noise as an input. A statistical difference criterion for Interferometric Resonance Dipole 16140 is established by running multiple inputs derived from micrsoseismic noise and control voxel data and computing the mean and standard deviations for the runs. As an example, in one embodiment 2 s different between the TR output from well control voxel data as input and seismic noise data as input is used as a measure of statistical significance to establish threshold for 16140.

At 16150, the presence of fracture event of interest in prospect voxel data is concluded if an Interferometric Resonance Dipole is found at 16140. At 16160, an absence of fracture event of interest in prospect voxel data is concluded if a Interferometric Resonance Dipole is not found at 16140.

In some examples, the process 16100 can applied to sequence all prospect voxel data derived from the partitioned seismic volume of interest in 120.

FIG. 17A shows an example of a process 17100 to compute and predict formation porosity from seismic data. Workflow 17100 can be performed using the systems and techniques discussed herein, such as by using quantum resonance interferometry engine 828. Different ranges of porosity are of interest in different formations for different prospects. The economics of oil and gas exploration and production specify cut-offs on porosity values that are relevant to positioning new wells or new offset wells on a prospect. For example, drilling locations for offset wells are determined in relationship to an existing well and may be subject to inter-well spacing requirements constraints imposed by governing regulations for that particular formation. For example, in some states in the US only 1 well can be drilled on a 40 acre spacing for certain formations. Accurate knowledge of subsurface formation porosity is used to optimally position wells to avoid dry holes and maximize recovery. The commercial exploration criteria for porosity are provided by a client, project geologist or by the exploration manager or the lease owner/operator. Some examples of the types of answers provided by process 17100 include:

What is the formation porosity? Or what is the Devonian formation porosity on a lease?

Find a porosity of above x % (where x could be 10%, 6%, or 12% or any numerical cut-off) in the Devonian on a lease?

What is the acreage of Devonian porosity above 12% on a lease?

Are there sandstone channels with porosity over 12% in the Mississippian formation on a lease?

Drilling a development offset is desired on a new section of the lease where the porosity matches the same as found in an existing drill at an particular location.

Find an area with the same porosity characteristics?

Which lease section should be developed first (e.g., one block vs. another block). Delineate and size Abo reservoirs on the basis of their porosity distribution? These questions can be answered, using the process 17100 of FIG. 2 to finding the highest porosity or porosity above a specific cut-off to develop a Porosity-Cube output 275.

Process 17100 can determine a porosity-cube when it is implemented iteratively to determine a maximum porosity estimated for each of multiple prospect voxelsOnce a porosity range of interest is established for a prospect, it is broken down into intervals that can be analyzed based on well control on the prospect or using analogous well controls from other fields. prospect voxel data for the prospect voxels are tested for porosity above a threshold established by the lowest interval set for the range of interest. The workflow 17100 can be performed iteratively such that in successive iterations only voxels that exceed the porosity threshold established in the previous run are analyzed to assess if they exceed a new threshold. prospect voxel data that exceed the porosity criteria in iteration are denoted as "Surviving Prospect Voxel" data. This process is repeated for surviving voxel data until the entire porosity range is covered.

Prime-amplitude spectral decomposition 560 or high frequency spectral decomposition volume 560 is obtained at 17102 as a starting input for computations specific to formation porosity estimation. Such starting inputs can be obtained for example at step 560 in FIG. 5. The starting input is voxelized at 760, (such as is described in connection with FIG. 7) to produce a sequence of prospect voxel data. Individual Prospect Voxels are processed sequentially according to the process 17100 to construct a Porosity-Cube output 17160. At 17190 a normalized excitation cascade is generated (such as described in connection with 12190) from the prospect voxel data and input to the quantum resonance interferometry engine 828.

A porosity range of interest is obtained as an external input from, e.g., the geologist, operator or a lease stakeholder at 17101. The porosity range of interest is used to produce cut-off thresholds at 17105 to select the appropriate well log sections to develop well control voxel data. The porosity range is reduced to multiple porosity increment intervals, such as 4% increments of porosity (e.g., for sandstone) or 2% (e.g., for detrital limestone such as Strawn). At 17120, porosity cut-off thresholds for porosity increment intervals from 17105 are used to develop the well control voxel data (e.g., such as by using the flow detailed in FIG. 13A) to produce an output as in 13170.

The well control voxel data is used to calibrate 17407 the parameters of the quantum resonance interferometry engine 828 to be used (e.g., in implementing the flow described in 1400) to generate resonance events when Prospect Voxels are derived from regions in the formation of interest that have porosity matching or exceeding the porosity as seen in the well control on the prospect of analogous wells drilled in the same formation at another prospect. These criteria include the calibration of parameters for a double well function, such as is described in FIG. 15 as related to the determination of Tunneling Rate and resonance. Double well parameters are reset for each successive porosity interval iterated by the quantum resonance interferometry engine 828 on Surviving prospect voxel data. Double well parameters can include:

Initialization of energy asymmetry in the double well potential function,

Interwell spacing

Width of two wells in the double well

Barrier height

Maximum jumps allowed by the Bloch Rate Equation in Eqn 10, 11, and 12, and

Residency time for spin-particle.

Output of quantum resonance interferometry engine 828 for a prospect voxel is examined for Tunneling Resonance (e.g., by using the process 1700) to see if the prospect voxel data meets the porosity threshold criteria provided in 17101 and used to produce well control prospect voxel data. The prospect voxel data, in the first iteration of the quantum resonance interferometry engine, and surviving prospect voxel data in successive runs of the quantum resonance interferometry engine are processed by the quantum resonance interferometry engine 828 to produce an output which is evaluated at 17130. If it is determined that porosity criteria is exceeded (e.g., based on method in 1400 or using Differential Interferometry method of 1600) then the prospect voxel data is concluded to be a surviving prospect voxel data for a next iteration. If the porosity threshold is not exceeded then the prospect voxel is not iterated in any subsequent iteration.

A check is performed at 17140 to ensure that all prospect voxel data or surviving prospect voxel data for a current iteration has been processed. If not, then next prospect voxel or Surviving prospect voxel data in the sequence is retrieved in 17170 and the process repeated from 17190 in flow 17100. If the check in 17140 indicates that all prospect voxel data or surviving prospect voxel data have been processed then another check 17150 is performed to see whether the upper limit of porosity for the workflow has been exceeded. If the check in 17150 is successful then the Porosity-Cube result is output such as in SEGY notation. If the check is 17150 is unsuccessful then the porosity threshold is updated to the next interval established in 17145. The quantum resonance interferometry engine parameters (e.g., double well parameters) are updated for the next iteration. And, the process is repeated.

The process 17100 can be used to implement one or more porosity intervals of interest. It can also be used to derive all voxels above a porosity threshold of interest by establishing a single interval [0,threshold] and assessing the set of Surviving prospect voxel data after the first iteration. This set of voxels in surviving prospect voxel data provides areas in the formation that have formation porosity above or below a pre-specified cut-off threshold of interest.

Figure 17B:
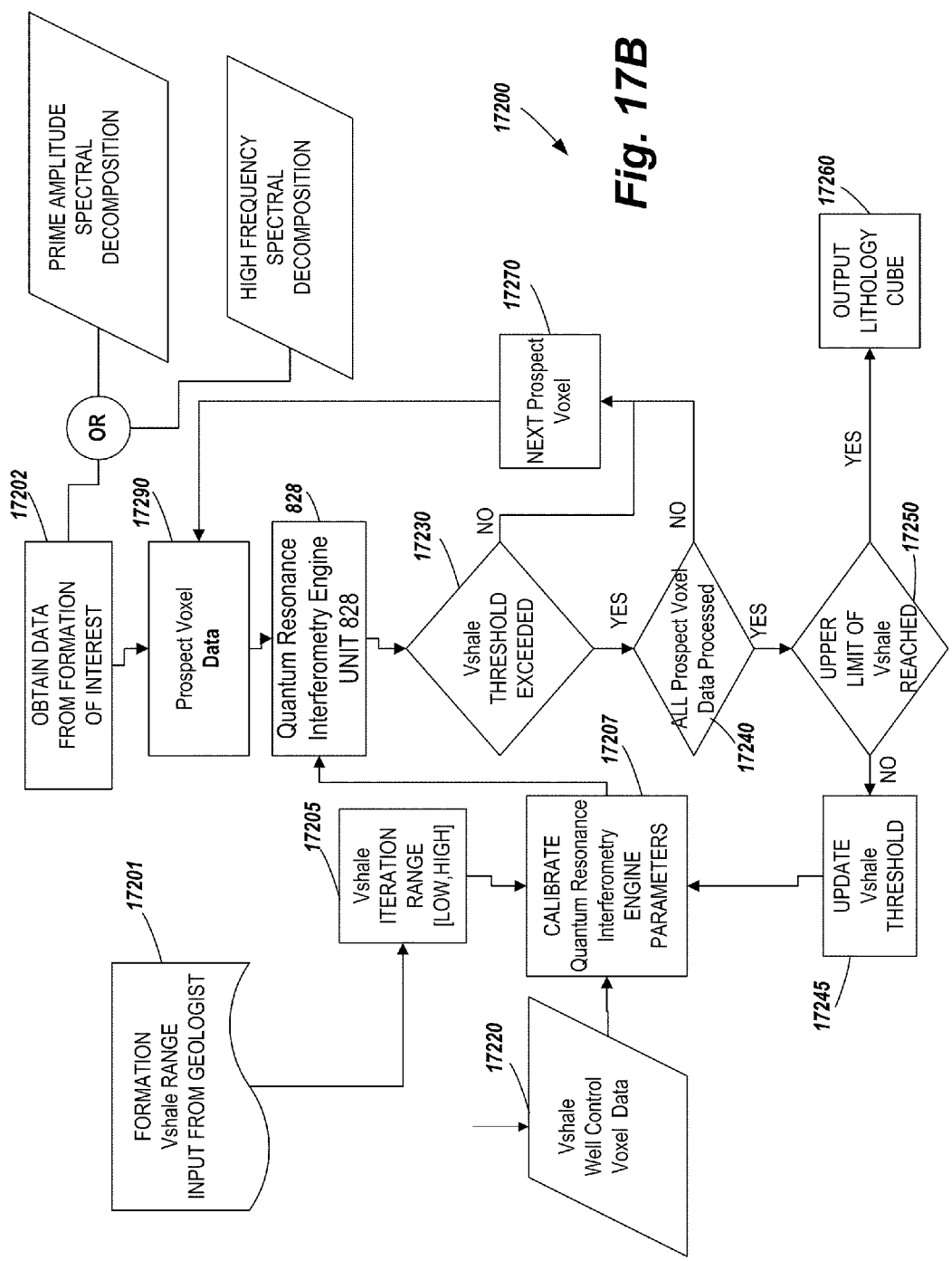

FIG. 17B shows an example of a workflow 17200 to compute and predict Vshale levels using seismic data. Workflow 17100 can be performed using the systems and techniques discussed herein, such as by using quantum resonance interferometry engine 828. Different ranges of Vshale are of interest in different formations for different prospects. Unlike porosity, Vshale is often used as avoidance-attribute, i.e., areas with high Vshale are to be avoided for positioning a well. The economics of oil and gas exploration and production specify lower cut-offs on Vshale values that are relevant to positioning new wells or new offset wells on a prospect. Accurate knowledge of subsurface formation Vshale is used to optimally position wells to avoid dry holes and maximize recovery. The commercial exploration criteria for Vshale are provided, for example, by a client, project geologist or by the exploration manager or the lease owner/operator. Some examples of the types of answers provided by process 17200 include:

How large is an area with Vshale levels below 30%?

What is the percentage of Vshale in a sandstone channel?

These questions can be answered, using the process 17200 to finding areas below pre-specified Vshale cut-off criteria to develop a Vshale-volume or Lithology-Cube output as shown at 275 in FIG. 2.

Process 17200 can determine a Lithology-Cube when it is implemented iteratively to determine a maximum Vshale estimated for each of multiple prospect voxels. Once a Vshale range of interest is established for a prospect, it is broken down into intervals that can be analyzed based on well control on the prospect or using analogous well controls from other fields. prospect voxel data for the prospect voxels are tested for Vshale above a threshold established by the lowest interval set for the range of interest. The workflow 17200 can be performed iteratively such that in successive iterations only voxels that exceed the Vshale threshold established in the previous run are analyzed to assess if they exceed the new threshold. prospect voxel data that exceed the Vshale threshold in iteration are denoted as "Surviving Prospect Voxel" data. This process is repeated for Surviving prospect voxel data until the entire porosity range is covered. Transformations implemented by 17200 are Either a prime-amplitude spectral decomposition or high frequency spectral decomposition volume is obtained at 17202 as a starting input for computations specific to formation Vshale estimation. Such starting inputs can be obtained for example at step 560 in FIG. 5. The starting input is voxelized at 17290 (such as is described in connection with FIG. 7) to produce a sequence of prospect voxel data. Individual Prospect Voxels are processed according to the process 17200 sequentially to construct a Lithology-Cube output 17260. At 17290 a normalized excitation cascade is generated (such as is described in connection with 12190) from a prospect voxel data and input to the quantum resonance interferometry engine 828.

A Vshale range of interest is obtained as an external input, e.g., from the geologist, operator or a lease stakeholder at 17201. The Vshale range of interest is used to produce cut-off thresholds as in 17205 to select the appropriate well log sections to develop well control voxel data. The Vshale range is reduced to multiple of Vshale increment intervals, such as 20% increments of Vshale (e.g., for sandstone) or 10% increments (e.g., for detrital limestone such as Strawn). A 17220, Vshale cut-off thresholds from 17205 are used to develop the well control voxel data, such as by using the flow detailed in FIG. 13B to produce an output as in 13270.

The well control voxel data is used to calibrate 17207 the parameters of the quantum resonance interferometry engine 828 to be used in implementing the flow described in 1400, to generate resonance events when Prospect Voxels are derived from regions in the formation of interest that have Vshale matching or exceeding the Vshale as seen in the well control on the prospect of analogous wells drilled in the same formation at another prospect. These criteria include the calibration of parameters for a double well function, such as is described in FIG. 15 as related to the determination of Tunneling Rate and resonance. Double well parameters are reset for each successive Vshale interval iterated by the quantum resonance interferometry engine 828 on Surviving prospect voxel data. Double well parameters can include:

Initialization of energy asymmetry in the double well potential function,

Interwell spacing,

Width of two wells in the double well,

Barrier height,

Maximum jumps allowed by the Bloch Rate Equation in Eqn 10, 11, and 12, and

Residency time for spin-particle in a particular well

Output of quantum resonance interferometry engine 828 is examined for Tunneling Resonance, such as by using the flow 1700, to see if the prospect voxel Data meets the Vshale threshold criteria provided in 17201 and used to produce well control prospect voxel data. The prospect voxel data, in the first iteration of the quantum resonance interferometry engine, and surviving prospect voxel data in successive runs of the quantum resonance interferometry engine are processed by the quantum resonance interferometry engine 828 to produce an output which is evaluated at 17230. If it is determined that Vshale criteria is exceeded (e.g., based on method in 1400 or using differential Interferometry method of 1600) then the prospect voxel data is concluded to be a surviving prospect voxel data for a next iteration. If the Vshale threshold is not exceeded then the prospect voxel is not iterated in any subsequent iteration.

A check is performed at 17240 to ensure that all prospect voxel data or surviving prospect voxel data for a current iteration has been processed. If not, then next prospect voxel or Surviving prospect voxel data in the sequence is retrieved in 17270 and the process repeated from Unit 17290 in flow 17200. If the check in 17240 indicates that all prospect voxel data or surviving prospect voxel data have been processed then another check 17250 is performed to see whether the upper limit of Vshale for the workflow has been exceeded. If the check in 17250 is successful then the Lithology-Cube result is output such as in SEGY notation. If the check is 17250 is unsuccessful then the Vshale threshold is updated to the next interval established in 17245. The quantum resonance interferometry engine parameters (e.g., double well parameters) are updated for the next iteration. And, the process is repeated.

The flow 17200 can be used to implement one or more Vshale intervals of interest. It can also be used to derive all voxels above or below a Vshale threshold of interest by establishing a single interval [0,threshold] or [threshold, upper range for formation] respectively, and assessing the set of surviving prospect voxel data after the first iteration. This set of voxels in surviving prospect voxel data provides areas in the formation that have Vshale above or below a prespecified cut-off threshold of interest.

Figure 17C:
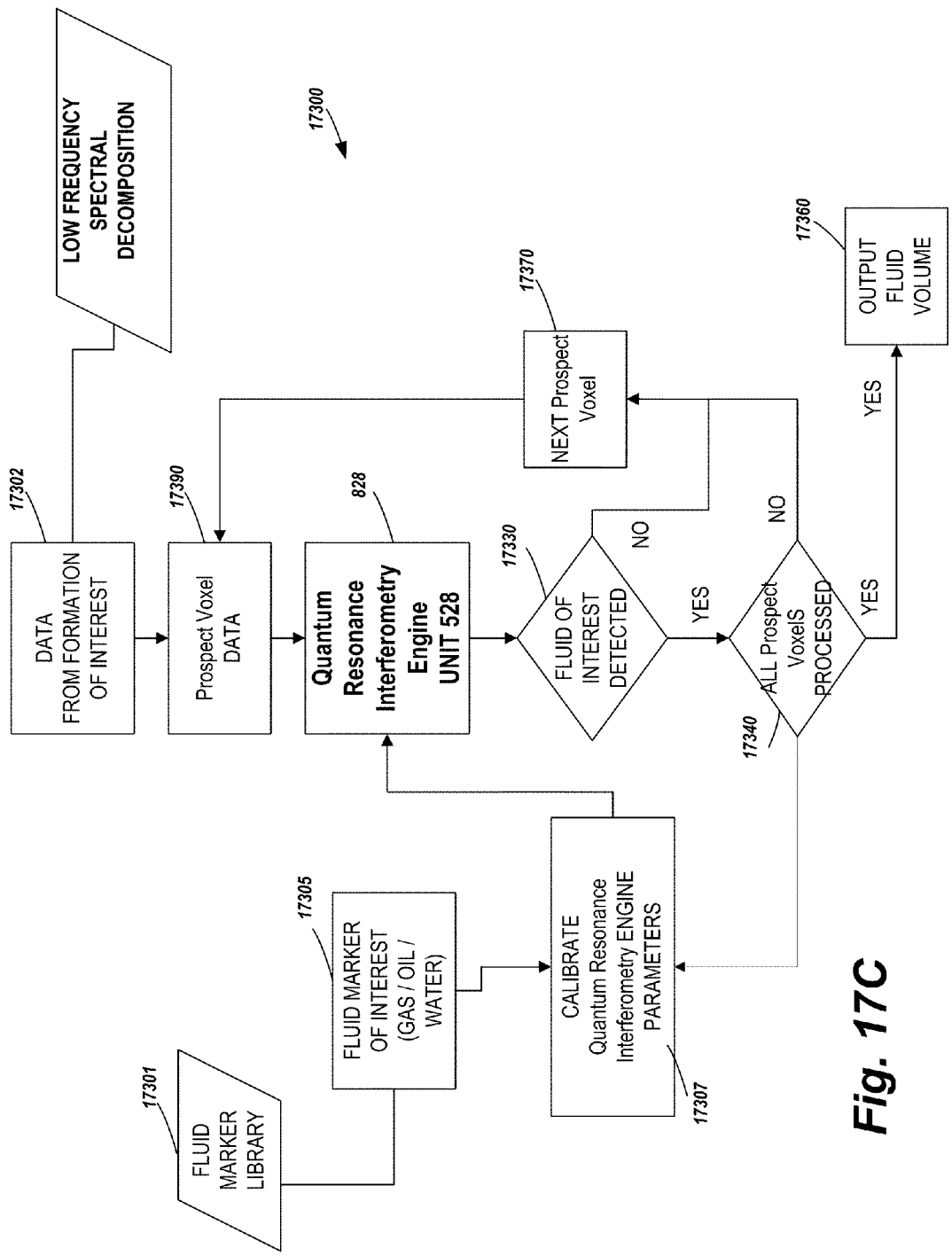

FIG. 17C shows an example of a process 17300 to determine fluid presence and fluid type, including oil, gas, and water using seismic data. Process 17300 can also be used to determine a oil-water contact boundary or a gas-water boundary. In some examples, process 17300 implements a search for a fluid marker (for gas, oil or water) derived from well control voxel data. In some examples, process 17300 implements a quantitative estimation of low frequency spectral attenuation in prospect voxel data. It is known to those skilled in the art, and has been shown by empirical measurements on controlled experiments, that lower frequencies in acoustic propagation and reflection are differentially attenuated by fluids such as oil, water and gas. However, this attenuation is very small, often less than 1% (for clastic laminates) and even down to 0.01% (tight carbonates such as strawn limestone) while the noise in seismic data can be higher than 1% to 3%. In such a case, differential attenuation of reflected spectral energy in seismic is an relatively weak signal in high background noise and clutter. Process 17300 can identify differential attenuation even from within such background noise and clutter.

Process 17300 distinguishes between fluid-in place or hydrocarbon trap and contrast it with areas where hydrocarbon was once present but has now migrated and may be replaced by brine or freshwater. This has commercial implications for both conventional on-shore and off-shore carbonate and clastic plays. It is also used to explain the spotty behavior observed when wells and offset wells drilled close together often have different outcomes in hydrocarbon recovery and presence. Process 17300 detects hydrocarbon related informationusing seismic data. For example, process 17300 can detect spectral attenuation in seismic data, specifically using low frequency spectral decomposition volumes. Such a technique is applied to low frequency spectral decompositions but can also be applied to high frequency and prime amplitude spectral decompositions as well.

Low frequencies are used to detect, discriminate and delineate fluids and oil water contact. It is not the image quality or the low frequency itself that is important, but the ability to see relative attenuation in the low frequencies as established by differences between petrophysically identified zones of interest and water-wet or zones with no fluid.

Using well log data and seismic volume can extend the low frequency boundaries for processed volumes. By combining seismic data, well log data and underlying rock physics properties to estimate attributes beyond the boundaries of conventional processing and using rock physics relationships to design how the two can be combined meaningfully. Unlike a conventional seismic impedance inversion processing that is driven using amplitudes above −6 dB or above −10 dB this methods exploits a different spectral bandwidth regime. By extending the input data bandwidth by another −10 dB to −14 dB, the method effectively extends the low frequencies driving the analysis by anywhere from 2 Hz to 6 Hz at the target depending on the resonant frequency of the geophones, assuming that active vibration source dwelled in the low frequency region for a suitable time window (depending on the formation of interest).

In summary, method of FIG. 13C as in 13300 to design well control voxel data ensures that positive control voxel and negative control voxel are transformed to 1-D Spectral data packets with frequencies where the spectral energy attenuation due to varying fluid type and fluid saturation separates out in the well control regions of interest; and these well control voxel data can be extracted from PSTM/PSDM seismic volume spectrum decompositions, at low frequency intervals. By limiting the amplitudes of extracted spectrum decompositions to be above −22 dB to −24 dB, to satisfy boundary conditions for the underlying quantum resonance interferometry engine calibrated to provide a 1:100 SNR detection. Different calibration would be needed to process prospect voxel data and design well control voxel data if amplitudes below −24 db are to be used.

If the spectral energy attenuation in well control voxel data extracted from spectral decompositions does not separate the zones of interest for fluid determination even down to −24 dB then the voxels are convolved with one or more synthetic carrier kernels (derived using Ricker wavelets with varying amplitudes and side lobes) as in 1200.

At 17302, a low frequency spectral decomposition volume is obtained as a starting input for fluid estimation. Such starting input can be obtained for example at step 560 in FIG. 5.

The starting input is voxelized (such as is described in connection with FIG. 7) to produce as a sequence of prospect voxel data. prospect voxel data for individual prospect voxels are processed according to process 17300 sequentially to construct a Fluid Volume output 17360.

At 17390, a normalized excitation cascade is generated (such as is described in connection with 12190) from a prospect voxel data and input to the quantum resonance interferometry engine 828.

At 17301, Fluid Marker libraries refer to the results of empirical studies, or laboratory-experiment observations, or core analysis based calibration tables that specify the relationship between rock-type, fluid saturation, relationship between different well logs, and depth for different formations, traps and fields. Data may be available from the same geological basin or field as the prospect of interest. Well control for the prospect may include results of core analysis that report hydrocarbon saturation levels with sections of the wells already drilled on the prospect. In other cases, handbooks may be available that provide relationship between resistivity logs and fluid saturation levels. In some cases, derived water-logs, constructed from other logs and core data are available. available fluid property data can be used to establish equivalence with sections within drilled wells on the prospect or on an analog.

Once an equivalence for fluid zones of interest has been established with the well logs, well control voxel data is determined at 17305 (such as is described in connection with FIG. 13C). The output from 17305 is denoted as a fluid marker as it presents changes in energy spectral density levels exceedance which can be an indicator of fluid presence or type of fluid present in the formation of interest. Also, if an absolute spectral attenuation relationship has been developed using the process 13300 then process 17300 can output a fluid volume that represents prediction of spectral attenuation over the formation.

The fluid marker and well sections are used to produce cut-off thresholds at 17305 to select and develop well control voxel data. The output from 17305 is used to calibrate 17307 the parameters of the quantum resonance interferometry engine to be used (for example, as when implementing the flow described in 1400) to generate resonance events when Prospect Voxels are derived from regions in the formation that have fluid marker or levels of spectral attenuation exceeding a cut-off threshold of interest. These criteria include the calibration of parameters for a double well function (for example, as described in FIG. 15) as related to the determination of Tunneling Rate and resonance. Double well parameters can include:

Initialization of energy asymmetry in the double well potential function,
Interwell spacing,
Width of two wells in the double well,
Barrier height,
Maximum jumps allowed by the Bloch Rate Equation in Eqn 10, 11, and 12, and
Residency time for spin-particle in a particular well Output of quantum resonance interferometry engine 828 is examined for Tunneling Resonance, (e.g., by using the flow 1700) to see if the prospect voxel data meets the spectral attenuation threshold criteria provided in 17301 and used to produce well control voxel data.

The prospect voxel data, in the first iteration of the quantum resonance interferometry engine are processed by the quantum resonance interferometry engine 828 to produce an output which is evaluated in 17330. If it is determined that attenuation criteria is exceeded (e.g., based on method in 1400 or using differential interferometry method of 1600) then the prospect voxel data is concluded to be a surviving prospect voxel data for a next iteration. If the spectral attenuation threshold is not exceeded then the prospect voxel is not iterated in any subsequent iteration.

A check is performed at 17340 to ensure that all prospect voxel data or surviving prospect voxel data for a current iteration has been processed. If not, then next prospect voxel in the sequence is retrieved in 17370 and the process repeated from Unit 17390 in flow 17300. If the check in 17340 indicates that all prospect voxel data have been processed then the Fluid-Cube result is output (e.g., in SEGY notation).

The flow 17300 can be used to detect and discriminate between fluids of interest. It can also be used to derive all voxels above or below a spectral attenuation threshold of interest by establishing a single interval [0,threshold] or [threshold, upper range for formation] respectively, and assessing the set of surviving prospect voxel data after the first iteration. This set of voxels in surviving prospect voxel data provides areas in the formation that have spectral attenuation above or below a pre-specified cut-off threshold of interest.

Figure 17D:
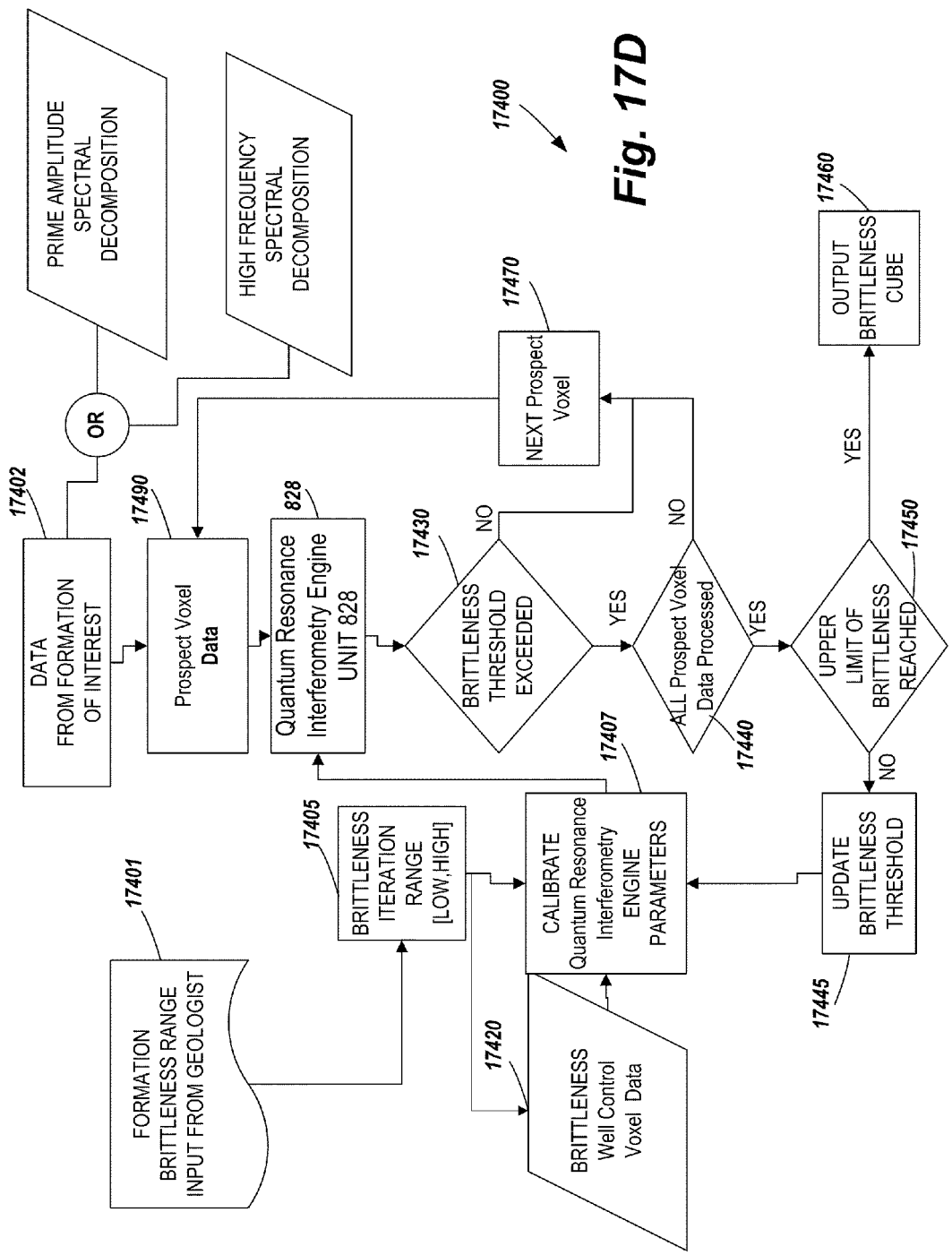

FIG. 17D shows an example of a process 17400 to compute and predict brittleness levels using seismic data. Different ranges of brittleness are of interest in different formations for different prospects. Exploration criteria for brittleness can be obtain, e.g. from a client, project geologist or an exploration manager or the lease owner/operator.

Process 17400 is implemented using an iterative workflow to determine the maximum brittleness estimated for prospect voxel data for each of multiple prospect voxel data. Once the brittleness range of interest is established for a prospect, then it is broken down into intervals that can be analyzed based on well control on the prospect or using analogous well control from other fields. All the prospect voxel data are tested for brittleness above a threshold established by the lowest interval set for the range of interest. In a successive run only voxels that exceeded the brittleness threshold established in the previous run are analyzed to assess if they exceed the new threshold. prospect voxel data that exceed the brittleness criteria in iteration are denoted as "Surviving Prospect Voxel" data. This process is repeated for Surviving prospect voxel data until the entire brittleness range is covered.

Prime-amplitude spectral decomposition or high frequency spectral decomposition volume is obtained at 17402 as a starting input for computations specific to formation brittleness estimation. Such starting inputs can be obtained for example at step 560 in FIG. 5. The starting input is voxelized at 17490, (such as is described in connection with FIG. 7) to produce a sequence of prospect voxel data Individual Prospect Voxels are processed sequentially according to the process 17400 to construct a brittleness-Cube output at 17460. At 17490, a normalized excitation cascade is generated (such as described in connection with 12190) from the prospect voxel data and input to the quantum resonance interferometry engine 828. As at 12190 a normalized excitation cascade is generated from a prospect voxel data and input to the quantum resonance interferometry engine 828.

A brittleness range of interest is used to produce cut-off thresholds at 17405 to select the appropriate well log sections to develop well control voxel data. The brittleness range is reduced to multiple brittleness increment intervals. At 17420, brittleness cut-off thresholds from 17405 are used to develop the well control voxel data (e.g., using the flow detailed in FIG. 13D to produce an output at 13470).

The well control voxel data is used to calibrate 17407 the parameters of the quantum resonance interferometry engine 828 to be used (e.g., in implementing the flow described in 1400) to generate resonance events when prospect voxel data are derived from regions in the formation that have brittleness matching or exceeding the brittleness as seen in the well control on the prospect of analogous wells drilled in the same formation at another prospect. These criteria include the calibration of parameters for a double well function (e.g., described in FIG. 15) as related to the determination of Tunneling Rate and resonance. Double well parameters are reset for each successive brittleness interval iterated by the quantum resonance interferometry engine 828 on Surviving prospect voxel data. Double well parameters can include:

Initialization of energy asymmetry in the double well potential function,
Interwell spacing,
Width of two wells in the double well,
Barrier height,
Maximum jumps allowed by the Bloch Rate Equation in Eqn 10, 11, and 12, and
Residency time for spin-particle in a particular well Output of quantum resonance interferometry engine 828 for a prospect voxel is examined for Tunneling Resonance (e.g., by using the flow 1700) to see if prospect voxel data meets the brittleness threshold criteria provided in 17401 and used to produce well control prospect voxel data. The prospect voxel data, in the first iteration of the quantum resonance interferometry engine, and surviving prospect voxel data in successive runs of the quantum resonance interferometry engine are processed by the quantum resonance interferometry engine 828 to produce an output which is evaluated at 17430. If it is determined that porosity criteria is exceeded (e.g., based on method in 1400 or using differential Interferometry method of 1600) then the prospect voxel data is concluded to be a surviving prospect voxel data for a next iteration. If the brittleness threshold is not exceeded then the prospect voxel is not iterated in any subsequent iteration.

A check is performed at 17440 to ensure that all prospect voxel data or surviving prospect voxel data for a current iteration has been processed. If not, then next prospect voxel or Surviving prospect voxel data in the sequence is retrieved in 17470 and the process repeated from Unit 17490 in flow 17400, onwards. If the check in 17440 indicates that all prospect voxel data or surviving prospect voxel data have been processed then another check 17450 is performed to see whether the upper limit of porosity for the workflow has been exceeded. If the check in 17450 is successful then the Lithology-Cube result is output, such as in SEGY notation. If the check is 17450 is unsuccessful then the brittleness threshold is updated to the next interval established in 17445. The quantum resonance interferometry engine parameters (e.g., double well parameters) are updated for the next iteration. And the process repeated.

The process 17400 can be used to implement one or more brittleness intervals of interest. It can also be used to derive all voxels above or below a brittleness threshold of interest by establishing a single interval [0,threshold] or [threshold, upper range for formation] respectively, and assessing the set of surviving prospect voxel data after the first iteration. This set of voxels in surviving prospect voxel data provides areas in the formation that have brittleness above or below a pre-specified cut-off threshold of interest.

The quantum resonance interferometry engine 828 can be configured in two stages. For example, FIGS. 18A and 18B show configuration in a training mode and an operations mode respectively. A training mode 1810 results in acalibration of parameters for:

(1) nonlinear dynamics implemented within quantum resonance interferometry process 831 and interferometric coupler 833;

(2) initialization of a figure of merit (e.g., signals to be above a specific limit of detection (LOD), limit of quantitation (LOQ), precision and accuracy) that yield resonance events; and (3) calibration and optimization of interference parameters for 833 implementing Eqn 10 through 12 and the underlying parameters of the Q-M dynamics of flow 1400. Training data includes: examples of normalized excitation cascade data derived from well control voxel data for the appropriate; and properly conditioned synthetic and seismic data noise.

A subset of well control voxel data is used for testing to verify if the Training Mode is successfully completed. The entire dataset used for Training Mode is denoted as the "Training Set". For example, the training set can include well control voxel data with porosity, Vshale and spectral attenuation for fluid attribute values below a cutoff of interest (or above as the case maybe e.g., in Vshale attribute computation).

Operational mode 1820 results in the use of a calibrated quantum resonance interferometry engine initialized and calibrated by the training mode 1810 to detect and characterize prospect voxel data. The operational dataset for the operational mode 1820 is denoted as the "Input set". The quantum resonance interferometry engine 8 requires input data to be a series of real numbers with the following properties:

1-D vector of reals with length k. It is recommended that 4≤k≤2048, a quality metric can be defined for the Training set, such that samples with known signal>LOD, and metric(sample_i)>metric(sample_j) if signal(sample_i)> signal(sample_j).

Well Control sections (as in discussed in connection with FIGS. 13A-13D used in the selection of well control voxel data and arranged in increasing or decreasing order of specific attribute values and successfully meeting the test as in 13170, 13270, 13370 or 13470) are an example of data that can be used in establishing a Quality Metric.

An example of a specific Quality Metric used during training mode 1810 is a correlation coefficient for first temporal moment of samples (1 . . . n) where n is the number of well control voxel data used in the Training Set, correlated to the signal strength of all labeled exemplars (i.e., training set members with associated signal levels). The Quality Metric is required to be monotonic to signal strength as specified for all signal exemplars. If the above test cannot be met using the first (1st-) temporal moment, then the second ($2^{nd}$) or third ($3^{rd}$-) temporal moment are checked. Also, if first-order correlation does not yield a monotonic result for 1st, $2^{nd}$, $3^{rd}$ order temporal moments, the a second-order partial correlation is applied. If the second-order partial correlation measure does not yield a monotonic relationship as defined above, then the transformations [T1 . . . TN] is reimplemented as in 808 to generate an excitation cascade.

During training mode 1810, an Interferometric Coupler 833 takes its input—"Input Data", and implements iterative reverberations within Unit 833 to produce two result outputs: labeled as "TR" and "Enhanced Data". TR—represent Transition Rate in the classical implementation of Equations 10 through 15, or Tunneling Rate as in the quantum-mechanical implementation of Equations 10 through 15. It is a measure of signal to noise ratio enhancement (SNR). In general, higher TR value is indicative of higher SNR. As in 1400, TR characterizes the impact of noise-modulated preconditioned input data on the dynamics of 1D NMR-based Q-M spin system. An optimized quantum resonance interferometry engine yields statistically different TR for signal (prospect voxel data and well control voxel data with attributes of interest present) and background exemplars (prospect or well control voxel data known not to possess attribute of interest), and provides a tractable computation for detecting attributes of interest in inherently noisy data.

Enhanced Data output in 18110 represents a series of output vectors of real numbers that has the same cardinality as normalized excitation cascade presented as an input vector to the interferometric coupler 833. The Enhanced Data from Interferometric Coupler 833 represents an SNR enhancement over SNR of the input data. Domain-specificity is encoded in the Interferometric Coupler 833 via specification of (i) TR-threshold for separating noise from signals above LOD as in resonance event 836; and (ii) calibration curve for signal quantitation to generate resonance amplitudes as in 839 in FIG. 8 and FIG. 10.

If the TR exhibited by Input samples is separated from TR exhibited by noise samples (also denoted as TR Threshold) by one or more standard deviations then signal presence can be concluded. While Enhanced Data vector has no utility in signal detection, wherein signal presence is solely concluded based on statistical significant changes in TR on a calibrated dataset, but its properties can be used to assess correctness of QSR-NMR iterator dynamics. Enhanced Data from 833 does however play a role in signal quantitation, where Enhanced data may be applied to a Calibration curve to assess how much signal is present on a pre-calibrated scale.

After each execution of the Interferometric Coupler 833, a TR Computation, as in a convergence test is performed to see if the mean TR value has converged. An L2 Norm suffices for this convergence test. As an example $$\|TR(i)/TR(i-1)\| < \epsilon$$

where $\epsilon$ is a tolerance threshold, e.g., <0.05. If convergence has not occurred then the Enhanced Data is fed back to the TR Computation block for another process iteration.

The parameters controlling the TR convergence process in the operation mode include:

(1) TR-background—the mean TR value computed during the training phase by processing a number of sample data vectors known to contain no signal (pure noise). TR-background is calculated during training by using a set of background (no signal) samples;

(2) Convergence Criterion—Maximum number of iterations for convergence. The maximum number of iterations is a controlling parameter. QSR-NMR iterator parameters are configured to achieve a 2× enhancement in 100 iterations (to reach LOD detection) during the training phase. Once that condition is achieved, the number of iterations for operational phase is usually set to 200 to allow for uncertainty and variance in real-life noise and clutter interference around LOD This ensures robustness in performance;

(3) Consistency Criterion—Number of consecutive iteration steps (convergenceSteps) when TR mean satisfies the background "distinction" criterion. Background distinction implies statistically different from TR_background. The value of the convergenceSteps is a small fraction of maxIterConvergence and is normally derived from it (for example convergenceSteps is typically 5 or 7 consecutive iterations, but less than 5% of maxIterConvergence); and (4) Degree of Separation (separationDegree)—This is the threshold for the difference between the converged value of the TRmean and the TRbackground. The value of separationDegree is normally 1. A higher value like 2 or 3 may be used when it is very important to minimize the risk of false positives The background "distinction" is decided by the formula:

$$|TR_{mean} - TR_{background}| > \text{separationDegree} * \sigma_{background}$$

Where s denotes the standard deviation across TR values obtained using Well Control prospect voxel data that fails to meet the criteria of interest or is considered negative control.

This distinction has to hold for a number of consecutive steps (e.g., 5 or 7) and is equal to convergenceSteps in order to fulfill the consistency criterion. For applications, where the noise is stationary, 3 consecutive steps may be adequate. For applications with nonstationary noise, an empirical rule is to achieve consistent separation for up to 5% of MaxIterations.

The TR computation module has a Interferometric Couple QSR-NMR engine iterator as a core element. The Interferometric Couple QSR-NMR engine module is executed for a fixed, pre-determined number of iterations. These Iterations, denoted as Innetherations, correspond to a number of repeats the Input sequence is presented. For the first iteration the QSR module takes as its input the data as produced by the Data Normalization module and combines it with internally generated noise. Subsequently, each iteration uses the enhanced data produced in the previous iteration step, which is fed back to Interferometric Couple QSR-NMR engine after it is combined with a freshly-generated noise vector. Thus, the classical additive noise parameters changes with each iteration (basically the noise strength is being incremented). When all iterations have been executed, the mean value of TR is calculated and the last enhanced data vector produced by QSR is deemed as the ultimate output vector.

The following parameters control the TR computation process:

TR Computation Iterations (maxIterTRComputation)—This is the maximum number of iterations used for TR computation. This is set to at least twice the number of iterations required to double SNR for Signal@LOD case during the training phase. Use 200 as a default value;

Minimum Noise Strength (minNoiseStrengthTRComputation)—This is the noise strength used for the first run of QSR. A good initial value of less than 5% of Max Value of (Input Data) in FIG. 5; and Noise Strength Increment (noiseStrengthIncrementTRComputation)—The amount by which the noise strength is increased for each iteration.

The process within the Interferometric Couple QSR-NMR engine module is derived from Quantum Stochastic Resonance theory implementation on an NMR system. The QSR module takes as input data a normalized vector of real numbers with absolute amplitudes (<0.3) representing the uncharacterized signal (buried within noise), and essentially implements Quantum Stochastic Resonance dynamics to determine the tunneling rate between the two quantum-mechanical "energy" states within the QSR model. In addition to the tunneling rate the QSR module also generates the "enhanced" data vector of real numbers that have a higher SNR for the buried signal than the original input data. Signal Power for Input Data and Enhanced data is computed by estimating area under the half width at full height. SNR can compute using Area for signal and noise in the two cases: Enhanced Data and Input Data signal-to-noise ratio is a term for the power ratio between a signal and the background noise:

$$SNR = \frac{P_{signal}}{P_{noise}} = \left(\frac{A_{signal}}{A_{noise}}\right)^2$$

where P is average power and A is root mean square (RMS) amplitude. Both signal and noise power (or amplitude) must be measured at the same or equivalent points in a system, and within the same system bandwidth.

The TR threshold of interest established within 828 undertaken during the training phase after the parameters of the quantum resonance interferometry engine have been established, as described above. It is possible though, that the training phase is performed in an iterative mode with the two processes (QSR optimization and TR threshold determination) being repeated a number of times. For example, if one fails to establish a TR threshold with the initial set of optimized parameters, one must readjust the QSR engine parameters by varying the SNR gain. Then, the TR threshold determination process is attempted again.

In some implementations of the Quantifier the quantifier is a decision block where the TR for the current data sample is compared with the pre-determined threshold value obtained during the training phase, in order to decide whether or not the signal is present in the input data. For the TR threshold determination, a number of control data samples must be used. These data samples fall in two categories:

background—No signal is present; and signal—A fixed value of signal (with SNR higher than LOD) is present.

For each category a minimum of 20 samples is desired. Each data sample generates a corresponding $TR_{mean}$ value when processed by the QSR engine. Thus, two sets of TR values corresponding to the two categories are generated. These are designated as $TR_B$ and $TR_S$ for background and signal respectively. The QSR engine is optimized correctly only if these two sets of TR values are statistically different. The standard deviation and the mean of each set of TR values are computed and assigned: $\sigma_B, \mu_B, \sigma_S, \mu_S$ for background and signal respectively. The critical difference parameter is then used to evaluate the difference between the two TR data sets.

The critical difference parameter is given by the formula:

$$CR = (\mu_S - \mu_B)/(\sigma_S^2/n_S + \sigma_B^2/n_B)$$

where $n_D$ and $n_B$ are the number of samples in the signal and background datasets respectively. For a well-optimized QSR engine the CR value must be outside the interval [−1.96, 1.96]. There may be two reasons for the value of CR not falling within the interval. The data samples have not been selected properly (signal is present in the background samples or not enough is present in the signal samples). This can be fixed by revisiting the sets of selected samples or, if this is an option, generate some artificial data samples where the SNR can be tightly controlled. The blocks upstream have not been optimized. This takes the tuning process back to the beginning. The parameters have to be readjusted.

If the two sets are statistically different then the TR threshold is calculated as:

threshold$_{TR}$=($\sigma_B$+$\sigma_S$)/2. The threshold so calculated is used in the operation mode to decide convergence.

Figure 19:
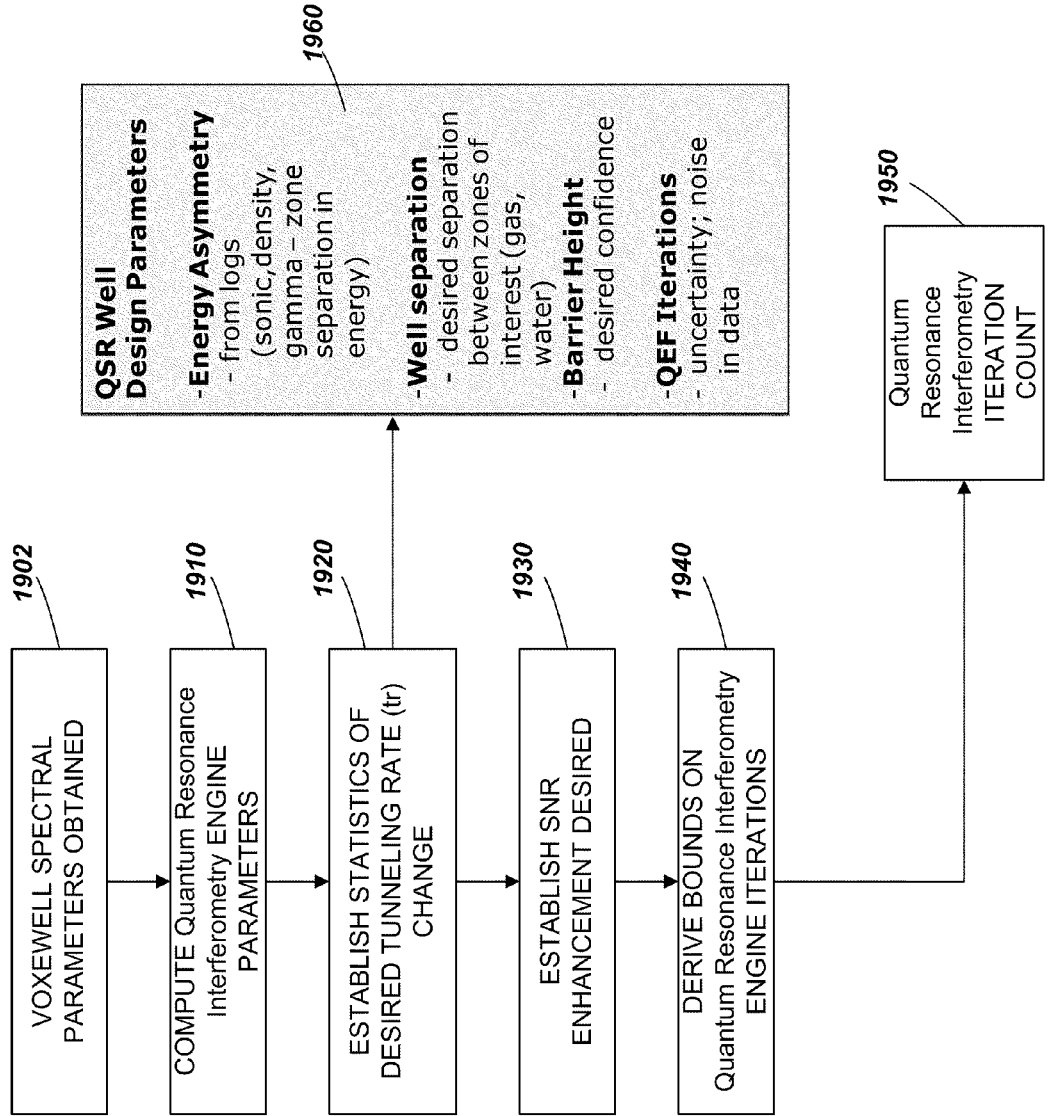
FIG. 19 shows a method for calibration of quantum resonance interferometry engine Parameters.

FIG. 19 shows a method 1900 for calibration of quantum resonance interferometry engine Parameters. For example, quantum resonance interferometry engine is initialized prior to first iteration of the first prospect voxel (as discussed at flows 17100, 17200, 17300, and 17400). Once all the prospect voxel data has been analyzed by the quantum resonance interferometry engine 828, and the attribute of interest parameters are updated to process the next interval (as discussed in connection with in 17145, 17245, 17345 or 17445), the quantum resonance interferometry engine parameters are again updated to process the surviving prospect data voxel as defined in discussion related to FIG. 17A through 17D.

The following discussion uses Porosity-Cube Workflow 17100 as an example. The technique is equally applicable to computation of Lithology-Cube, Fluid-Volume and Brittleness Volume. Once the porosity range has been established in 17105 and the porosity computations intervals established, energy spectral energy values from the well control voxel data from the appropriate well sections correlated with the different porosity intervals as in FIG. 13A are obtained in 1402 and used to initialize the parameters of double well function described in FIG. 15 and used in flow 1400.

At 1902, well control voxel data energy spectral density ranges corresponding to the attribute range of interest are obtained. At 1910, the quantum resonance interferometry engine Parameters are computed and include the following:

NMR-QSR Double Well parameters include:

Point Count—This is a number representing the size of the Input Data vector. It is preferred that the Point Count be a power of 2 but this is not a requirement. Point Count of 32 (when using delta-pulse kernel), 64 (when using a Gaussian peak kernel) and 128 (when using a CWT—continuous wavelet transform kernel) are used as examples. The actual vector size may depend on the number of raw data elements (for example the number of pixels within the window used to sweep an input image). Conformity (changing the vector size to be a power of 2) is achieved during the preprocessing preconditioning T transformations. A large value for Point Count may lead to false cause resonances due to coupling between between injected additive, periodic noise and Q-M system which could result in false positives at near LOD signal levels. May also add computational time to the process. a decrease in the computational processing speed of the quantum resonance interferometry engine. The Point Count is actually result of discretization of 1-D1-peak kernel used for preconditioning and normalizing input to the Interferometric Coupler;

Noise Color—Periodic synthetic noise is required to drive NMR-QSR dynamics. This noise is characterized by its color and strength (amplitude). The default value of noise color may be left unchanged at a noise color of 1 (white noise). This is used as a control parameter to speed/slow down SNR gain when using quantum resonance interferometry engine. It has limited influence and can destabilize the QSR dynamics is set to be >>1.) but it is adjustable as a last resort measure for detecting signal when the adjustment of other parameters fails to produce the desired SNR;

Noise Strength—The noise strength (amplitude) is the primary adjustable value outside of double well design, and directly controls the detection of signal by improving the output SNR;

Residency Time—In order for the quantum resonance interferometry engine to decide that a transition has occurred during the processing, the quantum resonance interferometry engine must show some stability, i.e. the state does not exhibit random transitions. Residency Time is therefore a stability criterion which essentially specifies the minimum time that the system state must remain in one of the two quantum-mechanical states. The Residency Time, can in fact be expressed as the number of time steps (as mentioned above, one time step corresponds to processing the next element within the input data vector). Thus, the minimum value of Residency Time is one. The higher the value of Residency Time, a higher level of stability is achieved at the cost of fewer transitions recorded within the Total Time (length of the input data vector)

Potential Barrier—This is one of the two parameters defining the quartic function of the QSR model. It is used to control the accuracy and confidence in obtaining resonance using quantum resonance interferometry engine;

Potential Minimum—This is the second parameter defining the quartic function of the QSR model;

Activation Temperature;

Particle Mass;

Double Well Energy—Asymmetry is derived from logs (sonic, density, gamma, . . . ) It controls the separation between different zones of interest, in the energy spectral density space;

Thermal Relaxation Time—this provides the protocol for modulation and amplification of (synthetic+seismic) noise introduced into the quantum resonance interferometry engine;

Decoherence Relaxation Time represent the noise that is required to be added to the system to compensate for losses due to environmental decoherence;

Maximum Energy Ratio—This is used in the quantum resonance interferometry engine to check if the system energy stays within reasonable bounds of the quartic potential. It is not critical for the performance of the engine and a default value can be determined during the optimization process;

Regulator Threshold is used to establish a confidence measure on resonance events;

Initial Position—This is the initial state of the system (x,y,z) in the Bloch Rate equations of motion given by Eqns. 10, 11, and 12. This parameter has to lie within the bounds of the functional region of the quartic function. Its influence is minimal and only serves as the starting point of the iteration. A valid initial value of the Initial Position can be calculated from the other parameters defining the quartic function.

At 1920, there are three parameters in tuning the TR convergence module

Maximum Convergence Iterations—This is the maximum number of iterations after which Interferometric Coupler Unit 833 abandons attempts to achieve TR convergence. A default value for this parameter is set to 100. Higher values increase the likelihood of convergence but required increased computation time;

Convergence Confidence—This is the number of consecutive iterations wherein the TR value must stay within an Epsilon bound on the mean of TR in order to conclude convergence. The value of this parameter should be a fraction of the maximum convergence iterations (the default value of 5% can be used). Higher values will increase the level of confidence with the cost of increased execution time;

Convergence Epsilon—is the width of the interval around a mean value within which the TR values are allowed to fluctuate for meeting the Convergence criterion. Convergence is concluded if the difference between the maximum and the minimum values of arithmetic mean of TR is smaller than Convergence Epsilon for the pre-specified number of consecutive iterations. The convergence confidence level is determined by the combination of the values of this parameter and the Convergence Confidence setting.

TR threshold at 1920 is established during the training phase after the parameters of the quantum resonance interferometry engine have been set. However, a training phase can be performed in an iterative mode with two processes (quantum resonance interferometry engine optimization and TR threshold determination) being repeated a number of times. For example, if one fails to establish a TR threshold with the initial set of optimized parameters, the quantum resonance interferometry engine parameters can be adjusted by varying the SNR gain. Then, the TR threshold determination process is re-attempted.

To compare the TR for a Prospect Data the current data sample is compared with the pre-determined threshold value obtained during the training phase, in order to decide whether or not the signal is present in the Input Data. For the TR threshold determination, a number of well control voxel data samples are needed. These data samples fall in two categories: termed as "Background"—i.e., no attribute of interest (i.e., attribute above a cut-off) is present; and, termed as "Signal"—a fixed value of well control voxel data with attributes of interest present above the cut-off value, also referred to as "Signal Above LOD".

TR threshold can be established using as few as 1 well control voxel data. Each data sample generates a corresponding TR value when processed by the quantum resonance interferometry engine. Thus, two sets of TR values corresponding to the two categories are generated. These are designated as TRB and TRS for the Background and Signal respectively. The quantum resonance interferometry engine is optimized correctly only if these two sets of TR values are statistically different. The standard deviation and the mean of each set of TR values are computed and assigned: $\sigma B$, $\mu B$, $\sigma S$, $\mu S$ for Background and Signal respectively. The critical difference parameter is then used to evaluate the difference between the two TR data sets.

The critical difference parameter is given by the formula:

$$CR=(\mu S-\mu B)/(\sigma S^2/nS+\sigma B^2/nB)$$

where nS and nB are the number of samples in the signal and background datasets respectively. For a well-optimized quantum resonance interferometry engine the CR value must be outside the interval [−1.96, 1.96]. There may be two reasons for the value of CR not falling within the interval. The data samples have not been selected properly (Signal is present in the Background samples or not enough is present in the Signal samples). This can be fixed by revisiting the sets of selected samples.

If the two sets are statistically different then the TR threshold is calculated as: thresholdTR=$(\sigma B+\sigma S)/2$. The threshold so calculated is used in the operation mode to decide convergence.

At 1940, bounds are derived on the quantum resonance interferometry engine iterations.

Total Time—quantum resonance interferometry engine processes normalized excitation cascade as a 1-D array time series of prospect voxel data vector. Thus, the Total Time parameter determines the incremental time difference between each element of the Input Data. The first data element is assigned a time value of zero and the last element has a time value equal to: (PointCount−1)*TotalTime/PointCount. This parameter establish scales at which transitions are detected vis-à-vis scale at which SNR is increased by quantum resonance interferometry engine.

At 1950, quantum resonance interferometry iteration is count is incremented.

Number of Iterations—This is the maximum number of times the QSR engine is run within the QSR Iterator module. In principle, the larger the number of iterations, the better the chance of detecting the signal at the cost of longer execution times. Careful attention must be paid to the selection of this important parameter value, since a high price may be paid in the overall increase in computational time, with no comparable benefit in SNR gain.

At 1960, a summary is shown of NMR-QSR well design double parameters. These include energy asymmetry related to the energy spectral density of zone separation in well logs. The well separation is used to modulate the desired separation between zones of interest (e.g., oil and water). Barrier height is used to establish desired confidence. While the number of iterations are related to the inherent noise and uncertainty in the data.

FIG. 20 shows an example workflow 2000 for producing output with various processes discussed herein. Workflow 2000 uses processes described in this disclosureto produce output for sizing hydrocarbon reservoir and generating drilling targets for exploration and production.

Results of a conventional seismic processing workflow sequence (using e.g, standard off the shelf software geophysical packages to produce pre-stack time or depth migrated gathers) is obtained at 220. In some examples, it is preferred to preserve amplitudes, spectrum and phase information and avoid band-pass filter. Seismic horizons are generated to demarcate formation of interest using best-practice methods of horizon picking. Spectral decompositions are performed on seismic data obtained at 220 to partition a seismic volume into low frequency, prime amplitude and high frequency partitioned volumes as in 560.

A Porosity-Cube is produced at 17160, using process 17100 with either high frequency or prime-amplitude partitions as an input. A Lithology-Cube is produced at 17260 using process 17200 using either high frequency or prime-amplitude partitions as an input. A Fluid Volume is produced as in 17360, using process 17300 with either high frequency or prime-amplitude partitions as an input.

Processes 17100, 17200 and 17300 use flows in FIG. 9A through 9C to produce seismic data noise at 9170, and sinusoidal periodic modulated synthetic noise 842 is generated from random number generators. The seismic data noise and synthetic noise are combined to drive a quantum resonance interferometry engine used to produce Porosity-Cube, Lithology-Cube and Fluid Volume by analyzing a sequence of prospect voxel data derived from seismic partitioned volumes.

Results of flow 17100, 17200, and 17300 are combined as in 2050 to identify and highlight prospect voxel data within result volumes to determine voxels with porosity values above a prespecified cut-off, Vshale values that meet criteria of interest and voxels that show presence of fluid of interest. Voxels meeting all the three criteria are aggregated to assemble a subsurface geobody. The size, location, and orientation of the geobody in the seismic volume defines the properties of potential hydrocarbon reservoir. As the size of individual prospect voxel data is known, the size of the reservoir geobody is computed. Results from 2050 are used to make hydrocarbon exploration, drilling and production decisions. In some implementations, drilling, exploration and production decisions using a subset (e.g., just one or two) of Porosity-Cube, Lithology-Cube or Fluid Volume Results.

Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), peer-to-peer networks (e.g., ad hoc peer-to-peer networks), wireless networks, mobile phone networks etc.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A number of implementations have been described. Nevertheless, it will be understood that various modifications may be made. In addition, other steps may be provided, or steps may be eliminated, from the described flows, and other components may be added to, or removed from, the described systems. Accordingly, other implementations are within the scope of the following claims.

What is claimed is:

1. A machine-implemented method, comprising:
   voxelizing microseismic data from seismic traces from a microseismic receiver for a geological subsurface formation of interest into multiple voxels having respective subsurface locations in the formation of interest; and
   determining whether a voxel in the multiple voxels includes an attribute, wherein the attribute comprises a fracture event; and
   outputting whether the voxel includes the fracture event to an attribute volume based on the subsurface location; and
   outputting fracture event start time and duration of fracture event; and
   performing the determining, the outputting whether the voxel includes the fracture event, and the outputting fracture start time and duration for at least some other of the multiple voxels.

2. The method of claim 1, wherein the microseismic data comprises velocity amplitudes for the formation of interest.

3. The method of claim 1, wherein the microseismic data comprises one or more of acceleration and velocity amplitudes over time for the subsurface formation of interest around the wellbore.

4. The method of claim 1, wherein voxelizing the microseismic data further comprises spectrally decomposing the seismic data into frequency volumes.

5. The method of claim 4, further comprising spectrally decomposing the microseismic data to detect and discriminate events including at least one of onset of fracture, propagation of existing natural fractures, or propagation of drilling-induced fractures.

6. The method of claim 1,
   wherein determining whether a voxel in the multiple voxels includes an attribute comprises:
   obtaining control data based on information obtained prior to a hydraulic fracturing process being implemented; and
   processing the one dimension voxel vector for the voxel using the control data and using quantum resonance interferometry to detect a resonance.

7. The method of claim 6, wherein determining whether a voxel in the multiple voxels includes an attribute comprises:
   normalizing the voxel;
   determining whether a resonance occurs when the control data is coupled, using a quantum mechanical model, with the spectral data generated from the normalized voxel.

8. The method of claim 1, further comprising performing the steps of claim 1 for the seismic data for another formation of interest.

9. The method of claim 1, determining a window size for analyzing microseismic data based on an estimation of fracture event properties, duration of well stimulation, and fluid insertion protocol.

* * * * *